(12) United States Patent
Yamaguchi et al.

(10) Patent No.: US 6,292,514 B1
(45) Date of Patent: *Sep. 18, 2001

(54) VIDEO ENCODING APPARATUS AND VIDEO DECODING APPARATUS

(75) Inventors: Noboru Yamaguchi, Yashio; Toshiaki Watanabe, Yokohama; Takashi Ida, Kawasaki; Yoshihiro Kikuchi, Yokohama, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/634,761

(22) Filed: Aug. 8, 2000

Related U.S. Application Data

(62) Division of application No. 09/091,362, filed as application No. PCT/JP97/03976 on Oct. 31, 1997, now Pat. No. 6,122,318.

(30) Foreign Application Priority Data

| Oct. 31, 1996 | (JP) | 8-290033 |
|---|---|---|
| Apr. 10, 1997 | (JP) | 9-092432 |
| Apr. 18, 1997 | (JP) | 9-116157 |
| Jun. 2, 1997 | (JP) | 9-144239 |
| Jun. 18, 1997 | (JP) | 9-177773 |

(51) Int. Cl.⁷ .................................................. H04B 1/66
(52) U.S. Cl. ........................................................ 375/240.21
(58) Field of Search ..................................... 348/413, 699, 348/426, 390, 415; 375/240.21

(56) References Cited

U.S. PATENT DOCUMENTS

| 5,475,435 | * | 12/1995 | Yonemitsu et al. | 348/426 |
|---|---|---|---|---|
| 5,608,458 | | 3/1997 | Chen, et al. | |
| 5,677,735 | * | 10/1997 | Ueno et al. | 358/415 |
| 5,761,341 | * | 6/1998 | Go | 382/232 |
| 5,764,814 | * | 6/1998 | Chen et al. | 382/243 |
| 5,883,678 | * | 3/1999 | Yamaguchi et al. | 348/390 |

FOREIGN PATENT DOCUMENTS

| 0 420 653 A2 | 4/1991 | (EP) . |
|---|---|---|
| 0 707 427 A2 | 4/1996 | (EP) . |
| 0 708 563 | 4/1996 | (EP) . |
| 0 708 563 A2 | 4/1996 | (EP) . |
| 0 739 141 A2 | 10/1996 | (EP) . |
| 0 909 096 A1 | 4/1999 | (EP) . |
| 0 971 545 A1 | 1/2000 | (EP) . |
| 2 327 310 | 1/1999 | (GB) . |
| 3-89792 | 4/1991 | (JP) . |
| 8-116542 | 5/1996 | (JP) . |
| 8-214318 | 8/1996 | (JP) . |

OTHER PUBLICATIONS

John Y. A. Wang et al., M.I.T. Media Laboratory Vision and Modeling Group, Technical Report No. 263, vol. 2187, pp. 1–12, "Applying Mid–Level Vision Techniques for Video Data Compression and Manipulation", Feb. 1994.

Joern Ostermann, Signal Processing; Image Communication 6, pp. 143–161, "Object–Based Analysis–Synthesis Coding Based on the Source Model of Moving Rigid 3D Objects", 1994.

Fundamentals of Digital Image Processing, Anil K. Jain, University of California, Davis Prentice Hall, Englewood Cliffs, NJ 07632.

* cited by examiner

Primary Examiner—Chris Kelley
Assistant Examiner—Shawn S. An
(74) Attorney, Agent, or Firm—Oblon, Spivak, McClelland, Maier & Neustadt, P.C.

(57) ABSTRACT

An alpha-map encoding apparatus includes a first down-sampling circuit (21) for down-sampling an alpha-map signal which represents the shape of an object and the position in the frame of the object at a down-sampling ratio based on size conversion ratio information, an up-sampling circuit (23) for up-sampling the alpha-map signal at an up-sampling ratio based on size conversion ratio information given to restore the down-sampled alpha-map signal to an original size, and outputting a local decoded alpha-map signal, a motion estimation/compensation circuit (25) for generating a motion estimation/compensation signal on the basis of the previous decoded video signal and a motion vector signal, a second down-sampling circuit (26) for down-sampling the motion estimation/compensation signal at the down-sampling ratio, a binary image encoder for encoding the alpha-map signal down-sampled by the first down-sampling circuit to a binary image in accordance with the motion estimation/compensation signal down-sampled by the second down-sampling circuit, and outputting an encoded binary image signal, and a multiplexer for multiplexing and outputting the encoded binary image signal and the up-sampling ratio information.

3 Claims, 50 Drawing Sheets

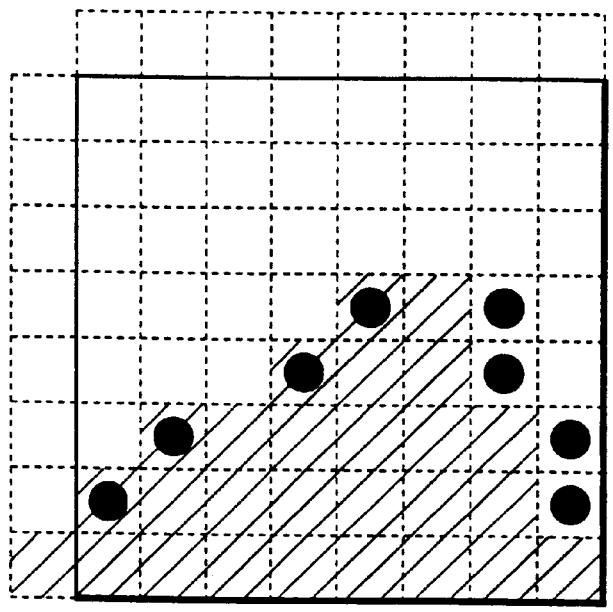
FIG. 7A ● :CHANGING PIXEL
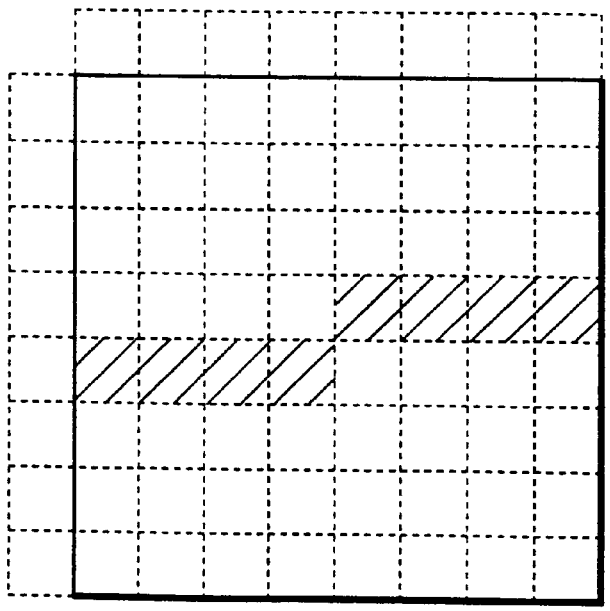
FIG. 7B ⬚ :REFERENCE AREA

| | c5 | c4 | c3 | c2 | c1 | c0 | CONTEXT NUMBER |
|---|---|---|---|---|---|---|---|
| | 0 | 0 | 0 | 0 | 0 | 0 | 0 |
| | 0 | 0 | 0 | 0 | 0 | 1 | 1 |
| | 0 | 0 | 0 | 0 | 1 | 0 | 2 |
| | 0 | 0 | 0 | 0 | 1 | 1 | 3 |
| ⋮ | ⋮ | | | | | | ⋮ |
| | 1 | 1 | 1 | 1 | 1 | 1 | 63 |

FIG. 11

| REGION | NOTICING PIXEL VALUE |
|---|---|
| 0 | 1A |
| 1 | 1B |
| 2 | 1C |
| 3 | 1D |
| 4 | 1A·(1B+1C+1D)+1B·1C·1D |
| 5 | 1B·(1C+1D+1A)+1C·1D·1A |
| 6 | 1C·(1D+1A+1B)+1D·1A·1B |
| 7 | 1D·(1A+1B+1C)+1A·1B·1C |

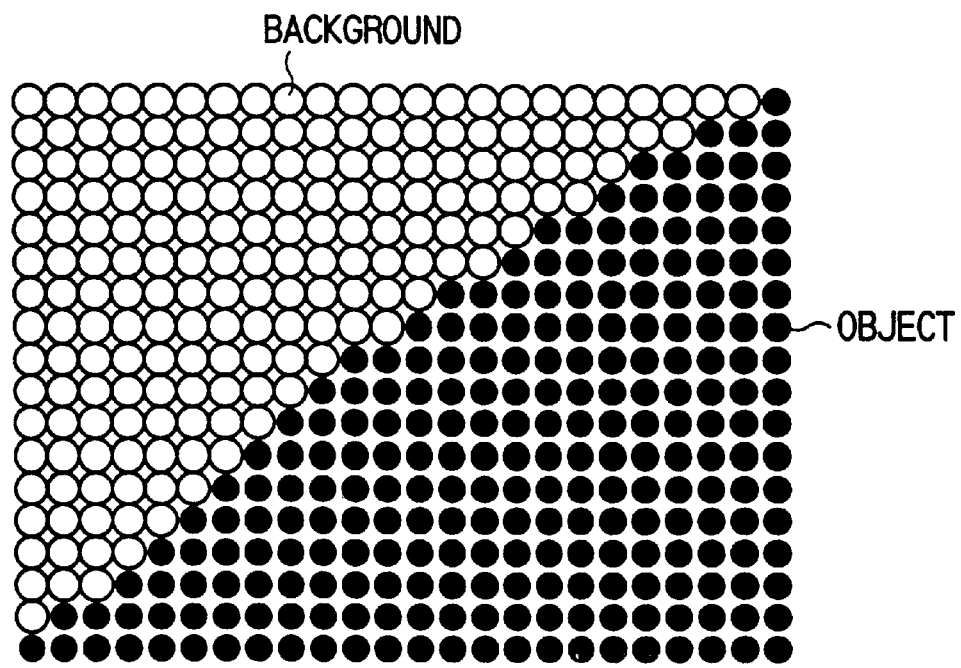
FIG. 24A
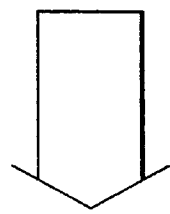
DOWN-SAMPLING
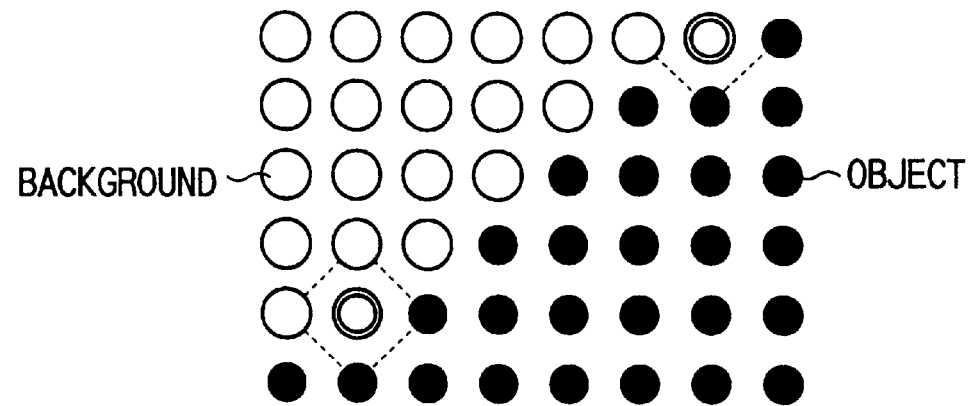
FIG. 24B

TIME n

| 0 | 0 | 1 | 1 | 0 | 0 |
|---|---|---|---|---|---|
| 0 | 1 | 1 | 1 | 0 | 0 |
| 0 | 1 | 3 | 1 | 0 | 0 |
| 1 | 3 | 3 | 1 | 0 | 0 |
| 1 | 3 | 3 | 1 | 1 | 0 |
| 1 | 3 | 3 | 3 | 3 | 1 |
| 1 | 1 | 1 | 1 | 1 | 1 |

FIG. 43A

TIME n-1

| 0 | 0 | 1 | 1 | 0 | 0 | 0 |
|---|---|---|---|---|---|---|
| 0 | 1 | 1 | 1 | 0 | 0 | 0 |
| 0 | 1 | 3 | 1 | 0 | 0 | 0 |
| 1 | 3 | 3 | 1 | 0 | 0 | 0 |
| 1 | 3 | 3 | 3 | 1 | 1 | 0 |
| 1 | 3 | 3 | 3 | 3 | 1 | 1 |

FIG. 43B

TIME n-1

| 0 | 0 | 1 | 1 | 0 | 0 | 0 |
|---|---|---|---|---|---|---|
| 0 | 1 | 1 | 1 | 0 | 0 | 0 |
| 0 | 1 | 3 | 1 | 0 | 0 | 0 |
| 1 | 3 | 3 | 1 | 0 | 0 | 0 |
| 1 | 3 | 3 | 3 | 1 | 1 | 0 |
| 1 | 3 | 3 | 3 | 3 | 1 | 1 |

↑ CUT

FIG. 44A

TIME n-1'

| 0 | 0 | 1 | 1 | 0 | 0 |
|---|---|---|---|---|---|
| 0 | 1 | 1 | 1 | 0 | 0 |
| 0 | 1 | 3 | 1 | 0 | 0 |
| 1 | 3 | 3 | 1 | 0 | 0 |
| 1 | 3 | 3 | 3 | 1 | 1 |
| 1 | 3 | 3 | 3 | 3 | 1 |
| 1 | 3 | 3 | 3 | 3 | 1 |

← COPY

FIG. 44B

| S | S | S | S | S | S |
|---|---|---|---|---|---|
| S | S | S | S | S | S |
| S | S | S | S | S | S |
| S | S | S | S | S | S |
| S | S | S | D | S | D |
| S | S | S | S | S | S |
| S | D | D | D | D | S |

FIG. 46A

| S | S | D | S | D | S |
|---|---|---|---|---|---|
| S | D | S | S | D | S |
| S | D | D | D | D | S |
| D | D | S | D | D | S |
| D | D | S | D | S | D |
| D | D | S | S | S | D |
| S | S | S | S | S | S |

FIG. 46B

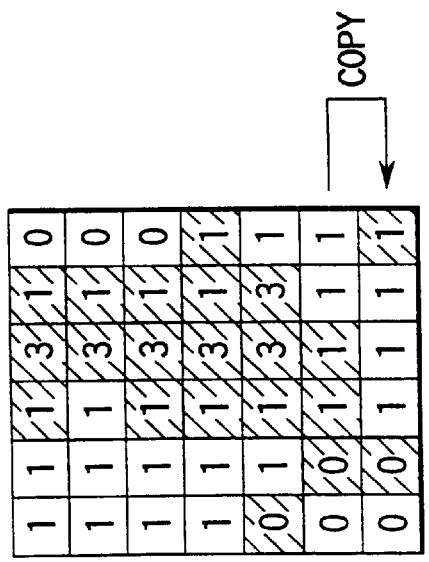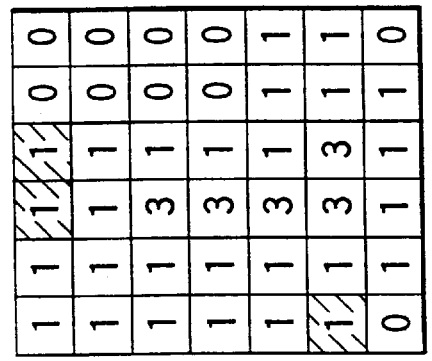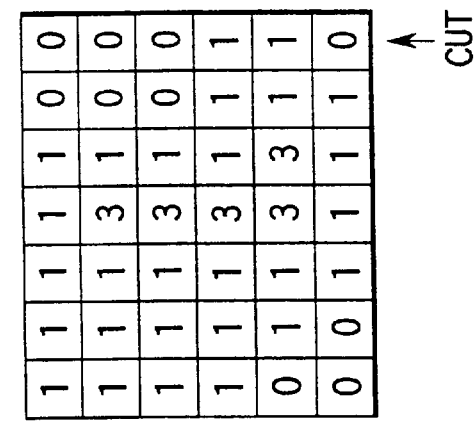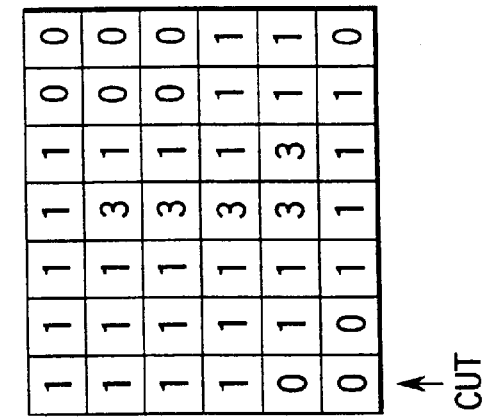
FIG. 50A  FIG. 50B

[PREVIOUS FRAME]   [CURRENT FRAME]

VIDEO ENCODING APPARATUS AND VIDEO DECODING APPARATUS

This application is a Div of Ser. No. 09/091,362 filed Jun. 19, 1998 U.S. Pat. No. 6,122,318 which is a 371 of PCT/JP97/03976 filed Oct. 31, 1997.

TECHNICAL FIELD

The present invention relates to a video encoding apparatus and video decoding apparatus, which encode, transmit, and store video signals with high efficiency, and decode the encoded signals.

BACKGROUND ART

Since a video signal has a large information volume, it is a common practice to compression-encode the video signal when it is transmitted or stored. In order to encode a video signal with high efficiency, an image in units of frames is divided into blocks in units of a predetermined number of pixels (for example, M×N pixels (M: the number of pixels in the horizontal direction, N: the number of pixels in the vertical direction)), each divided block is orthogonally transformed to separate the spatial frequency of the image into the respective frequency components, and these frequency components are acquired as transform coefficients and are encoded.

As one of video encoding methods, a video encoding method that belongs to the category called mid-level encoding is proposed in "J. Y. A. Wang et. al. "Applying Mid-level Vision Techniques for Video Data Compression and Manipulation", M.I.T. Media Lab. Tech. Report No. 263, Feb. 1994,".

In this method, if an image including a background and a subject (the subject will be referred to as an object hereinafter) is present, the background and object are separately encoded.

In order to separately encode the background and object in this way, for example, an alpha-map signal as binary subsidiary video information that expresses the shape of the object and its position in a frame, is required. Note that the alpha-map signal of the background is uniquely obtained based on that of the object.

As a method of efficiently encoding this alpha-map signal, binary image encoding (e.g., MMR (Modified Modified READ) encoding or the like), or line figure encoding (chain encoding or the like) are used.

Furthermore, in order to reduce the number of encoded bits of the alpha-map, a method of approximating the contour of a given shape by polygons and smoothing it by spline curves (J. Ostermann, "Object-based analysis-synthesis coding based on the source model of moving rigid 3D objects", Signal Process. Image Comm. Vol. 6 No. 2 pp. 143–161, 1994), a method of down-sampling and encoding an alpha-map, and approximating the encoded alpha-map by curves when it is up-sampled (see Japanese Patent Application No. 5-297133), and the like are known.

When an image in a frame is broken up into a background and object upon encoding the image, as described above, an alpha-map signal that expresses the shape of the object and its position in the frame is required to extract the background and object. For this reason, this alpha-map information is encoded to form a bit stream together with encoded information of an image, and the bit stream is subjected to transmission and storage.

However, in the method of dividing an image in the frame into a background and object, the number of encoded bits increases as compared to the conventional encoding method that simultaneously encodes an image in the frame, since the alpha-map must also be encoded, and the encoding efficiency lowers due to an increase in the number of encoded bits of the alpha-map.

DISCLOSER OF INVENTION

It is an object of the present invention to provide a video encoding apparatus and video decoding apparatus, which can efficiently encode and decode alpha-map information as subsidiary video information that express the shape of the object and its position in a frame.

According to the present invention, there is provided a video encoding apparatus which encodes an image together with an alpha-map as information for discriminating the image into an object area and background area, and encodes the alpha-map using relative address encoding, comprising means for encoding a symbol that represents a position of the next change pixel to be encoded relative to a reference change pixel as the already encoded change pixel using a variable-length coding table, and means for holding not less than two variable-length coding tables equivalent to the variable-length coding table, and switching the variable-length coding tables in correspondence with a pattern of the already encoded alpha-map.

According to the present invention, there is provided a video decoding apparatus for decoding an encoded bit stream obtained by encoding of the encoding apparatus, comprising means for decoding the symbol using a variable-length coding table, and means for holding not less than two variable-length coding tables equivalent to the variable-encoding table, and switching the variable-length coding tables in correspondence with a pattern of the already decoded alpha-map.

Furthermore, the means for switching the variable-length coding tables is means for switching the tables with reference to a pattern near the reference change pixel.

The apparatus with the above arrangement is characterized in that a plurality of types of variable-length coding tables are prepared, and these variable-length coding tables are switched in correspondence with the pattern of the already encoded alpha-map, in encoding/decoding that reduces the number of encoded bits by encoding the symbol that specifies the position of a change pixel using the variable-length coding table. According to the present invention mentioned above, an effect of further reducing the number of encoded bits of the alpha-map can be obtained.

According to the present invention, there is provided a binary image encoding apparatus which serves as an encoding circuit for a motion video encoding apparatus for encoding motion video signals for a plurality of frames obtained as time-series data in units of objects having arbitrary shapes, and has means for dividing a rectangle area including an object into blocks each consisting of M×N pixels (M: the number of pixels in the horizontal direction, N: the number of pixels in the vertical direction), and means for sequentially encoding the divided blocks in the rectangle area in accordance with a predetermined rule, having decoded value storage means for storing a decoded value near the block, image holding means (frame memory) for storing decoded signals of the already encoded frame (image frame), a motion estimation/compensation circuit for generating a motion estimation/compensation value using the decoded signals in the image holding means (frame memory), and means for detecting a change pixel as well as a decoded value near the block with reference to the decoded value storage means, whereby a reference change pixel for relative address encoding is obtained not from a pixel value in the block but from a motion estimation/compensation signal.

There is also provided an alpha-map decoder having means for sequentially decoding a rectangle area including an object in units of blocks each consisting of M×N pixels in accordance with a predetermined rule, means for storing a decoded value near the block, image holding means (frame memory) for storing decoded signals of the already encoded frame (image frame), a motion estimation/compensation circuit for generating a motion estimation/compensation value using the decoded signals in the image holding means (frame memory), and means for detecting a change pixel as well as a decoded value near the block with reference to the decoded value storage means, whereby a reference change pixel for relative address encoding is obtained not from a pixel value in the block but from a motion estimation/compensation signal.

With these circuits, the alpha-map information as subsidiary video information that represents the shape of an object and its position in a frame can be efficiently encoded and decoded.

Furthermore, there is provided a video encoding apparatus having means for storing a decoded value near a block, image holding means (frame memory) for storing decoded signals of the already encoded frame (image frame), motion estimation/compensation circuit for generating a motion estimation/compensation value using the decoded signals in the image holding means (frame memory), means for detecting a change pixel as well as a decoded value near the block with reference to the decoded value storage means, and means for switching between a reference change pixel obtained from an interpolated pixel or decoded pixel value in the block and a reference change pixel for relative address encoding, whereby relative address encoded information is encoded together with switching information.

There is also provided an alpha-map decoder having means for sequentially decoding a rectangle area including an object in units of blocks each consisting of M×N pixels in accordance with a predetermined rule, means for storing a decoded value near the block, image holding means (frame memory) for storing decoded signals of already encoded frame (image frame), a motion estimation/compensation circuit for generating a motion estimation/compensation value using the decoded signals in the image holding means (frame memory), and means for detecting a change pixel as well as a decoded value near the block with reference to the decoded value storage means, and also having means for switching between a reference change pixel obtained from an interpolated pixel or decoded pixel value in the block and a reference change pixel for relative address encoding, whereby a reference change pixel is obtained in accordance with switching information.

In this case, upon relative address encoding, a process is done while switching whether a reference change pixel b1 is detected from a "current block" as a block of the currently processed image or from a "compensated block" as a block of the previously processed image in units of blocks, and the encoding side also encodes this switching information. The decoding side decodes the switching information, and can switch whether a reference change pixel b1 is detected from the "current block" or "compensated block" on the basis of the decoded switching information. In this fashion, an optimal process can be done based on the image contents in units of blocks, and encoding with higher efficiency can be attained.

According to the present invention, a video encoding apparatus which divides a rectangle area including an object into blocks each consisting of M×N pixels (M: the number of pixels in the horizontal direction, N: the number of pixels in the vertical direction, and sequentially encodes the divided blocks in the rectangle area in accordance with a predetermined rule) so as to encode motion video signals for a plurality of frames obtained as time-series data in units of objects having arbitrary shapes, comprises alpha-map encoding means including a frame memory for storing a decoded signal of the current frame including decoded signals near the block and a decoded signal of the encoded frame in association with an alpha-map signal representing the shape of the object, means for replacing pixel values in the block by one of binary values, motion estimation/compensation means for generating a motion estimation/compensation value using a decoded signal of the already encoded frame in the frame memory, means for size-converting (up-sampling/down-sampling) a binary image in units of blocks, means for encoding a size conversion ratio as side information, and binary image encoding means for encoding binary images down-sampled in units of blocks.

The alpha-map encoding means selects the decoded image of the block from decoded values obtained by replacing all the pixel values in the block by one of binary values, motion estimation/compensation values, and decoded values obtained upon size conversion in units of blocks. Hence, the alpha-map signal can be encoded with high quality and efficiency, and encoding can be done at a high compression ratio while maintaining high image quality.

Also, a video decoding apparatus which sequentially decodes a rectangle area in units of blocks each consisting of M×N pixels (M: the number of pixels in the horizontal direction, N: the number of pixels in the vertical direction) including an object in accordance with a predetermined rule so as to decode motion video signals for a plurality of frames obtained as time-series data in units of objects having arbitrary shapes, comprises alpha-map decoding means including a frame memory for storing a decoded signal of the current frame including a decoded signal near the block, and a decoded signal of the encoded frame, means for replacing all pixel values in the block by one of binary values, motion estimation/compensation means for generating a motion estimation/compensation value using a decoded signal of the already encoded frame in the frame memory, means for size-converting a binary image in units of blocks, and binary image decoding means for decoding down-sampled binary images in units of blocks.

The alpha-map decoding means selects the decoded image of the block from decoded values obtained by replacing all the pixel values in the block by one of binary values, motion estimation/compensation values, and decoded values obtained upon size conversion in units of blocks. Hence, a high-quality image can be decoded.

A system for encoding shape modes in units of blocks upon encoding alpha-maps in units of blocks, has means for setting a video object plane (VOP) which includes an object and is expressed by a multiple of a block size, means for dividing the VOP into blocks, labeling means for assigning labels unique to the individual shape modes to the blocks, storage means for storing the labels in units of frames, determination means for determining a reference block of the previous frame corresponding to a block to be encoded of the current frame, prediction means for determining a prediction value on the basis of at least the labels of the previous frame held in the storage means, and the reference block, and encoding means for encoding label information of the block to be encoded using the prediction value.

A decoding apparatus for decoding shape modes of an alpha-map in units of blocks, comprises storage means for storing decoded labels in units of frames, determination means for determining a reference block of the previous frame corresponding to a block to be decoded of the current frame, prediction means for determining a prediction value on the basis of at least labels of the previous frame held in the storage means and the reference block, and decoding means for decoding label information of the block to be decoded using the prediction value.

With these apparatuses, upon encoding an alpha-map in units of macro blocks (divided unit image blocks obtained when an image is divided into units each consisting of a plurality of pixels, e.g., 16×16 pixels), unique labels are assigned to the shape modes of the blocks and are encoded, and original alpha-map data is decoded by decoding these labels, thus attaining efficient encoding.

According to the present invention, a video encoding apparatus which encodes shape modes in units of blocks upon encoding an alpha-map in units of blocks when an image is encoded together with an alpha-map as information for discriminating the image into an object area and background area, comprises means for setting a VOP which includes an object and is expressed by a multiple of a block size, means for dividing the VOP into blocks, labeling means for assigning labels unique to the individual shape modes to the blocks, storage means for storing the labels or alpha-maps in units of frames, determination means for determining a reference block of the previous frame corresponding to a block to be encoded of the current frame, prediction means for determining a prediction value on the basis of at least the labels or alpha-maps of the previous frame held in the storage means, and the reference block, and encoding means for encoding label information of the block to be encoded using the prediction value.

Furthermore, the apparatus comprises storage means for storing size conversion ratios in units of frames, the encoding means comprises means which can vary a size conversion ratio of a frame in units of frames and performs encoding in correspondence with the size conversion ratio, and the determination means comprises means for determining a reference block of the previous frame corresponding to a block to be encoded of the current block using the size conversion ratio of the current frame, and the size conversion ratio of the previous frame obtained from the storage means.

Alternatively, the apparatus comprises storage means for storing size conversion ratios in units of frames, the encoding means comprises means which can vary a size conversion ratio of a frame in units of frames and performs encoding in correspondence with the size conversion ratio, the determination means comprises means for determining a reference block of the previous frame corresponding to a block to be encoded of the current block using the size conversion ratio of the current frame, and the size conversion ratio of the previous frame obtained from the storage means, and the prediction means comprises means for, when there are a plurality of reference blocks, determining a majority label of those of the plurality of reference blocks as the prediction value.

Alternatively, the apparatus comprises storage means for storing size conversion ratios in units of frames, the encoding means comprises means which can vary a size conversion ratio of a frame in units of frames, performs encoding in correspondence with the size conversion ratio, and encodes the block to be encoded using one selected from a plurality of types of variable-length coding tables in accordance with one or both of the size conversion ratios of the previous and current frames, and the determination means comprises means for determining a reference block of the previous frame corresponding to a block to be encoded of the current block using the size conversion ratio of the current frame, and the size conversion ratio of the previous frame obtained from the storage means.

A decoding apparatus for decoding shape modes of an alpha-map in units of blocks, comprises storage means for storing decoded labels or alpha-maps in units of frames, determination means for determining a reference block of the previous frame corresponding to a block to be decoded of the current block, prediction means for determining a prediction value on the basis of at least the labels or alpha-maps of the previous frame stored in the storage means, and the reference block, and decoding means for decoding label information of the block to be decoded using the prediction value.

The apparatus further comprises means which can vary a size conversion ratio of a frame in units of frames, and decodes the size conversion ratio information, and storage means for holding the size conversion ratio information, and the determination means comprises a function of determining the reference block of the previous frame corresponding to the block to be decoded of the current frame using the size conversion ratio of the previous frame read out from the storage means.

Alternatively, the apparatus further comprises means which can vary a size conversion ratio of a frame in units of frames, and decodes the size conversion ratio information, and storage means for holding the size conversion ratio information, the determination means comprises a function of determining the reference block of the previous frame corresponding to the block to be decoded of the current frame using the size conversion ratio of the previous frame read out from the storage means, and the prediction means determines a majority label of those of a plurality of reference blocks as the prediction value if there are the plurality of reference blocks.

An up-sampling circuit for up-sampling a block of a binary image which is down-sampled to 1/2N (N=1, 2, 3, . . . ) in both the horizontal and vertical directions, comprises a memory for holding a decoded value near the block, means for obtaining a reference pixel value by down-sampling the decoded value held in the memory to 1/2N in accordance with a down-sampling ratio of the block, and means for up-sampling the block to an original size by repeating a process for up-sampling the block by a factor of 2 in both the horizontal and vertical directions N times, and is characterized in that the up-sampling means always uses a reference pixel value down-sampled to 1/2N.

A video encoding apparatus which divides a rectangle area including an object into blocks each consisting of M×N pixels (M: the number of pixels in the horizontal direction, N: the number of pixels in the vertical direction), and sequentially encodes the rectangle areas in units of the divided blocks in accordance with a predetermined rule so as to encode motion video signals for a plurality of frames obtained as time-series data in units of objects having arbitrary shapes, and which has setting means for setting an area which includes an object and is expressed by a multiple of a block size, division means for dividing the area set by the setting means into blocks, and means for prediction-encoding motion vectors required for making motion estimation/compensation in the divided blocks, comprises a memory for holding a first position vector representing a position, in the frame, of the area in the reference frame, encoding means for encoding a second position vector representing a-position, in the frame, of the area in the reference frame, a motion vector memory for holding motion vectors of decoded blocks near the block to be encoded, and means for predicting a motion vector of the block to be encoded using the motion vectors stored in the motion vector storage means, and is characterized in that when the motion vector memory does not store any motion vectors used in the prediction means, a default motion vector is used as a prediction value, and a difference vector between the first and second position vectors and zero vector are selectively used as the default motion vector.

A video decoding apparatus which decodes motion video signals for a plurality of frames obtained as time-series data in units of objects having arbitrary shapes, and sequentially decodes a rectangle area in units of blocks each consisting of M×N pixels (M: the number of pixels in the horizontal direction, N: the number of pixels in the vertical direction) in accordance with a predetermined rule, comprises means for decoding a prediction-encoded motion vector required for performing motion estimation/compensation in the block, means for decoding a prediction-encoded motion vector required for performing motion estimation/ compensation in a reference frame, a memory for holding a first position vector representing a position, in a frame, of the area in the reference frame, means for decoding a second position vector representing a position, in a frame, of the area in the frame, a motion vector memory for holding motion vectors of corrected blocks near a block to be decoded, and prediction means for predicting a motion vector of the block to be decoded using the motion vectors held in the motion vector memory, and is characterized in that when the motion vector memory does not store any motion vectors used in the prediction means, a default motion vector is used as a prediction value, and one of a difference vector between the first and second position vectors and zero vector is selectively used as the default motion vector.

BRIEF DESCRIPTION OF DRAWINGS

FIGS. 7A and 7B are respectively a view showing the relationship among changing pixels when encoding is done in units of blocks, and a view showing a reference area for detecting b1 (views showing the relationship among changing pixels in block base encoding, and a reference area).

FIG. 11 is a view for explaining a method of determining a context number.

FIGS. 24A and 24B are views for explaining a smoothing process.

FIGS. 28A to 26B are views for explaining an addition process of a reference pixel in the up-sampling process used in the present invention.

FIGS. 43A and 43B are views for explaining a technique associated with the sixth embodiment of the present invention.

FIGS. 44A and 44B are views for explaining a technique associated with the sixth embodiment of the present invention.

FIGS. 46A and 46B are views for explaining a technique associated with the sixth embodiment of the present invention.

FIGS. 50A and 50B are views for explaining the states of changes in video object plane and changes in block position corresponding to shape mode information.

FIGS. 52A to 52D are view for explaining a method of coping with an unlabeled portion formed when a target portion occupied by a video object plane is a portion of a frame.

BEST MODE OF CARRYING OUT THE INVENTION

Embodiments of the present invention will be described hereinafter with reference to the accompanying drawings. Video encoding and decoding apparatuses to which the present invention is applied will first be explained briefly.

Figure 1:
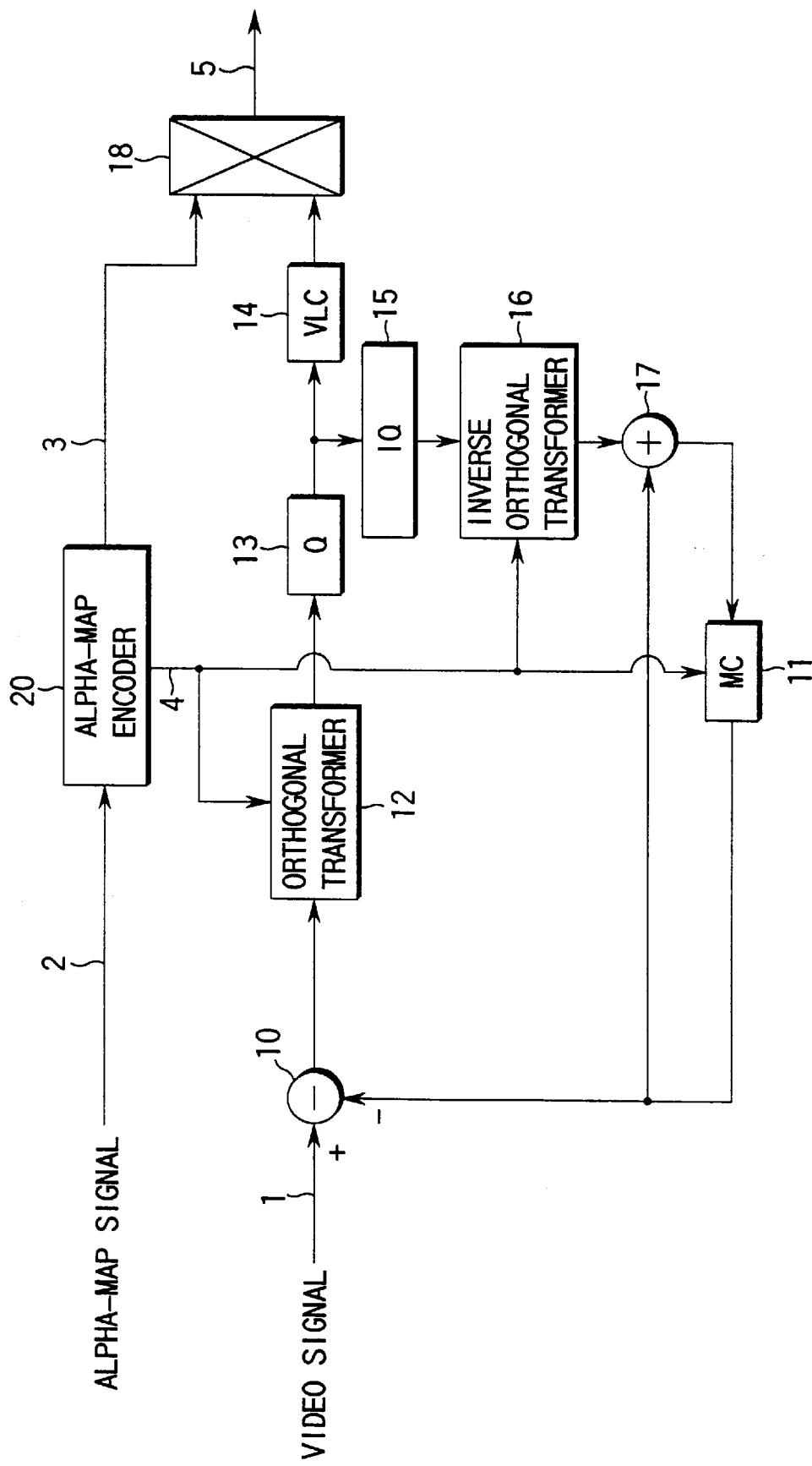
FIG. 1 is a schematic block diagram of an encoding apparatus to which the present invention is applied.

FIG. 1 shows a video encoding apparatus that adopts a scheme of encoding an image by dividing a frame into a background and object. This video encoding apparatus comprises a subtracter 10, motion estimation/compensation circuit (MC) 11, orthogonal transformer 12, quantizer 13, variable length coder (VLC) 14, dequantizer (IQ) 15, inverse orthogonal transformer 16, adder 17, multiplexer 18, and alpha-map encoder 20.

The alpha-map encoder 20 has a function of encoding an input alpha-map signal, and outputting the encoded signal to the multiplexer 18 as an alpha-map signal, and a function of decoding the alpha-map signal and outputting the decoded signal as a local decoded signal.

Especially, the alpha-map encoder 20 of the present invention has a function of executing a process of down-scaling the resolution of an alpha map at a given conversion ratio (magnification) upon encoding an alpha-map signal in units of blocks, encoding the alpha-map signal subjected to the resolution down-scaling process, i.e., the down-sampled alpha-map signal, multiplexing the encoded alpha-map with conversion ratio information (magnification information), and outputting the multiplexed signal to the multiplexer 18 as an alpha-map signal. As the local decoded signal, an alpha-map signal obtained by a process for restoring an alpha-map subjected to the resolution down-scaling process, i.e., the down-sampled alpha-map, to its original resolution is used.

The subtracter 10 calculates a difference signal between a motion estimation/compensation signal supplied from the motion estimation/compensation circuit 11, and an input video signal. The orthogonal transformer 12 transforms the difference signal supplied from the subtracter 10 into an orthogonal transform coefficient in accordance with alpha-map information, and outputs it.

The quantizer 13 is a circuit for quantizing the orthogonal transform coefficient obtained by the orthogonal transformer 12, and the variable length coder 14 encodes and outputs the output from the quantizer 13. The multiplexer 18 multiplexes the signal encoded by the variable length coder 14 and the alpha-map signal together with side information such as motion vector information or the like, and outputs the multiplexed signal as a bit stream.

The dequantizer 15 has a function of dequantizing the output from the quantizer 15, and the inverse orthogonal transformer 16 has a function of inversely transforming the output from the dequantizer 15 on the basis of the alpha-map signal. The adder 17 adds the output from the inverse orthogonal transformer 16 and a prediction signal (motion estimation/compensation signal) supplied from the motion estimation/compensation circuit 11, and outputs the sum signal to the motion estimation/compensation circuit 11.

The motion estimation/compensation circuit 11 has a frame memory, and has a function of storing signals of object and background areas on the basis of the local decoded signal supplied from the alpha-map encoder 20. Also, the motion estimation/compensation circuit 11 has a function of predicting a motion compensation value from the stored image of the object area, and outputs it as a prediction value, and a function of predicting a motion compensation value from the stored image of the background area and outputting it as a prediction value.

The operation of the encoding apparatus with the above-mentioned arrangement will be explained below. The encoding apparatus receives a video signal and an alpha-map signal of that video signal. These signals are divided into blocks each having a predetermined pixel size (e.g., M×N pixels (M: the number of pixels in the horizontal direction, N: the number of pixels in the vertical direction)) in units of frames. Such division process is done by designating addresses on a memory (not shown) for storing a video signal in units of frames and reading out the video signal in units of blocks, in accordance with a known technique. The video signals in units of blocks obtained by the division process are supplied to the subtracter 10 in the block position order via a signal line 1. The subtracter 10 calculates a difference signal between the input (video signal) and a prediction signal (the output motion estimation/compensation signal from the object prediction circuit 11), and supplies it to the orthogonal transformer 12.

The orthogonal transformer 12 transforms the supplied difference signal into an orthogonal transform coefficient in accordance with alpha-map information supplied from the alpha-map encoder 20, and thereafter, the orthogonal transform coefficient is supplied to and quantized by the quantizer 13. The transform coefficient quantized by the quantizer 13 is encoded by the variable length coder 14, and is also supplied to the dequantizer 15.

The transform coefficient supplied to the dequantizer 15 is dequantized, and is then inversely transformed by the inverse orthogonal transformer 16. The inverse transform coefficient is added to a motion estimation/compensation value supplied from the motion estimation/compensation circuit 11 by the adder 17, and the sum signal is output to the motion estimation/compensation circuit 11 again as a local decoded image. The local decoded image as the output from the adder 17 is stored in the frame memory in the motion estimation/compensation circuit 11.

On the other hand, the motion estimation/compensation circuit 11 outputs a "motion estimation/compensation value of an object" at the process timing of the block in the object area or a "motion estimation/compensation value of a background portion" at other timings to the subtracter 10 on the basis of the local decoded signal supplied from the alpha-map encoder 20.

More specifically, the motion estimation/compensation circuit 11 detects based on the local decoded signal of the alpha-map signal whether a video signal corresponding to a block of the object or a video signal corresponding to a block of the background portion is being currently input to the subtracter 10. If the circuit 11 detects the input period of a video signal corresponding to a block of the object, it supplies a motion estimation/compensation signal of the object to the subtracter 10; if the circuit 11 detects the input period of a video signal corresponding to a block of the background portion, it supplies a motion estimation/compensation signal of the background portion to the subtracter 10.

The subtracter 10 calculates the difference between the input video signal and the prediction signal corresponding to the area of that image. As a consequence, the subtracter 10 calculates the difference signal between the prediction value at the corresponding position of the object and the input image if the input image is an image in an area corresponding to the object, or calculates the difference signal between the prediction value corresponding to the background position and the input image if the input image corresponds to that in the background area, and supplies the calculated difference signal to the orthogonal transformer 12.

The orthogonal transformer 12 transforms the supplied difference signal into an orthogonal transform coefficient in accordance with alpha-map information supplied via a signal line 4, and supplies it to the quantizer 13. The orthogonal transform coefficient is quantized by the quantizer 13.

The transform coefficient quantized by the quantizer 13 is encoded by the variable length coder 14, and is also supplied to the dequantizer 15. The transform coefficient supplied to the dequantizer 15 is dequantized, and is then inversely transformed by the inverse orthogonal transformer 16. The inverse transform coefficient is added to the prediction value supplied from the motion estimation/compensation circuit 11 to the adder 17.

The local decoded video signal as the output from the adder 17 is supplied to the motion estimation/compensation circuit 11. The motion estimation/compensation circuit 11 detects based on the local decoded signal of the alpha-map signal whether the adder 17 is currently outputting a signal corresponding to a block of the object or a signal corresponding to a block of the background portion. As a result, if a signal corresponding to a block of the object is being output, the circuit 11 stores the signal in a frame memory for the object; if a signal corresponding to a block of the background portion is being output, the circuit 11 stores the signal in a frame memory For the background. With this process, an object image alone is obtained in the frame memory for the object, and an image of a background image alone is obtained in the frame memory for the background. Hence, the motion estimation/compensation circuit 11 can calculate the prediction value of the object image using the object image, and can also calculate the prediction value of the background image using the image of the background portion.

As described earlier, the alpha-map encoder 20 encodes an input alpha-map and supplies the encoded alpha-map signal to the multiplexer 18 via a signal line 3.

The transform coefficient output from the variable length coder 14 is also supplied to the multiplexer 18 via the line 4. The multiplexer 18 multiplexes the encoded values of the supplied alpha-map signal and transform coefficient with side information such as motion vector information or the like, and outputs the multiplexed signal via a signal line 5 as an encoded bit stream as the final output of the video encoding apparatus.

The arrangement and operation of the encoding apparatus have been described. That is, upon obtaining an error signal of a certain image, this encoding apparatus detects in accordance with the alpha-map if the current block position of the image whose process is in progress corresponds to an object area position or background area position, so as to execute motion estimation/compensation using the object and background images, and calculates the difference using the prediction value obtained from the object image if the current block position of the image which is being processed corresponds-to an object area position or using the prediction value obtained from the background image if the current block position corresponds to a background area position.

In prediction for the object and background, the motion estimation/compensation circuit holds images of the corresponding area portions in accordance with the alpha-map in association with images obtained from the differences, and uses them in prediction. In this way, optimal motion estimation/compensation can be done for the object and background, thus allowing high-quality video compression encoding and decoding.

Figure 2:
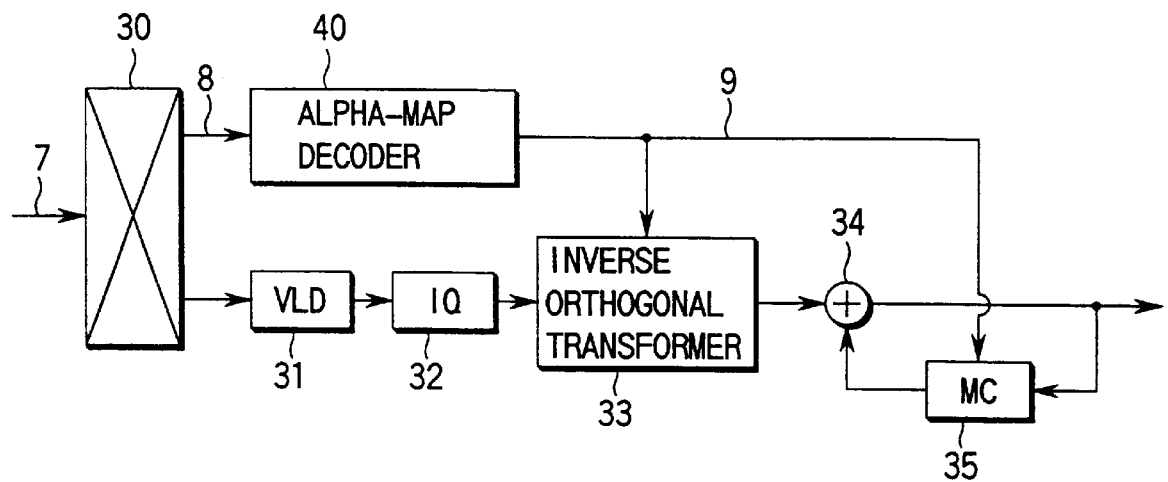
FIG. 2 is a schematic block diagram of a decoding apparatus corresponding to the encoding apparatus shown in FIG. 1.

On the other hand, FIG. 2 is a block diagram of a decoding apparatus that uses the present invention. As shown in FIG. 2, the decoding apparatus comprises a demultiplexer 30, variable length decoder 31, dequantizer 32, inverse orthogonal transform circuit 33, adder 34, motion compensation circuit 35, and alpha-map decoder 40.

The demultiplexer 30 is a circuit for demultiplexing an input encoded bit stream to obtain encoded signals of an alpha-map signal, image, and the like, and the alpha-map decoder 40 is a circuit for decoding the encoded alpha-map signal demultiplexed by this demultiplexer 30.

The variable length decoder 31 is a circuit for decoding the encoded video signal demultiplexed by the demultiplexer 30, and the dequantizer 32 has a function of dequantizing the decoded video signal to an original coefficient. The inverse orthogonal transform circuit 33 has a function of making inverse orthogonal transformation of that coefficient in accordance with the alpha-map to obtain a prediction error signal, and the adder 34 adds the prediction error signal to a motion compensation value from the motion compensation circuit 35 and outputs the sum signal as a decoded video signal. The decoded video signal serves as the final output of the decoding apparatus.

The motion compensation circuit 35 stores the decoded video signal output from the adder 34 in frame memories in accordance with the alpha-map to obtain object and background images, and obtains motion compensation signals of the object and background from the stored images.

In the decoding apparatus with such an arrangement, an encoded bit stream is supplied to the demultiplexer 30 via a line 7, and is demultiplexed by the demultiplexer 30 into various kinds of information, i.e., a code associated with an alpha-map signal and a variable length code of a video signal.

The code associated with the alpha-map signal is supplied to the alpha-map decoder 40 via a signal line 8, and the variable length code of the video signal is supplied to the variable length decoder 31.

The code associated with the alpha-map signal is decoded to an alpha-map signal by the decoder 40, and is output to the inverse orthogonal transformer 33 and the motion compensation circuit 35 via a signal line 9.

On the other hand, the variable length decoder 31 decodes the code supplied from the demultiplexer 30. The decoded transform coefficient is supplied to and dequantized by the dequantizer 32. The dequantized transform coefficient is inversely transformed by the inverse orthogonal transform circuit 33 in accordance with the alpha-map supplied via the line 9, and is supplied to the adder 34. The adder 34 adds the inverse orthogonal-transformed signal from the inverse orthogonal transform circuit 33, and a motion compensation signal supplied from the motion compensation circuit 35,thus obtaining a decoded image.

The outline of the video encoding and decoding apparatuses to which the present invention is applied has been described.

The present invention relates to the alpha-map encoder 20 as the constituting element of the encoding apparatus shown in FIG. 1, and the alpha-map decoder 40 as the constituting element of the decoding apparatus shown in FIG. 2, and its detailed embodiments will be explained below.

The first embodiment will first be described. In this embodiment, when the total number of encoded bits is reduced by preparing for a variable-length coding table (VLC table) that assigns a short code to a symbol that appears frequently upon encoding a symbol which specifies the position of a changing pixel using the variable-length coding table, variable-length coding tables (VLC tables) are adaptively switched in correspondence with the pixel pattern of the already encoded/decoded alpha-map, thereby further reducing the number of encoded bits.

This first embodiment is characterized in that a symbol that specifies the position of a changing pixel is encoded using a variable-length coding table, and variable-length coding tables are switched in correspondence with the pattern of the already encoded alpha-map.

That is, in this embodiment, the number of encoded bits is further reduced by adaptively switching the variable-length coding tables (VLC tables) in correspondence with the pixel pattern of the already encoded/decoded alpha-map.

The arrangement of the alpha-map encoder 20 used in the encoding apparatus shown in FIG. 1 will be explained below with reference to FIG. 3.

The alpha-map encoder 20 comprises resolution conversion circuits (down-sampling circuit) 21 and (up-sampling circuit) 23, binary image encoder 22, and multiplexer 24.

Of these circuits, the resolution conversion circuit 21 is a conversion circuit for scaling down the resolution, and scales down an alpha-map in accordance with the input conversion ratio. On the other hand, the resolution conversion circuit 23 is a conversion circuit for scaling up the resolution, and has a function of up-sampling an alpha-map in accordance with the input conversion ratio.

The resolution conversion circuit 23 is arranged for restoring the alpha-map down-sampled by the resolution conversion circuit 21 to an original size, and the alpha-map restored to the original size by the resolution conversion circuit 23 serves as an alpha-map local decoded signal to be supplied to the orthogonal transformer 12 and the inverse orthogonal transformer 16 via the signal line 4.

The binary image encoder 22 has a function of making binary image encoding of the down-sampled alpha-map signal output from the resolution conversion circuit 21 and outputting the encoded signal, and the multiplexer 24 multiplexes and outputs the binary image encoded output and conversion ratio information input via a signal line 6.

In the alpha-map encoder 20 with the above-mentioned arrangement, an alpha-map signal input via an alpha-map signal line 2 is down-sampled by the resolution conversion circuit 21 at the designated conversion ratio, and the down-sampled signal is encoded. The down-sampled and encoded alpha-map signal is output via the signal line 3. Also, a local decoded signal obtained by up-sampling the down-sampled and encoded alpha-map signal to its original resolution by the resolution conversion circuit 23 is output to the orthogonal transformer 12 and inverse orthogonal transformer 16 shown in FIG. 1 via the signal line 4.

More specifically, by supplying setting information of a desired size conversion ratio to the alpha-map encoder 20 via the signal line 6, the trade-off can be attained.

The size conversion ratio supplied via the signal line 6 is supplied to the resolution conversion circuits 21 and 23 and the binary image encoder 22, and can control the number of encoded bits of the alpha-map signal. The size conversion ratio code supplied via the signal line 6 is multiplexed by the encoded alpha-map signal by the multiplexer 24, and the multiplexed signal is output via the signal line 3. The output signal is supplied to the multiplexer 18 as the final output stage of the video encoding apparatus as the encoded alpha-map signal.

The alpha-map decoder 40 used in the decoding apparatus shown in FIG. 2 will be described below with reference to FIG. 4.

Figure 4:
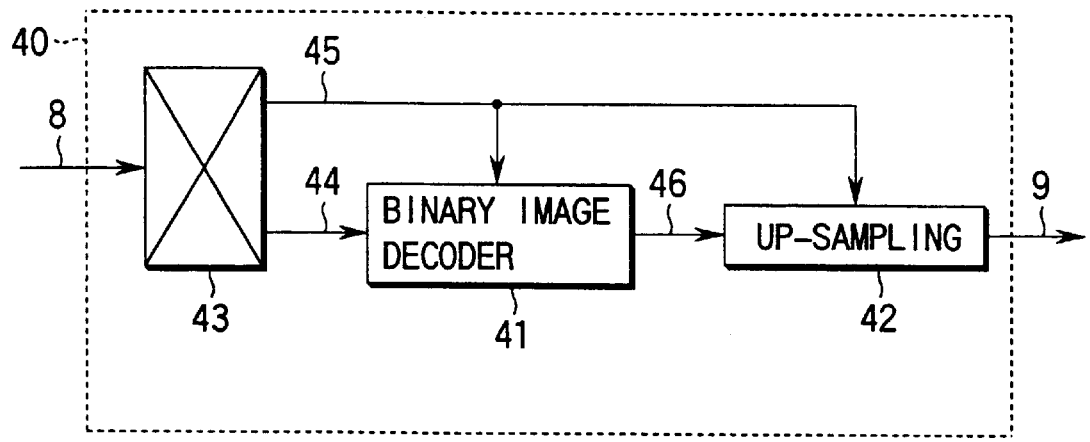
FIG. 4 is a block diagram showing the arrangement of an alpha-map decoder applied to a decoding apparatus corresponding to the encoding apparatus shown in FIG. 3.

As shown in FIG. 4, the alpha-map decoder 40 comprises a binary image decoder 41, resolution conversion circuit 42, and demultiplexer 43. The demultiplexer 43 is a circuit for demultiplexing the alpha-map signal which is demultiplexed by the demultiplexer 30 in the video decoding apparatus shown in FIG. 2 and is input to the alpha-map decoder 40 into codes of the alpha-map signal and size conversion ratio (a setting information signal of the size conversion ratio). The binary image decoder 41 is a circuit for decoding the code of the alpha-map signal to a binary image in accordance with the code of the size conversion ratio demultiplexed by and supplied from the demultiplexer 43. The resolution conversion circuit 42 up-samples the binary image in accordance with the size conversion ratio code demultiplexed by and supplied from the demultiplexer 43.

In FIG. 4, the code supplied to the alpha-map decoder 40 via the signal line 8 is demultiplexed into codes of an alpha-map signal and size conversion ratio by the demultiplexer 43, and these codes are respectively output via signal lines 44 and 45.

The binary image decoder 41 decodes the down-scaled alpha-map signal from the code of the alpha-map signal supplied via the signal line 44 and the code of the size conversion ratio supplied via the signal line 45, and supplies the decoded down-sampled alpha-map signal to the resolution conversion circuit 42 via a signal line 46. The resolution conversion circuit 42 up-samples the down-sampled alpha-map signal to its original size based on the code of the size conversion ratio supplied via the signal line 45, and outputs it via the signal line 9.

Figure 3:
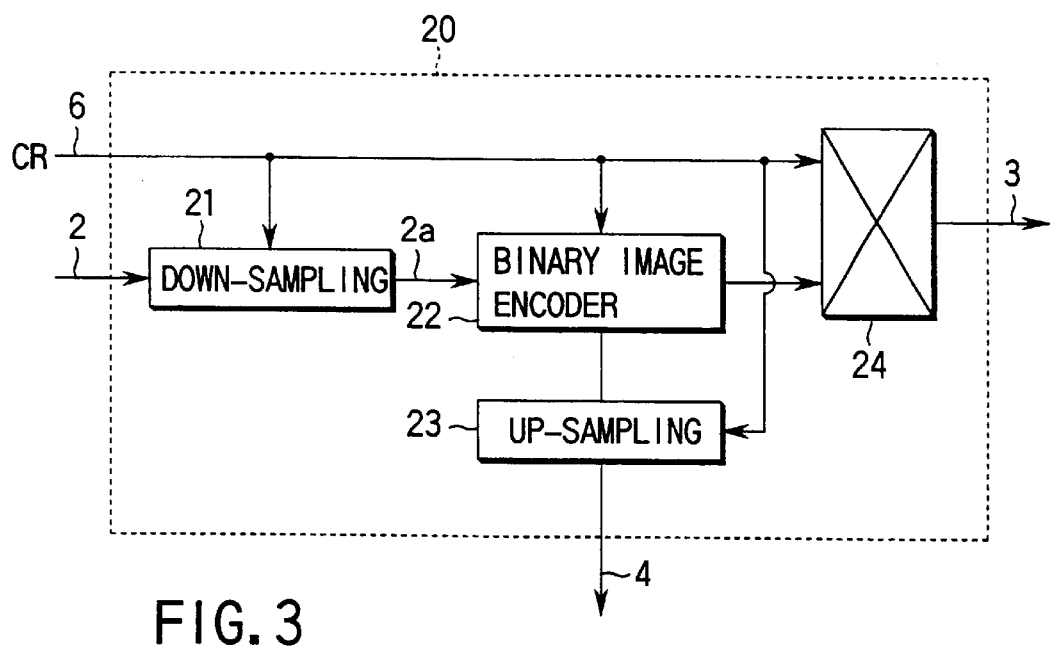
FIG. 3 is a block diagram of an alpha-map encoder of an encoding apparatus to which the present invention is applied.
Figure 5:
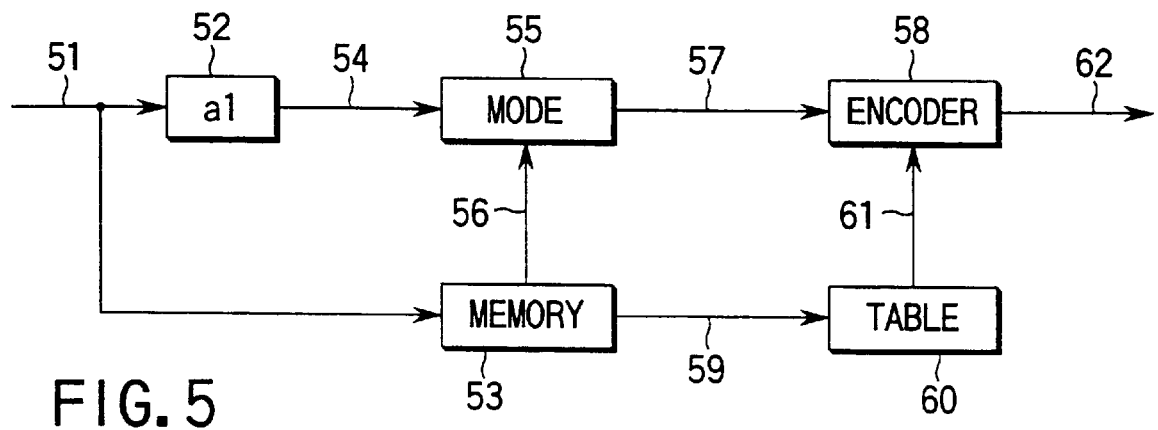
FIG. 5 is a block diagram of an encoder according to the first embodiment of the present invention.

FIG. 5 shows the alpha-map encoder 20 in FIG. 1 or the binary image encoder 22 shown in FIG. 3 in more detail.

An alpha-map signal 51 is input to an a1 detection circuit 52 and a memory 53 which holds the encoded alpha-map. The a1 detection circuit 52 detects the position of a changing pixel a1, as shown in FIGS. 7A and 7B, and outputs a position signal 54.

More specifically, FIG. 7A is a view showing the relationship among changing pixels when an alpha-map signal is encoded in units of blocks (e.g., in units of M×N pixel blocks (M: the number of pixels in the horizontal direction, N: the number of pixels in the vertical direction)). FIG. 7B is a view showing a reference area used for detecting a reference changing pixel b1.

In block base encoding, the changing pixel may be simplified and encoded as follows. Note that the following process may switch the scan order or may be applied to down-sampled blocks. Encoding of the simplified changing pixel is done as follows.

Let abs_ai (i=0 to 1) and abs_b1 respectively represent addresses (or pixel order) of changing pixels ai (i=0 to 1) and b1, which are obtained in the raster order from the upper left corner of the frame, and a0_line represent a line to which a changing pixel a0 belongs. Then, the values of a0_line, r_ai (i=0 to 1), and r_b1 are obtained by the following equations:

$$a0\_line=(int)\ ((abs\_a0+WIDTH)/WIDTH)-1$$

$$r\_a0=abs\_a0-a0\_line*WIDTH$$

$$r\_a1=abs\_a1-a0\_line*WIDTH$$

$$r\_b1=abs\_b1-(a0\_line-1)*WIDTH$$

In the above equations, * indicates a multiplication, (int)(X) indicates rounding off digits after the decimal point of X, and WIDTH indicates the number of pixels of a block in the horizontal direction. By encoding the value of a relative address "r_a1−r_b1" or "r_a1−r_a0" of the changing pixel, a decoded value is obtained. In this manner, the position of the changing pixel a1 is detected.

As mentioned previously, information of the position 54 detected by the a1 detection circuit 52 is supplied to a shape mode determination circuit 55. At the same time, the memory 53 supplies a position signal 56 of the reference changing pixel b1 to the shape mode determination circuit 55.

Figure 8:
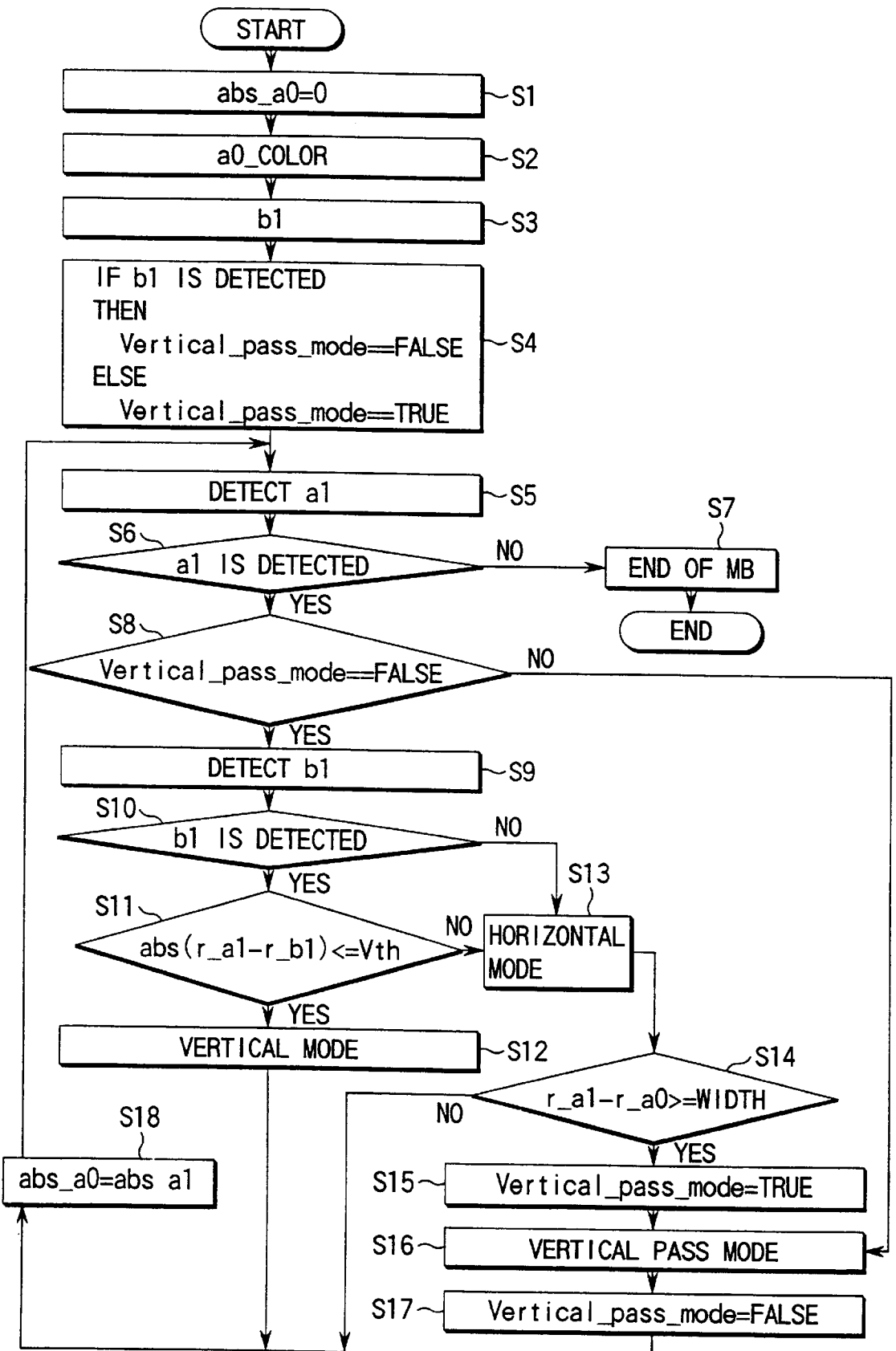
FIG. 8 is a flow chart when MMR is done by block base encoding.

The shape mode determination circuit 55 determines the shape mode in accordance with an algorithm shown in FIG. 8, and the determined shape mode is supplied as a symbol 57 to be encoded to an encoder 58.

More specifically, the position of the start point changing pixel is initialized (S1), and the pixel value at an initial position (upper left pixel in a block) is encoded by 1 bit (S2). Subsequently, the reference changing pixel b1 is detected at the initial position (S3).

If the reference changing pixel b1 is not detected, since no changing pixels are present in a reference area, a vertical mode cannot be used. Hence, the status of a vertical pass mode is set at "TRUE". On the other hand, if b1 is detected, since the vertical mode can be used, the status of the vertical pass mode is set at "FALSE".

With the above processes, the initial state has been set, and the control enters an encoding loop process.

The changing pixel a1 is detected (S5), and it is checked if the changing pixel a1 is detected (S6). If the changing pixel al is not detected, since no subsequent changing pixels are present, an encoding process end code (EOMB; End of MB) indicating the end of encoding is encoded (S7).

As a result of checking in step S6, if the changing pixel al is detected, the status of the vertical pass mode is checked (S8). If the status of the vertical pass mode is "TRUE", an encoding process is done in the vertical pass mode (S16); if the status of the vertical pass mode is "FALSE", b1 is detected (S9).

It is then checked if b1 is detected (S10). If the reference changing pixel b1 is not detected, the flow advances to the step of a horizontal mode (S13); if the reference changing pixel b1 is detected, it is checked if the absolute value of "r_a1-r_b1" is larger than a threshold value (VTH) (S11). As a result, if the absolute value is equal to or smaller than the threshold value (VTH), the flow advances to the step of the vertical mode (S12); if the absolute value is larger than the threshold value (VTH), the flow advances to the step of the horizontal mode (S13).

In the step of the horizontal mode (S13), the value "r_a1-r_a0" is encoded. It is then checked if the value "r_a1-r_a0" is smaller than "WIDTH" (S14). If the value is equal to or larger than "WIDTH", the status of the vertical pass mode is set at "TRUE" (S15), and the flow advances to the step of the vertical pass mode (S16). Upon completion of the step of the vertical pass mode (S16), the status of the vertical pass mode is set at "FALSE".

Upon completion of one of the vertical mode, horizontal mode, and vertical pass mode (after completion of encoding up to a1), the position of a1 is set as a new position of a0 (S18), and the flow returns to the process in step S5.

When the shape mode is determined in this way, the memory 53 supplies a pattern 59 around the encoded reference changing pixel b1 to a table determination circuit 60. The table determination circuit 60 selects one of a plurality of variable length coding tables, and outputs the selected table.

Figure 9:
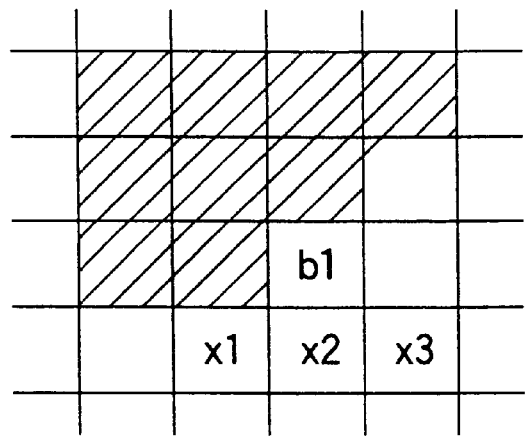
FIG. 9 is a view for explaining the effects of the encoder shown in FIG. 5, and showing an example of the state around a changing pixel b1.

In this case, for example, as shown in FIG. 9, if an edge extends from an upper right position to a lower left position above the reference change pixel b1, since the same edge often linearly extends to a position below the reference changing pixel b1, a1 is likely to be present at x1 among pixels x1, x2, and x3.

For this reason, when such pattern is present above the reference changing pixel b1, a table in which a short code is assigned to VL1 (r_a1-r_b1=-1) is used.

Figure 10:
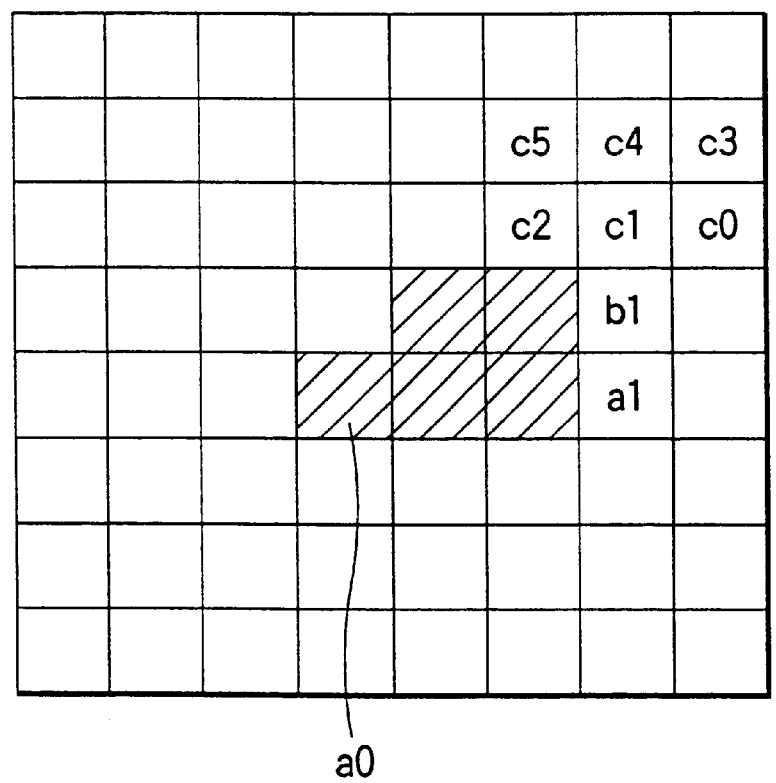
FIG. 10 is a view for explaining the effects of the decoder shown in FIG. 6, and showing an example of a reference pixel.

A table determination method will be described below with reference to FIGS. 10 and 11. In this case, c0 to c5 in two lines above the reference changing pixel b1 shown in FIG. 10 are considered. If each of these pixels has the same value as the reference changing pixel b1, "1" is set; if it has a difference value, "0" is set, and "0" and "1" are arranged in the order of c0 to c5, as shown in FIG. 11.

A numerical value obtained by converting this binary value into a decimal value will be referred to as a context number hereinafter. In correspondence with the individual context numbers, variable-length coding tables are prepared, for example, as follows:

| [When context number = 0] | |
|---|---|
| V0 | 1 |
| VL1 | 010 |
| VR1 | 011 |
| VL2 | 000010 |
| VR2 | 000011 |
| EOMB | 0001 |
| H | 001 |
| [When context number = 1] | |
| V0 | 010 |
| VL1 | 1 |
| VR1 | 000010 |
| VL2 | 011 |
| VR2 | 000011 |
| EOMB | 0001 |
| H | 001 |

[When context number=2]
The rest is omitted.
In these tables,
VL1 represents r_a1-r_b1=-1,
VL2 represents r_a1-r_b1=-2,
VR1 represents r_a1-r_b1=-1, and
VR2 represents r_a1-r_b1=2.

In FIG. 9, since the context number=1 is obtained, a table in which VL1 above can be encoded by 1 bit is selected.

The description will continue referring back to FIG. 5. The encoder 58 determines a code 62 using a selected table 11 sent from the table determination circuit 60, and outputs the determined code 62.

Figure 6:
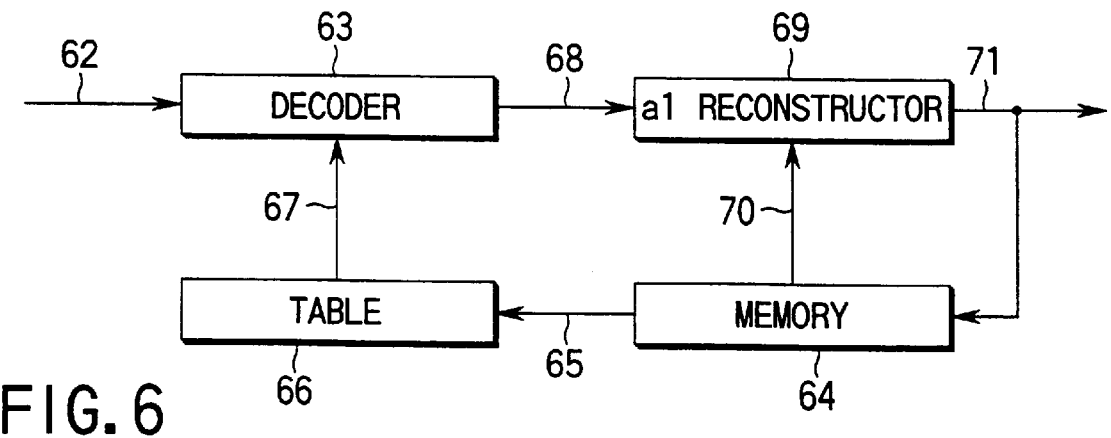
FIG. 6 is a block diagram of a decoder corresponding to the encoding circuit shown in FIG. 5.

FIG. 6 is a block diagram showing the alpha-map decoder 40 as the constituting element of the decoding apparatus shown in FIG. 2 or the binary image decoder 41 as the constituting element of the decoding apparatus shown in FIG. 4 in more detail. This decoder decodes the code 62 generated in the embodiment shown in FIG. 5.

The code 62 is input to a decoder 63. A memory 64 holds alpha-maps decoded so far, and a pattern 65 around the reference changing pixel b1 is sent to a table determination circuit 66.

The table determination circuit 66 selects one of a plurality of variable-length coding tables, and sends it as a selected table 67 to the decoder 63. The table determination algorithm is the same as that in a table determination circuit 70 shown in FIG. 5.

A symbol 68 is decoded using the table 67, and is supplied to an a1 decoding circuit 69. The a1 decoding circuit 69 obtains the position of a1 on the basis of the symbol 68 and a position 70 of b1 supplied from the memory 64, and decodes an alpha-map 71 up to a1. The decoded alpha-map 71 is output, and is held in a memory 64 for future decoding.

As described above, in the first embodiment, a plurality of predetermined variable-length coding tables are switched. The second embodiment which dynamically corrects the table used in accordance with the frequencies of actually generated symbols will be explained below with the aid of FIG. 12.

Figure 12:
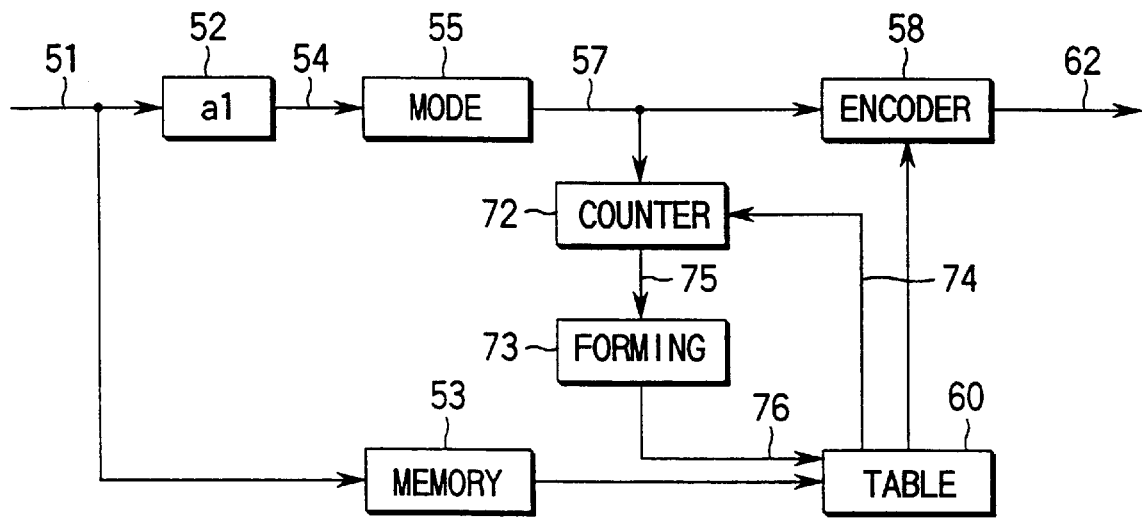
FIG. 12 is a block diagram of an encoder according to the second embodiment of the present invention.

The first embodiment is directed to the apparatus for switching a plurality of predetermined variable-length coding tables. FIG. 12 shows an embodiment that dynamically corrects the table in accordance with the frequencies of actually generated symbols. This embodiment has an arrangement in which a counter 72 and a Hoffman table forming circuit 73 is added to the encoding apparatus of the first embodiment shown in FIG. 5.

The counter 72 receives a symbol 57 from the shape mode determination circuit 55 and a context number 74 from the table determination circuit 60. The counter 72 holds the frequencies of symbols in units of context numbers. A predetermined time after this holding, a frequency 75 of each symbol is supplied to the Huffman table forming circuit 73 in units of context numbers. The Huffman table forming circuit 73 forms an encoding table 76 based on Huffman encoding (Fujita, "Basic Information Theory", Shokodo, pp. 52–53, 1987). The table 76 is supplied to the table determination circuit 60, and replaces the table with the corresponding context number. The formation and replacement of Huffman tables are done for all the context numbers.

Figure 13:
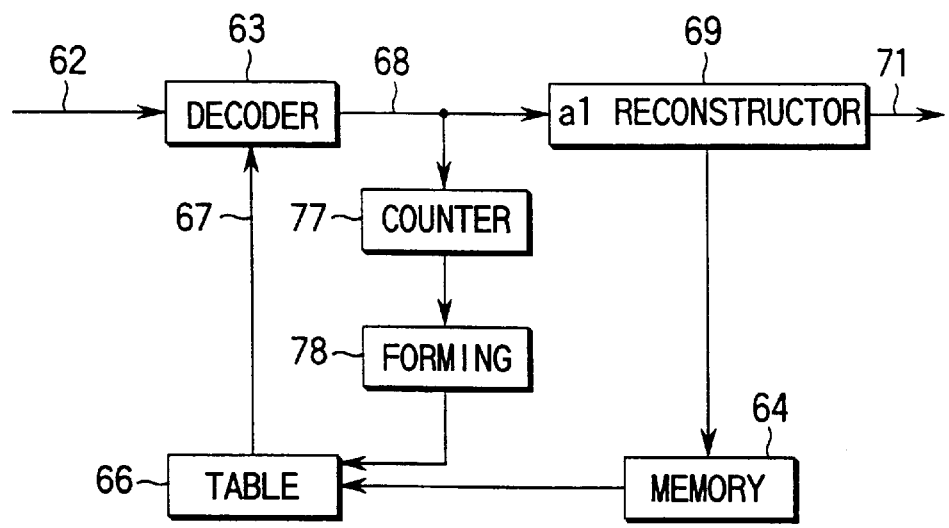
FIG. 13 is a block diagram of a decoder corresponding to the encoder shown in FIG. 12.

FIG. 13 shows a decoder for decoding a code generated by the encoder shown in FIG. 12. The decoding apparatus of the second embodiment shown in FIG. 13 also has an arrangement in which a counter 77 and a Huffman table forming circuit 78 are added to the decoding apparatus of the first embodiment shown in FIG. 6.

The operations of the counter 77 and Huffman table forming circuit 78 are the same as those in FIG. 12.

As described above, the first and second embodiments are characterized in that a plurality of types of variable-length coding tables are prepared, and are switched in accordance with the pattern of the already encoded alpha-map in encoding/decoding that reduces the number of encoded bits by encoding a symbol which specifies the position of a changing pixel using a variable-length coding table. According to the present invention described above, the number of encoded bits of the alpha-map can be further reduced.

An embodiment that obtains a reference changing pixel for relative address encoding not from a pixel value in a block consisting of M×N pixels (M: the number of pixels in the horizontal direction, N: the number of pixels in the vertical direction) but from a motion estimation/compensation signal will be described below as the third embodiment.

Figure 14:
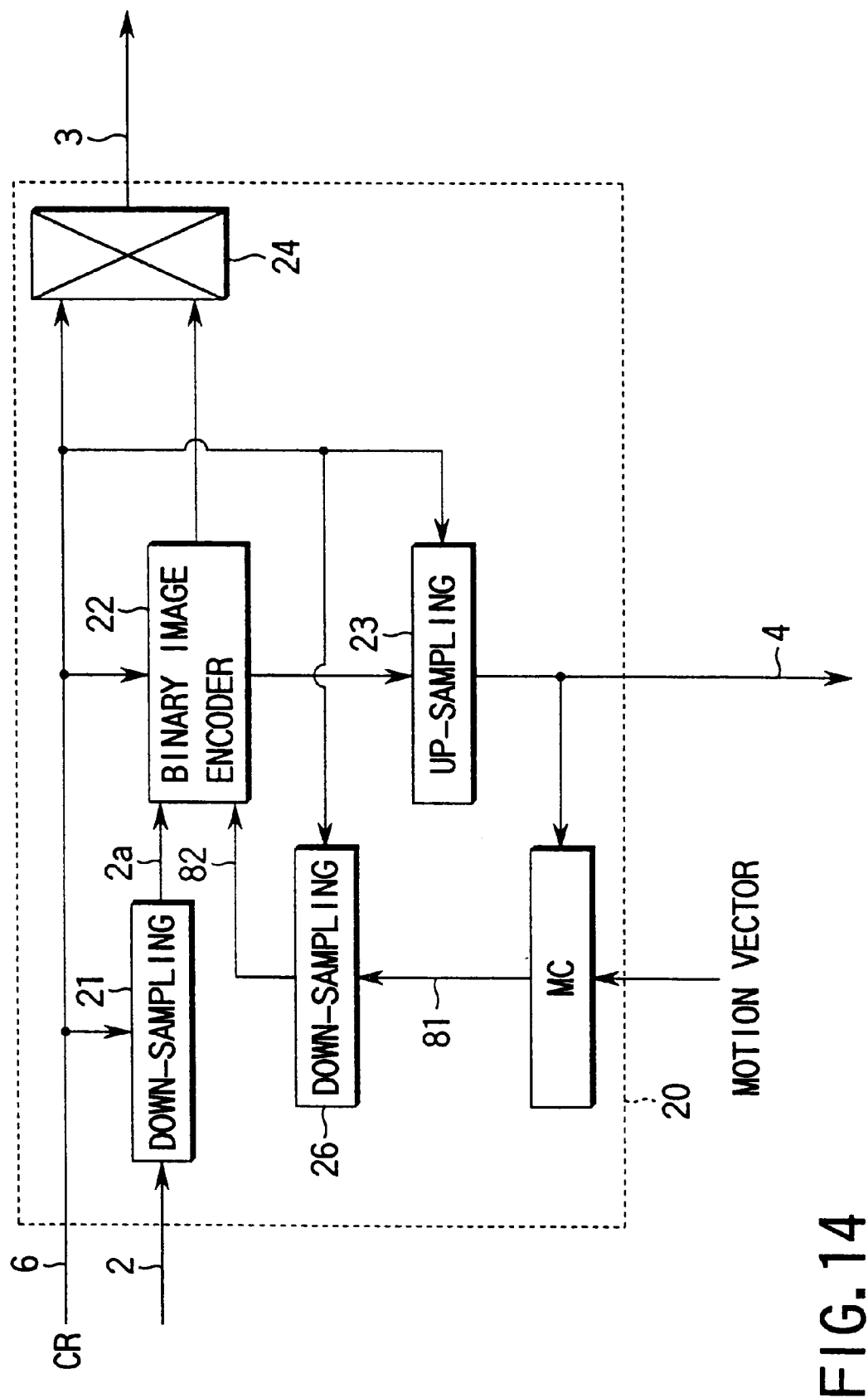
FIG. 14 is a block diagram of an encoder according to the third embodiment of the present invention.
Figure 15:
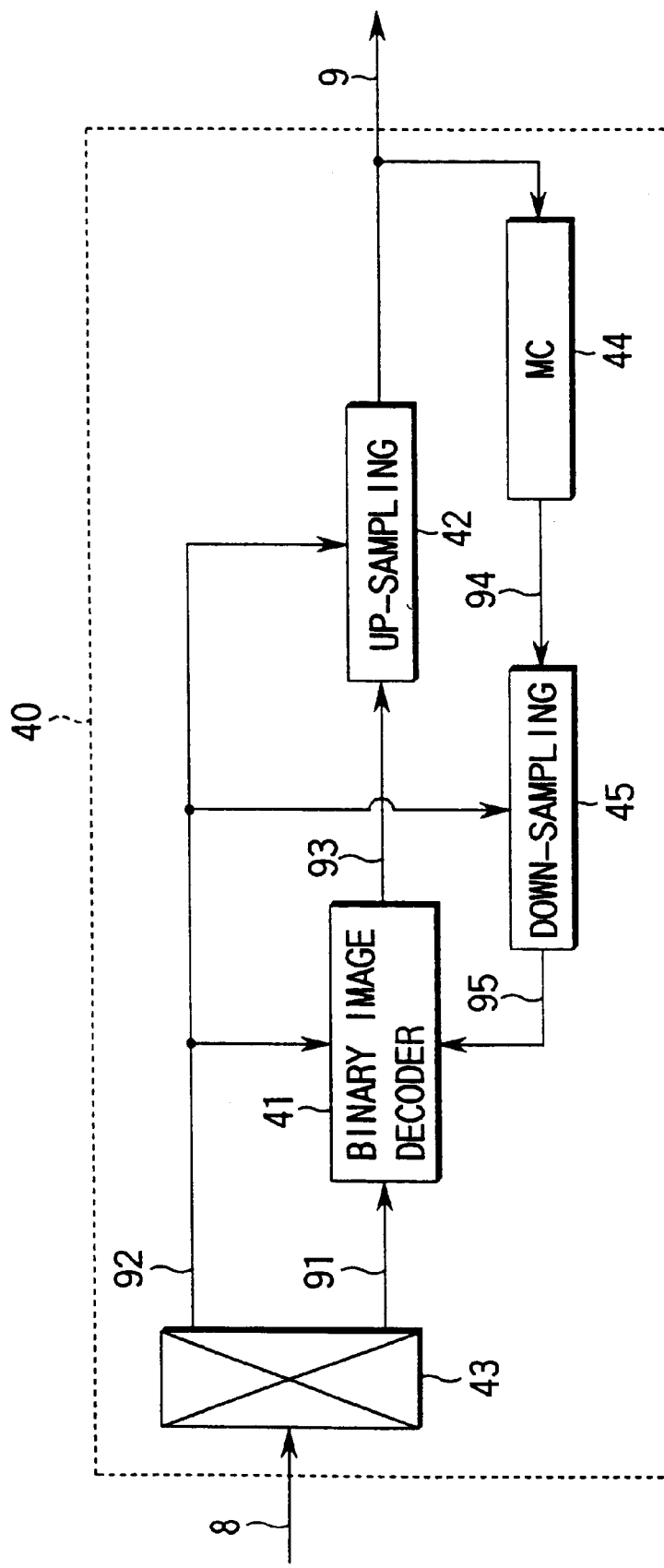
FIG. 15 is a block diagram of a decoder corresponding to the encoding circuit shown in FIG. 14.

FIG. 14 is a block diagram for explaining an alpha-map encoder according to the third embodiment. FIG. 15 is a block diagram for explaining an alpha-map decoder according to the third embodiment.

An alpha-map encoder 20 and alpha-map decoder 40 of the present invention will be described below with the aid of FIGS. 14 and 15, and FIGS. 16A and 16B.

In the third embodiment, as shown in FIG. 14, the alpha-map encoder 20 comprises a resolution conversion circuit (down-sampling circuit) 21, a resolution conversion circuit (up-sampling circuit) 23, a binary image encoding circuit, for example, a block-based MMR encoder 22, a multiplexer 24, a motion estimation/compensation circuit 25, and a down-sampling circuit 26.

Of these circuits, the resolution conversion circuit 21 is a conversion circuit for down-sampling, and encodes an alpha-map signal at a down-sampling ratio in accordance with an input setting information signal of a size conversion ratio. The resolution conversion circuit 23 is a conversion circuit for up-sampling, and has a function of encoding an alpha-map at an up-sampling ratio in accordance with an input up-sampling ratio.

The resolution conversion circuit 23 is arranged for up-sampling the alpha-map down-sampled by the resolution conversion circuit 21 to its original size, and the alpha-map up-sampled by the resolution conversion circuit 23 serves as an alpha-map local decoded signal which is to be input to the orthogonal transformer 12 and inverse orthogonal transformer 16 shown in FIG. 1 via a signal line 4.

The binary image encoding circuit 22 is a circuit for making binary image encoding of the down-sampled alpha-map signal output from the resolution conversion circuit 21, and outputting the encoded signal. As will be described in detail later, the circuit 22 encodes the alpha-map signal using the down-sampled motion estimation/compensation signal of the alpha-map supplied from the resolution conversion circuit 26 for down-sampling via a signal line 82. The multiplexer 24 multiplexes the binary image encoded output and up-sampling ratio information, and outputs the multiplexed signal.

The arrangement of the encoder in the third embodiment is different from the circuit arrangement shown in FIG. 3 in that it comprises the motion estimation/compensation circuit 25 and the resolution conversion circuit 26 for down-sampling. The motion estimation/compensation circuit 25 has a frame memory for storing a decoded image of the previously encoded frame, and can store a decoded signal supplied from the up-sampling circuit 23. Furthermore, the motion estimation/compensation circuit 25 receives a motion vector signal (not shown), generates a motion estimation/compensation signal in accordance with this motion vector signal, and supplies it to the resolution conversion circuit 26 for down-sampling via a signal line 81.

The resolution conversion circuit 26 for down-sampling down-samples the motion compensation signal supplied from the motion estimation/compensation circuit 25 via the signal line 81 in accordance with a setting information signal of a size conversion ratio supplied via a signal line 6, and outputs it to the binary image encoding circuit 22 via a signal line 82.

When the binary image encoding circuit 22 is arranged, it encodes the down-sampled alpha-map signal supplied from the resolution conversion circuit 21 via a signal line 2a to a binary image, and outputs the binary image.

In the alpha-map encoder 20 with the above-mentioned arrangement, the setting information signal of the size conversion ratio supplied via the signal line 6 is supplied to the resolution conversion circuits 21, 23, and 26, and the binary image encoding circuit 22 to control the number of encoded bits of an alpha-map signal. The code (setting information signal) of the size conversion ratio is multiplexed with the encoded alpha-map signal by the multiplexer 24, and the multiplexed signal is output via a signal line 3. The multiplexed signal is supplied as an encoded alpha-map signal to the multiplexer 18 shown in FIG. 1 as the final output stage of the video encoding apparatus.

In the alpha-map encoder 20, the resolution conversion circuit 21 down-samples an alpha-map signal input via the alpha-map input line 2 in accordance with setting information of a desired size conversion ratio input via the signal line 6, and supplies the down-sampled alpha-map signal to the binary image encoding circuit 22.

The binary image encoding circuit 22 encodes the down-sampled alpha-map signal obtained from the resolution conversion circuit 21 using the down-sampled motion estimation/compensation signal of the alpha-map signal supplied from the resolution conversion circuit 25 for down-sampling via the signal line 82, and supplies the encoded signal as a binary image encoded output to the multiplexer 24 and the resolution conversion circuit 23. The multiplexer 24 multiplexes the encoded alpha-map signal as the binary image encoded output, and the information of the up-sampling ratio supplied via the signal line 6, and outputs the multiplexed signal onto the signal line 3.

On the other hand, the resolution conversion circuit 23 decodes the down-sampled/encoded alpha-map signal (binary image encoded output) supplied from the binary image encoding circuit 22 to an alpha-map signal of the original resolution in accordance with the setting information signal of the size conversion ratio obtained via the signal line 6, and outputs the decoded signal as a local decoded signal to the motion estimation/compensation circuit 25, and the orthogonal transformer 12 and inverse orthogonal transformer 16 shown in FIG. 1 via the signal line 4.

The motion estimation/compensation circuit 25 has a frame memory, which stores a previous encoded video frame signal supplied from the resolution conversion circuit 23 for up-sampling. The motion estimation/compensation circuit 25 generates a motion estimation/compensation signal of the alpha-map in accordance with a separately supplied motion vector signal, and supplies it to the resolution conversion circuit 26 for down-sampling via the signal line 81. The resolution conversion circuit 26 down-samples the supplied motion estimation/compensation signal in accordance with the setting information signal of the size conversion ratio obtained via the signal line 6, and supplies it to the binary image encoding circuit 22.

The binary image encoding circuit 22 encodes the down-sampled alpha-map signal obtained from the resolution circuit 21 using the down-sampled motion estimation/compensation signal of the alpha-map supplied from the resolution conversion circuit 26 for down-sampling.

The outline of the alpha-map encoder of the third embodiment has been described. The alpha-map decoder will be described below.

As shown in FIG. 15, the alpha-map decoder 40 of this embodiment comprises a binary image decoding circuit 41, resolution conversion circuit (up-sampling circuit) 42, demultiplexer 43, motion estimation/compensation circuit 44, and resolution conversion circuit (down-sampling circuit) 45.

Of these circuits, the demultiplexer 43 is a circuit for demultiplexing an alpha-map signal, which is demultiplexed by the demultiplexer 30 in the video decoding apparatus shown in FIG. 2 and is input to the alpha-map decoder 40, into codes of an alpha-map signal and size conversion ratio. The binary image decoding circuit 41 is a circuit for decoding the code of the alpha-map signal to a binary image in accordance with the code of the size conversion ratio (the setting information signal of the size conversion ratio) demultiplexed by and supplied from the demultiplexer 43. As will be described in detail later, the circuit 41 decodes the code using the down-sampled motion estimation/compensation signal of the alpha-map supplied from the resolution conversion circuit 45 via a signal line 95.

The resolution conversion circuit 42 for up-sampling up-samples a binary image as the code of the alpha-map signal from the binary image decoding circuit 41 in accordance with the code of the size conversion ratio (the setting information signal of the size conversion ratio) demultiplexed by and supplied from the demultiplexer 43, and outputs the up-sampled signal.

The arrangement of the decoder in the third embodiment is different from the decoder shown in FIG. 4 in that it comprises the motion estimation/compensation circuit 44 and resolution conversion circuit 45 for down-sampling. The motion estimation/compensation circuit 44 has a frame memory for storing a decoded image of the previously decoded frame, and stores a decoded signal supplied form the resolution conversion circuit 42 for up-sampling. Also, the circuit 44 receives a motion vector signal (not shown), generates a motion estimation/compensation signal in accordance with this motion vector signal, and supplies it to the resolution conversion circuit 45 for down-sampling via a signal line 94.

The resolution conversion circuit 45 down-samples this motion estimation/compensation signal in accordance with the setting information signal of the size conversion ratio supplied via a signal line 92, and outputs it to the binary image decoding circuit 41 via the signal line 95.

In the alpha-map decoder 40 with the above-mentioned arrangement, a code supplied to the alpha-map decoder 40 via a signal line 8 is demultiplexed into codes of an alpha-map signal and size conversion ratio by the demultiplexer 43, and these codes are respectively output via a signal line 91 and the signal line 92.

As will be described in detail later, the binary image decoding circuit 41 decodes the down-sampled alpha-map signal by performing a decoding process for obtaining a binary image in accordance with the code of the alpha-map signal supplied via the signal line 91 and the code of the size conversion ratio (the setting information signal of the size conversion ratio) supplied via the signal line 92 using the down-sampled motion estimation/compensation signal of the alpha-map supplied from the resolution conversion circuit 45 for down-sampling via the signal line 95, and supplies the decoded image to the resolution conversion circuit 42 via a signal line 93.

The resolution conversion circuit 42 up-samples the down-sampled alpha-map signal decoded by the binary image decoding circuit 41 on the basis of the code of the size conversion ratio supplied via the signal line 92 so as to decode an alpha-map signal, and outputs the alpha-map signal via a signal line 9.

That is, the resolution conversion circuit 42 decodes the down-sampled alpha-map signal (binary image encoded output) supplied from the binary image decoding circuit 41 in accordance with the setting information signal of the size conversion ratio obtained via the signal line 92 so as to obtain a local decoded signal, and outputs the obtained local decoded signal to the motion estimation/compensation circuit 44.

On the other hand, the motion estimation/compensation circuit 44 has a frame memory, which stores a decoded image of the previously encoded frame, supplied from the resolution conversion circuit 42 for up-sampling. The motion estimation/compensation circuit 44 generates a motion estimation/compensation signal of an alpha-map in accordance with a separately supplied motion vector signal, and supplies it to the resolution conversion circuit 45 for down-sampling via the signal line 94. The resolution conversion circuit 45 down-samples the supplied motion estimation/compensation signal in accordance with the setting information signal of the size conversion ratio obtained via the signal line 92, and supplies it to the binary image decoding circuit 41.

The binary image decoding circuit 41 decodes the alpha-map signal from the demultiplexer 43 in accordance with the setting information signal of the size conversion ratio from the demultiplexer 43 using the down-sampled motion estimation/compensation signal of the alpha-map supplied from the resolution conversion circuit 45 for down-sampling.

This concludes the description concerning the outline of the decoder to which the present invention is applied.

As has already been described above, the arrangement of the encoder in the third embodiment according to the present invention is different from that of the encoder of FIG. 3 in that it comprises the motion estimation/compensation circuit 25 and down-sampling circuit 26, and the arrangement of the decoder is different from that of the decoder shown in FIG. 4 in that it comprises the motion estimation/compensation circuit and the down-sampling circuit 45.

The motion estimation/compensation circuit 25 or 44 has a frame memory for storing a decoded image of the previously encoded frame, and stores a decoded signal supplied from the up-sampling circuit 23 or 42. Furthermore, the motion estimation/compensation circuit 25 or 44 receives a motion vector signal (not shown), generates a motion estimation/compensation signal in accordance with the received motion vector signal, and supplies that signal to the down-sampling circuit 26 or 45 via the signal line 81 or 94.

As the motion vector signal, a motion vector signal used in the motion estimation/compensation circuit 11 or 35 arranged in the apparatuses shown in FIGS. 1 and 2 may be used, and an alpha-map motion vector detection circuit may be arranged in the alpha-map encoder 20 to obtain an alpha-map motion vector signal.

More specifically, since various methods of obtaining a motion vector signal to be supplied to the motion estimation/compensation circuit 25 or 44 are known, and are not related to the present invention, a detailed description thereof will be omitted here.

The down-sampling circuit 26 or 45 down-samples a motion compensation signal supplied via the signal lines 81 and 94 in accordance with the setting information signal of the size conversion ratio supplied via the signal lines 6 and 92, and outputs the down-sampled signal via the signal lines 42 and 92.

When the binary image encoder 22 is to be arranged, a down-sampled alpha-map signal supplied via a signal line 2a is subjected to binary image encoding and is output.

Note that the binary image encoder 22 according to this embodiment is fundamentally different from the encoder shown in FIG. 3 in that it has a function of encoding using a down-sampled alpha-map motion estimation/compensation signal supplied via the signal line 82.

This difference will be described in detail below.

Figure 16A:
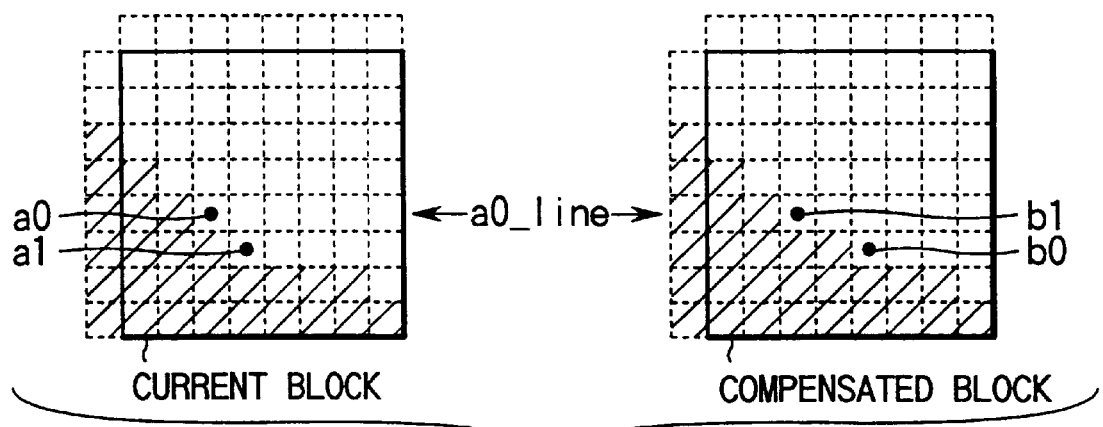
FIGS. 16A and 16B are views for explaining the third embodiment of the present invention, and views for explaining a changing pixel detection circuit in inter-frame encoding.
Figure 16B:
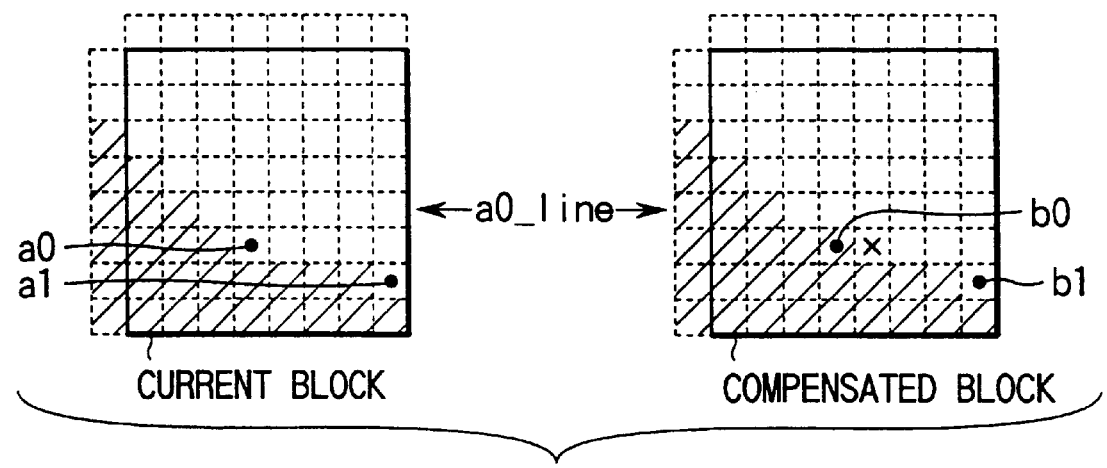

FIGS. 16A and 16B are views for explaining a method of encoding using a motion estimation/compensation signal, and show one of divided N×M pixel image blocks in an image in units of frame images.

In FIGS. 16A and 16B, "current block" is a block to be processed, i.e., the block of the input current image to be processed. On the other hand, "compensated block" is a compensation block, i.e., the block of the previously processed image.

In the first embodiment, a reference changing pixel b1 on a block of an alpha-map corresponding to that of the current image to be processed is detected in the same "current block" as that from which changing pixels a0 and a1 are detected.

On the other hand, in the third embodiment shown in FIGS. 14 and 15, the reference changing pixel b1 is detected from the "compensated block" as the motion estimation/compensation signal, and this is the new concept. More specifically, the reference block changing pixel b1 on the block of an alpha-map corresponding to the block of the current image to be processed is detected from the "compensated block" as the motion estimation/compensation signal.

In this embodiment, the detection means of the reference changing pixel b1 alone is different, but encoding/decoding which is done using the relative addresses of a0, a1, and b1 is the same as that in the previous embodiment.

In FIGS. 16A and 16B, a0 is the start point changing pixel, and encoding has already been done up to the start point changing pixel a0. Also, a1 is a changing pixel next to the start point changing pixel a0, and b0 is a pixel at the same position as a0 in the "compensated block" (but which pixel is not always a changing pixel). If "a0-line" represents a line to which a0(b) belongs, the reference changing pixel b0 is defined as follows.

Let abs_x be the address of pixel X when pixels in the block are scanned in the raster order from the upper left pixel. Note that the address of the upper left pixel of the block is "0".

If abs_b0<abs_b1, and a changing pixel indicated by mark "X" is located on "a0-line", the first changing pixel with a color opposite to that of "a0" is determined to be the reference changing pixel b1; if the changing pixel is not located on "a0-line", the first changing pixel on that line is determined to be the reference changing pixel b1.

FIG. 16A shows the case wherein the changing pixel is not located on "a0-line". In this case, the first changing pixel on the next line is determined to be "b1".

FIG. 16B shows the case wherein the changing pixel is located on "a0_line". In this case, since the color of this changing pixel X is not opposite to that of "a", that pixel is not determined to be "b1", but the first changing pixel on the next line is determined to be "b1".

Note that the values of "a0-line", "r_ai (i=0 to 1)", and r_b1" are obtained by calculating the following equations:

$$a0\text{-line}=(int)((abs-a0+\text{WIDTH})/\text{WIDTH}-1$$

$$r\text{-}a=abs-a0-a0\text{-line}*\text{WIDTH}$$

$$r\text{-}a1=abs-a1-a0\text{-line}*\text{WIDTH}$$

$$r\text{-}b1=abs-a0-b1\text{-line}*\text{WIDTH}$$

In these equations, * means a multiplication, (int)(X) means rounding off by dropping digits after the decimal point of X, and WIDTH indicates the number of pixels of a block in the horizontal direction.

In the present invention, since the definition of the reference changing pixel b1 is different from the above embodiment, that of "r_b1" is changed like in the above equation.

The encoding method described above with the aid of FIGS. 16A and 16B is an example of a method of obtaining the reference changing pixel b1 from the "compensated block", and detection of the reference changing pixel b1 may be variously modified.

The binary image encoder 41 can detect the reference changing pixel b1 using a down-sampled alpha-map motion estimation/compensation signal ("compensated block") supplied via the signal line 95 in the same manner as in the binary image encoder 22.

Furthermore, whether the reference changing pixel b1 is detected from the "current block" or "compensated block" may be switched in units of blocks. In this case, the binary image encoder 22 encodes switching information together, and the binary image decoder 41 also decodes the switching information. Upon decoding, whether the reference changing pixel b1 is detected from the "current block" or "compensated block" is switched in units of, e.g., blocks, on the basis of the switching information.

In this fashion, optimal processes can be done based on the image contents in units of blocks, and encoding with higher efficiency can be realized.

Figure 17A:
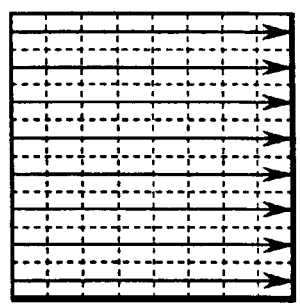
FIGS. 17A and 17B are views for explaining switching of scan directions.
Figure 17B:
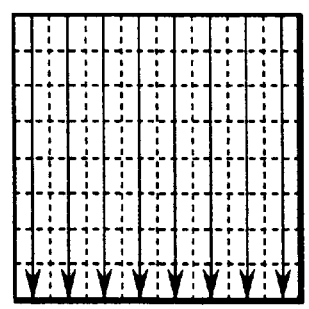

On the other hand, means for switching the scan order may be arranged, and the scan order may be switched to a horizontal scan, as shown in FIG. 17A or to a vertical scan, as shown in FIG. 17B, thus reducing the number of changing pixels and further reducing the number of encoded bits. Such means also leads to encoding with higher efficiency.

As described above, the third embodiment provides an encoder which encodes an alpha-map that represents the shape of an object in a motion video encoding apparatus which encodes motion video signals for a plurality of frames obtained as time-series data in units of objects having arbitrary shapes.

More specifically, there is provided but a motion video encoding apparatus, which has an encoder for sequentially encoding a plurality of blocks, obtained by dividing a rectangle area including an object into M×N pixel blocks (M: the number of pixels in the horizontal direction, N: the number of pixels in the vertical direction), in the rectangle area in accordance with a predetermined rule, and performing relative address encoding for all or some of the blocks, a memory for storing decoded values near the block, a frame memory for storing a decoded signal of the already encoded frame, a motion estimation/compensation circuit for generating a motion estimation/compensation value using the decoded signal in the frame memory, and a detection circuit for detecting a changing pixel as well as the decoded value near the block, and which obtains a reference changing pixel for relative address encoding not from pixel values in the block but from the motion estimation/compensation signal.

There is provided a motion video encoding apparatus which has, in an alpha-map decoder, a decoder for sequentially decoding blocks consisting of M×N pixels in a rectangle area including an object in accordance with a predetermined rule, a memory for storing decoded values near the block, a frame memory for storing a decoded signal of the already encoded frame, a motion estimation/compensation circuit for generating a motion estimation/compensation circuit for generating a motion estimation/compensation value using the decoded signal in the frame memory, and a detection circuit for detecting a changing pixel as well as the decoded values near the block, and which obtains a reference changing pixel for relative address encoding not from pixel values in the block but from the motion estimation/compensation signal.

With this apparatus, alpha-map information as subsidiary video information representing the shape of an object and its position in the frame can be efficiently encoded and decoded.

There is also provided a motion video encoding apparatus which has a decoded value storage circuit for storing decoded values near the block, a frame memory for storing a decoded signal of the already encoded frame, a motion estimation/compensation circuit for generating a motion estimation/compensation value using the decoded signal in the frame memory, a detection circuit for detecting a changing pixel as well as the decoded values near the block with reference to information of the stored decoded value of the decoded value storage circuit, and a switching circuit for switching between a reference changing pixel for relative address encoding, which is obtained from the decoded pixel values in the block, and a reference changing pixel for relative address encoding, which is obtained from the motion estimation/compensation signal, and which apparatus encodes relative address encoding information together with switching information.

Furthermore, there is provided a motion video encoding apparatus which has, in an alpha-map decoder, an encoder for sequentially decoding blocks consisting of M×N pixels in a rectangle area including an object in accordance with a predetermined rule, a decoded value storage circuit for storing decoded values near the block, a frame memory for storing a decoded signal of the already encoded frame, a motion estimation/compensation circuit for generating a motion estimation/compensation value using the decoded signal in the frame memory, and a detection circuit for detecting a changing pixel as well as the decoded values near the block, and also has a switching circuit for switching between a reference changing pixel for relative address encoding, which is obtained from the decoded pixel values in the block, and a reference changing pixel for relative address encoding, which is obtained form the motion estimation/compensation signal, and which apparatus obtains the reference changing pixel in accordance with switching information.

In this case, upon relative address encoding, processes are done by switching, in units of blocks, whether a reference changing pixel b1 is detected from the "current block" or "compensated block", and the encoding side encodes this switching information together. The decoding side decodes that switching information, and switches, in units of blocks, whether the reference changing pixel b1 is detected from the "current block" or "compensated block", on the basis of the switching information upon decoding. In this manner, optimal processes can be done based on the image contents in units of blocks, and encoding with higher efficiency can be realized.

In summary, according to the present invention, a video encoding apparatus and video decoding apparatus, which can efficiently encode and decode alpha-map information as subsidiary video information representing the shape of an object and its position in the frame, can be obtained.

The above-mentioned embodiments have exemplified the alpha-map encoder 20 using MMR (Modified Modified READ). However, the present invention is not limited to MMR encoding, and may be implemented using other arbitrary binary image encoders. Such example will be explained below.

The detailed arrangements of the alpha-map encoder 20 and alpha-map decoder 40 will be described below with reference to FIGS. 18, 19, and 20.

Figure 18:
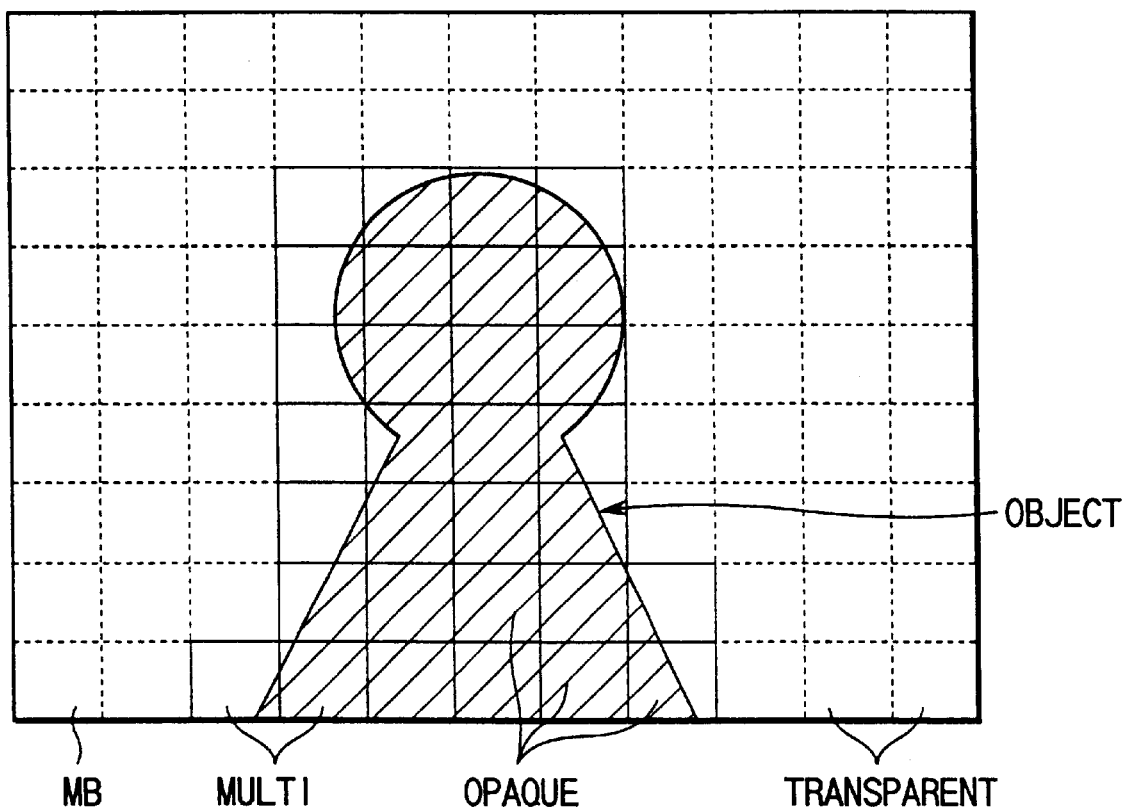
FIG. 18 is a view showing the state wherein a frame of an alpha-map used in the present invention is divided into macro blocks (MBs) as units each consisting of a plurality of pixels.

FIG. 18 shows the state wherein the frame of an alpha-map is segmented into macro blocks (MBs) each consisting of a predetermined number of pixels, e.g., 16×16 pixels. In FIG. 18, the frames of squares are dividing boundary lines, and each square corresponds to a macro block (MB).

In case of an alpha-map expressed by binary values (which may often be expressed by multi-values together with weighting coefficients upon synthesizing an object), object shape information can be expressed by either a value representing transparent or a value representing opaque in units of pixels. Hence, as shown in FIG. 18, the contents of the macro blocks (MB) in the frame of the alpha-map are classified into three different types, i.e., "transparent" (every pixel in the MB is transparent), "opaque" (every pixel in the MB is opaque), and "Multi" (other).

In case of the frame shown in FIG. 18 as an alpha-map of a person image, since the background is "transparent" and the person portion is "opaque", binary image encoding need only be done for macro blocks (MBs) which are classified to "Multi" and include a boundary portion of the object. Among the blocks (MBs) classified to "Multi", if the motion estimation/compensation error value of a given block is equal to or smaller than a setting value (threshold value), the motion estimation/compensation value is copied to that block (MB). If "no update" represents the mode of such copied macro block (MB), and "coded" represents the mode of the macro block (MB) to be subjected to binary frame image encoding, the encoding modes of the macro blocks (MBs) are classified into the following four different modes:

(1) "transparent"

(2) "opaque"

(3) "no update"
(4) "coded"

The encoding or decoding methods of the individual modes will be described later in the description of the alpha-map encoder 20 and alpha-map decoder 40.

Figure 19:
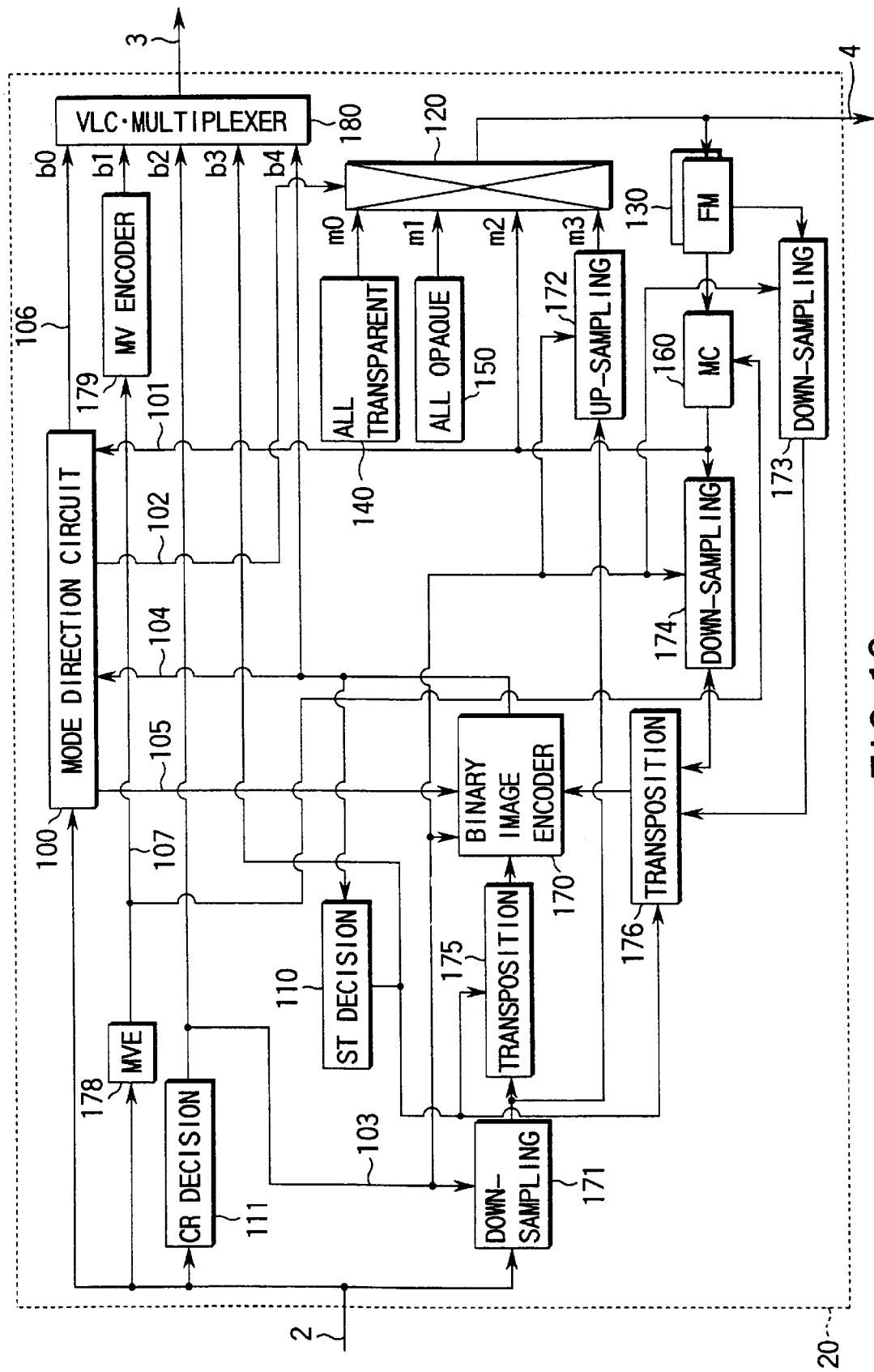
FIG. 19 is a block diagram of an alpha-map encoder according to the fourth embodiment of the present invention.

FIG. 19 is a block diagram showing the arrangement of the alpha-map encoder 20 in detail. The arrangement shown in FIG. 19 comprises a mode determination circuit 110, CR (conversion ratio) determination circuit 111, selector 120, intra-block pixel value setting circuits 140 and 150, motion estimation/compensation circuit 160, binary image encoder 170, down-sampling circuits 171, 173, and 174, up-sampling circuit 172, frame memory 130, transposition circuits 175 and 176, scan type (ST) determination circuit 177, motion vector detection circuit (MVE) 178, MV encoder 179, and VLC (variable-length coding) ·multiplexing circuit 180.

Of these circuits, the intra-block pixel value setting circuit 140 is a circuit for generating pixel data for setting all the pixel values in each macro block to be transparent, and the intra-block pixel value setting circuit 150 is a circuit for generating pixel data for setting all the pixel values in each macro block to be opaque.

The CR (conversion ratio) determination circuit 111 analyzes an alpha-map signal supplied via the alpha-map signal input line 2, and determines a conversion ratio used for processing an alpha-map image for one frame. Also, the circuit 111 outputs the determination result as a conversion ratio b2. The down-sampling circuit 171 an alpha-map signal supplied via the alpha-map signal input line 2 for the entire frame, and the scan type (ST) determination circuit 177 determines the scan type on the basis of the encoded output from the binary image encoder 170 and outputs scan type information b4.

The transposition circuit 175 transposes the positions of the macro blocks in the alpha-map signal for one frame down-sampled by the down-sampling circuit 171 on the basis of the scan type information b4 output from the scan type (ST) determination circuit 177. The transposition circuit 176 transposes the outputs from the down-sampling circuits 171, 172, and 173 on the basis of the scan type information b4 output from the scan type determination circuit 177, and outputs the transposition results. The binary image encoder 170 encodes and outputs the down-sampled alpha-map signal supplied via these transposition circuits 175 and 176.

On the other hand, the up-sampling circuit 172 up-samples the alpha-map signal supplied via the down-sampling circuit 171 at a conversion ratio output from the CR determination circuit 111. The motion estimation/ compensation circuit 160 generates a motion estimation/ compensation signal using a decoded image of the reference frame stored in the frame memory 130, and outputs that signal to the mode determination circuit 110 and the down-sampling circuit 174. The down-sampling circuit 174 down-samples the motion estimation/compensation signal at a conversion ratio output from the CR determination circuit 111, and the down-sampling circuit 173 down-samples the decoded image of the reference frame stored in the frame memory 130 at a conversion ratio output from the CR determination circuit 111.

The selector 120 selects and outputs a required one of a decoded signal m0 from the intra-block pixel value setting circuit 140, a decoded signal m1 from the intra-block pixel value setting circuit 150, a motion estimation/compensation signal m2 from the motion estimation/compensation circuit 160, and a decoded signal from the up-sampling circuit 172 in accordance with classification information output from the mode determination circuit 110. The frame memory 130 stores the output from the selector 120 in units of frames.

The mode determination circuit 110 analyzes the alpha-map signal supplied via the alpha-map signal input line 2 with reference to the motion estimation/compensation signal from the motion estimation/compensation circuit 160 and an encoded signal b4 from the binary image encoder 170, and determines if each macro block is classified to one of "transparent", "opaque", "no update", and "coded", in units of macro blocks. Also, the circuit 110 outputs the determination result as mode information b0.

The motion vector detection circuit (MVE) 178 detects a motion vector from the alpha-map signal supplied via the alpha-map signal input line 2. The MV encoder 179 encodes the motion vector detected by the motion vector detection circuit (MVE) 178, and outputs the encoded result as motion vector information b1. For example, when prediction encoding is applied to the MV encoder 179, a prediction error signal is output as the motion vector information b1.

The VLC (variable-length coding)·multiplexing circuit 180 receives, variable-length encodes, and multiplexes mode information b0 from the mode determination circuit 110, motion vector information b1 from the MV encoder 179, conversion ratio information b2 from the CR (conversion ratio) determination circuit 111, scan type information b3 from the scan type (ST) determination circuit 177, and binary encoded information b4 from the binary image encoder 170, and outputs the multiplexed information onto the signal line 3.

In the aforesaid arrangement, the alpha-map signal to be encoded is supplied to the alpha-map encoder 20 via the alpha-map signal input line 2. Upon receiving that signal, the alpha-map encoder 20 analyzes the alpha-map signal using the mode determination circuit 110 to check if each macro block is classified to one of "transparent", "opaque", "no update", and "coded", in units of macro blocks. In this case, for example, the number of mismatched pixels is used as an evaluation criterion for classification.

More specifically, the following processes are done.

The mode determination circuit 110 calculates the number of mismatched pixels when all the signals in the input macro block are replaced by transparent values. When the calculated number is equal to or smaller than a threshold value, the mode determination circuit 110 classifies that macro block to "transparent". Likewise, when the number of mismatched pixels calculated when all the signals in the macro block are replaced by opaque values becomes equal to or smaller than a threshold value, the mode determination circuit 110 classifies that macro block to "opaque".

Subsequently, the mode determination circuit 110 calculates the number of mismatched pixels for each of macro blocks that are classified to neither "transparent" nor "opaque" with respect to the corresponding motion estimation/compensation value supplied via a signal line 101, and if the calculated number is equal to or smaller than a threshold value, that block is classified to "no update".

Macro blocks that are classified to none of "transparent", "opaque", and "no update" are classified to "coded".

This classification information b0 of the mode determination circuit 110 is supplied to the selector 120 via a signal line 102. When the mode of the block of interest is "transparent", the selector 120 selects a decoded signal m0 in which all intra-block pixel values are set at transparent values in the intra-block pixel value setting circuit 140, and supplies the signal to the frame memory 130 via the signal line 4 to store it in the storage area of the frame of interest.

Also, the selector 120 outputs the selected signal as the output of the alpha-map encoder 20.

Similarly, when the mode of the macro block of interest is "opaque", the selector 120 selects a decoded signal m1 in which all intra-block pixel values are set at opaque values in the intra-block pixel value setting circuit 150; when the mode of the macro block of interest is "no update", the selector 120 selects a motion estimation/compensation signal m2 generated by the motion estimation/compensation circuit 160 and supplied via the signal line 101; or when the mode of the macro block of interest is "coded", the selector 120 selects a decoded signal m3 supplied via the down-sampling circuit 171 and up-sampling circuit 172 and supplies the selected signal to the frame memory 130 via the signal line 4 to store it in the storage area of the corresponding frame. Also, the selector 120 outputs the selected signal as the output of the alpha-map encoder 20.

The pixel values in the macro block classified to "coded" in the mode determination circuit 110 are down-sampled by the down-sampling circuit 171, and are then encoded by the binary image encoder 170. The setting information of the CR (conversion ratio) used in the down-sampling circuit 171 is obtained by the CR determination circuit 111. For example, when the down-sampling ratio is defined to be three different values, i.e., "1 (not down-sampling)", "1/2 (down-sampling to 1/2 in both the horizontal and vertical directions)", and "1/4 (down-sampling to 1/4 in both the horizontal and vertical directions)", the CR determination circuit 111 obtains the CR (conversion ratio) in the following steps.

(1) The number of mismatched pixels between the decoded signal obtained when the macro block of interest is down-sampled to "1/4" and that macro block is calculated, and if the calculated value is equal to or smaller than a threshold value, the down-sampling ratio is determined to be "1/4".

(2) If the number of mismatched pixels is larger than the threshold value in step (1) above, the number of mismatched pixels between the decoded signal obtained when the macro block of interest is down-sampled to "1/2" and that macro block is calculated, and if the calculated value is equal to or smaller than a threshold value, the down-sampling ratio is determined to be "1/2".

(3) If the number of mismatched pixels is larger than the threshold value in step (2) above, the down-sampling ratio is determined to be "1".

The value of the CR (conversion ratio) obtained in this way is supplied to the down-sampling circuits 171, 173, and 174, up-sampling circuit 172, and binary image encoder 170 via a signal line 103. The CR value is also supplied to and encoded by the VLC (variable-length coding)·multiplexing circuit 180, and the encoded value is multiplexed with other codes. On the other hand, the transposition circuit 175 transposes the positions of signals in the down-sampled block supplied from the down-sampling circuit 171 (switch the horizontal and vertical addresses).

With this process, the encoding order is switched to the horizontal scan order or vertical scan order. The transposition circuit 176 transposes the positions of signals on the basis of decoded pixel values near the macro block of interest down-sampled by the down-sampling circuit 173 and the motion estimation/compensation signal down-sampled by the down-sampling circuit 174.

Whether or not transposition is done in the transposition circuits 175 and 176 is determined, for example, when the binary image encoder 170 executes encoding in both the horizontal and vertical scan orders and supplies the output encoded information b4 to the ST (Scan Type) determination circuit 177 via the signal line 104, and the ST determination circuit 177 selects a scan direction with the smaller number of encoded bits.

The binary image encoder 170 encodes signals of the macro block of interest supplied from the transposition circuit 175 using a reference signal supplied from the transposition circuit 176.

Note that a technique used in the third embodiment described above may be used as an example of the detailed binary image encoding methods. However, the present invention is not limited to such specific method, and the binary image encoder 170 of the fourth embodiment can use other binary image encoding methods.

The blocks classified to "coded" include "intra" encoding mode blocks that use a reference pixel in the frame, and "inter" encoding mode blocks that refer to the motion estimation/compensation signal. Note that intra/inter switching can be done by supplying encoded information supplied from the binary image encoder 170 to the mode determination circuit 110 via a line 104 and selecting a mode that can reduce the number of encoded bits. The selected encoding mode (intra/inter) information is supplied to the binary image encoder 170 via a signal line 105.

The information encoded by the binary image encoder 170 in an optimal mode selected by the above-mentioned means is supplied to the VLC·multiplexing circuit 180 via the signal line 104, and is multiplied with other codes. The mode determination circuit 110 supplies optimal mode information to the VLC·multiplexing circuit 180 via a signal line 106, and is multiplexed together with other codes after it is encoded. The motion vector detection circuit (MVE) 178 detects an optimal motion vector. Since various detection methods of the motion vector are available, and the motion vector detection method itself is not principal part of the present invention, a detailed description thereof will be omitted. The detected motion vector is supplied to the motion estimation/compensation circuit 160 via a signal line 107, and is encoded by the MV encoder 179. Thereafter, the encoded information is supplied to the VLC·multiplexing circuit 180, and is multiplexed together with other codes after it is encoded.

The multiplexed code is output via the signal line 3. The motion estimation/compensation circuit 160 generates a motion estimation/compensation signal using the decoded image of the reference frame stored in the frame memory 130 on the basis of the motion vector signal supplied via the signal line 107, and outputs the generated signal to the mode determination circuit 110 and the down-sampling circuit 174 via the signal line 101.

As a result of the above-mentioned processes, video encoding that can assure high image quality and high compression ratio can be done.

Decoding will be explained below.

Figure 20:
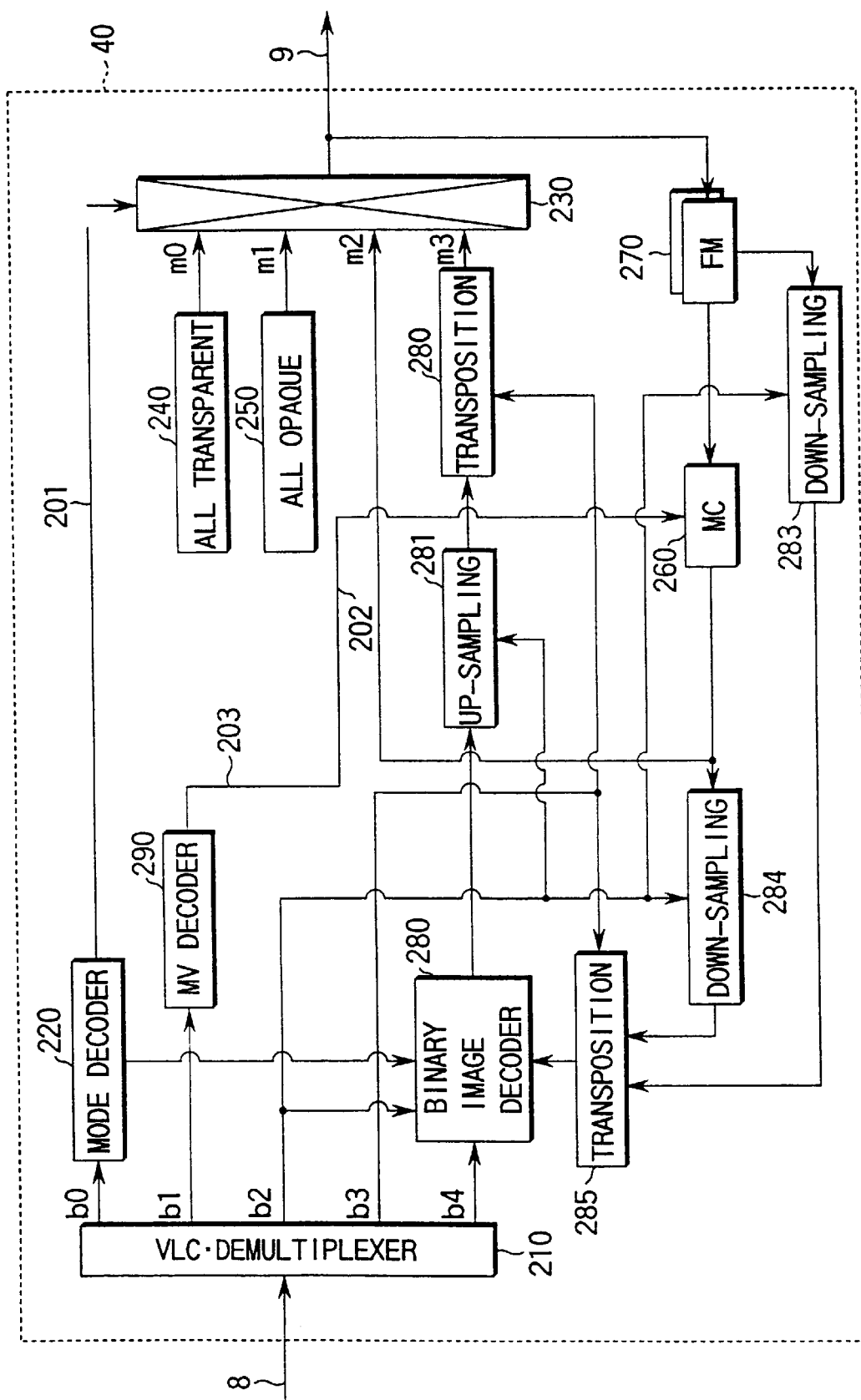
FIG. 20 is a block diagram of an alpha-map decoder corresponding to the encoder shown in FIG. 18.

FIG. 20 is a detailed block diagram of the alpha-map decoder 40.

As shown in FIG. 20, the alpha-map decoder 40 comprises a VLC (variable-length coding)·demultiplexing circuit 210, mode decoder 220, selector 230, intra-macro block pixel value setting circuits 240 and 250, motion estimation/compensation circuit 260, frame memory 270, binary image decoder 280, up-sampling circuit 281, transposition circuits 282 and 285, down-sampling circuits 283 and 284, binary image decoder 280, and motion vector decoder 290.

Of these circuits, the VLC (variable-length coding)·demultiplexing circuit 210 decodes the input multiplexed encoded bit stream of the alpha-map to demultiplex it into mode information b0, motion vector information b1, conversion ratio information b2, scan type information b3, and encoded binary image information b4. Upon receiving the demultiplexed mode information b0, the mode decoder 220 decodes one of the four modes "transparent", "opaque", "no update", and "coded".

The binary image decoder 280 is a circuit for decoding the encoded binary image information b4 demultiplexed by the VLC (variable-length coding)·demultiplexing circuit 210 into a binary image using the demultiplexed conversion ratio information b2, the mode information decoded by the mode decoder 220, and information from the transposition circuit 285, and outputting the decoded binary image. The up-sampling circuit 281 is a circuit for up-sampling the decoded binary image using information of the demultiplexed conversion ratio information b2. The transposition circuit 282 is a circuit for transposing the up-sampled image in accordance with the demultiplexed scan type information b3, and outputting the transposed image as a decoded signal m3.

The intra-macro block pixel value setting circuit 240 is a circuit for generating a decoded signal m0 in which all the intra-macro block pixel values are set at transparent values, and the intra-macro block pixel value setting circuit 250 is a circuit for generating a decoded signal ml in which the intra-macro block pixel values are set at opaque values.

The motion vector decoder 290 is a circuit for decoding the motion vector of each macro block using the motion vector information b1 demultiplexed by the VLC (variable-length coding)·demultiplexing circuit 210. The motion estimation/compensation circuit 260 is a circuit for generating a motion estimation/compensation value m2 from the decoded image the reference frame stored in the frame memory 270 using the decoded motion vector. The down-sampling circuit 284 down-samples the motion estimation/compensation value m2 using information of the demultiplexed conversion ratio information b2. The down-sampling circuit 283 down-samples the image of the reference frame stored in the frame memory 270 using information of the demultiplexed conversion ratio information b2. The transposition circuit 285 is a circuit for transposing the down-sampled images output from the down-sampling circuits 283 and 284 on the basis of the scan type information b3 demultiplexed by the VLC (variable-length coding)·demultiplexing circuit 210, and outputting the transposed images to the binary image decoder 280.

The selector 230 selects and outputs one of the decoded signals m0 and m1 from the intra-macro block pixel value setting circuits 240 and 250, the motion estimation/compensation value m2 from the motion estimation/compensation circuit 260, and the decoded signal m3 from the transposition circuit 282. The frame memory 270 stores the video signal output from the selector 230 in units of frames.

The alpha-map decoder 40 with the above-mentioned arrangement receives an alpha-map encoded bit stream via the signal line 8. The bit stream is supplied to the VLD (variable-length decoding)·demultiplexing circuit 210.

The VLD (variable-length decoding)·demultiplexing circuit 210 decodes the bit stream, and demultiplexes it into the mode information b0, motion vector information b1, conversion ratio information b2, scan type information b3, and encoded binary image information b4. These pieces of demultiplexed information are managed in units of macro blocks.

Of these demultiplexed information, the mode information b0 is supplied to the mode decoder 220 to determine one of the following modes to which the macro block of interest belongs:

(1) "transparent"
(2) "opaque"
(3) "no update"
(4) "coded"

Note that the mode "coded" includes the "intra" and "inter" modes, as described above in the embodiment of the decoder shown in FIG. 19. That is, the "intra" encoding mode uses a reference pixel in the frame, and the "inter" encoding mode refers to a motion estimation/compensation signal.

When the mode of the macro block of interest is "transparent" in accordance with the above-mentioned encoding mode supplied via a signal line 201, the selector 230 selects the decoded signal m0 in which all the intra-macro block pixel values are set at transparent values by the intra-block pixel value setting circuit 240, and supplies the selected signal to the frame memory 270 via the signal line 9. The signal is stored in the storage area of the video frame, to which the macro block of interest belongs, of the frame memory 270, and is output as a decoded alpha-map image from the alpha-map decoder 40.

Likewise, when the mode of the macro block of interest is "opaque", the decoded signal m1 in which all the intra-block pixel values are set at opaque values by the intra-macro block pixel value setting circuit 250 is selected; when the mode of the macro block of interest is "no update", the motion estimation/compensation signal m2 generated by the motion estimation/compensation circuit 260 and supplied via a signal line 202 is selected; or when the mode of the block of interest is "coded", the decoded signal m3 supplied via the up-sampling circuit 281 and transposition circuit 282 is selected. The selected signal is supplied to the frame memory 270, and is stored in the storage area of the video frame, to which the macro block of interest belongs, in the frame memory 270. Also, the selected signal is output as a decoded alpha-map image from the alpha-map decoder 40.

On the other hand, the demultiplexed motion vector information b1 is supplied to the motion vector decoder 290, and the motion vector of the macro block of interest is decoded. The decoded motion vector is supplied to the motion estimation/compensation circuit 260 via a signal line 203. The motion estimation/compensation circuit 260 generates a motion estimation/compensation value from the decoded frame image of the reference frame stored in the frame memory 270 on the basis of this motion vector. The generated value is output to the down-sampling circuit 284 and selector 230 via the signal line 202.

The demultiplexed conversion ratio information b2 is supplied to the down-sampling circuit 283 and up-sampling circuit 281, and is also supplied to the binary image decoder 280. The scan type information b3 is supplied to the transposition circuits 282 and 285.

Upon receiving the scan type information b3, the transposition circuit 282 transposes the position of the decoded signal of the macro block, which is supplied from the up-sampling circuit 281 and is restored to its original size (switches addresses in the horizontal and vertical directions). Upon receiving the scan type information b3, the transposition circuit 285 transposes positions of signals between the decoded pixel values near the block down-sampled by the down-sampling circuit 283 and the motion estimation/compensation signal down-sampled by the down-sampling circuit 284.

Upon receiving the conversion ratio information b2, the binary image decoder 280 decodes the encoded binary image information of the macro block of interest demultiplexed by the demultiplexing circuit 210 using a reference signal supplied from the transposition circuit 285.

As has been described in the fourth embodiment, the outputs from the up-sampling circuits 172 and 281 may suffer image quality deterioration arising from discontinuity in an oblique direction. In order to solve this problem, the up-sampling circuits 172 and 281 may comprise filters for suppressing discontinuity in the oblique direction.

Note that the arrangement of the binary image encoder 280 used is not limited to an example of the arrangement described in the third embodiment described above as in the binary image encoder 170.

In the description of the above embodiment, the embodiments of the binary image encoder 170 and binary image decoder 280 are not limited to those in the above-mentioned third embodiment. Another example will be explained below.

Figure 21:
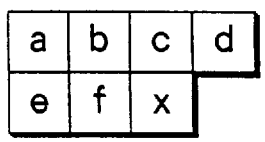
FIG. 21 is a view for explaining Markov model encoding.

As another binary image encoding method, for example, Markov model encoding is known (reference: Television Society ed. "Video Information Compression", pp. 171–176). FIG. 21 is a view for explaining an example of Markov model encoding. Pixel x in FIG. 21 is the pixel to be encoded, i.e., the pixel of interest, and pixels a to f are reference pixels, which are referred to upon encoding pixel x.

Assume that pixels a to f are already encoded ones upon encoding pixel x. Pixel x of interest is encoded by adaptively switching variable-length coding tables when VLC (variable-length coding) is used or probability tables when arithmetic encoding is used.

When this embodiment is applied to the present invention, "intra" encoding can use, as reference pixels, pixels encoded before the pixel of interest in the current macro block to be processed, and "inter" encoding can use not only the pixels encoded before the pixel of interest but also the pixels in a motion estimation/compensation error signal.

This embodiment is characterized by comprising two methods, i.e., [method 1] the method of the third embodiment (the encoding method based on MMR) and [method 2] a method of encoding by adaptively switching Markov model encoding, and adaptively selecting and using either of these methods.

Figure 22A:
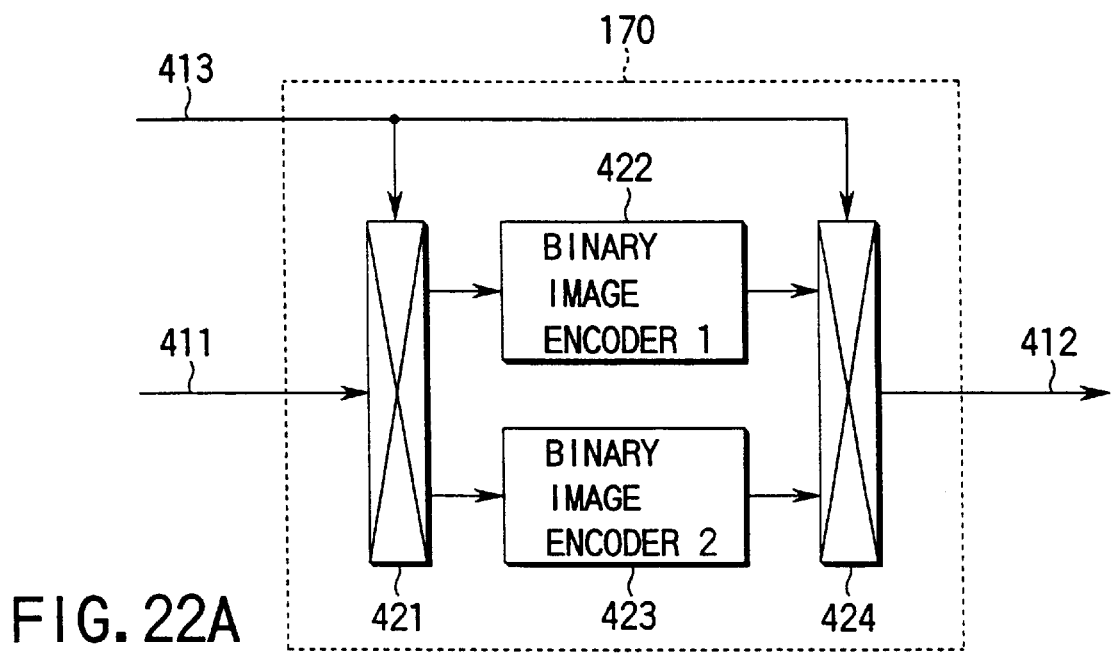
FIG. 22A is a block diagram of a binary image encoder which selectively uses a plurality of binary image encoding methods.

FIG. 22A is a block diagram of the binary image encoder 170 used in this embodiment. As shown in FIG. 22A, the binary image encoder 170 comprises a pair of selectors 421 and 424, and a pair of binary image encoders. Of these circuits, the selector 421 is a selection circuit at the input side, and the selector 422 is a selection circuit at the output side. A binary image encoder 422 is a first binary image encoder for encoding by [method 1] above, and a binary image encoder 423 is a second binary image encoder for encoding by [method 2] above.

In the binary image encoder 170, the selectors 421 and 424 adaptively distribute a signal of the macro block to be processed supplied from the transposition circuit 175 via a signal line 411 to the first and second binary image encoders 422 and 423 in accordance with a switching signal supplied via a signal line 413 so as to encode the distributed signal of the macro block.

The encoded information is output via a signal line 412. Note that FIG. 22A does not illustrate the signal lines 103 and 105 of signals supplied to the binary image encoder 170 and the signal line from the transposition circuit 176.

The switching information supplied via the signal line 413 may be a preset default value, or proper switching information may be obtained on the basis of the image contents, may be separately encoded as side information, and may be supplied to the decoding side. With this process, optimal processing can be done on the basis of the image contents, and an appropriate one of a plurality of encoding methods can be selected and used in correspondence with each application. Similarly, FIG. 22A is a block diagram of the binary image decoder 280 used in this embodiment. As shown in that FIG., the binary image decoder 280 comprises a pair of selectors 441 and 444 and a pair of binary image decoders 442 and 443. Of these circuits, the selector 441 is a selection circuit at the input side, and the selector 444 is a selection circuit at the output side. The binary image decoder 442 is a first binary image decoder for decoding an image encoded by [method 1] above, and the binary image decoder 443 is a second binary image decoder for decoding an image encoded by [method 2] above.

In the binary image decoder 280 with the above-mentioned arrangement, the selectors 441 and 444 adaptively distribute encoded binary image information b4 of the macro block to be processed supplied via a signal line 431 to the first and second binary image decoders 442 and 443 in accordance with a switching signal supplied via a signal line 433 so as to decode that information.

Figure 22B:
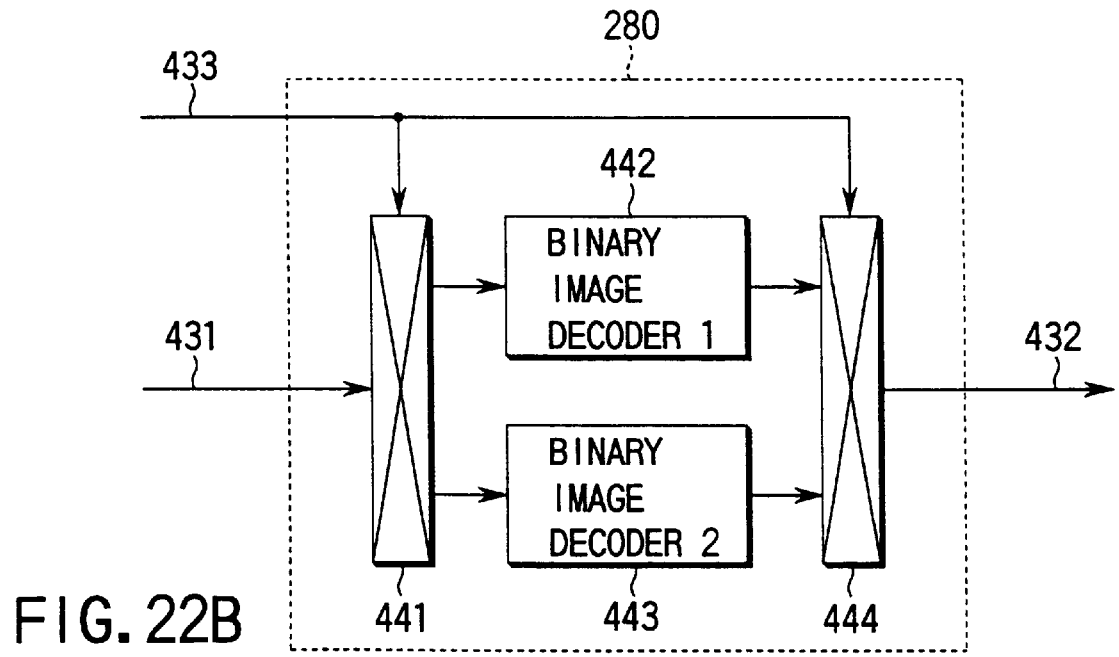
FIG. 22B is a block diagram of a binary image decoder which selectively uses a plurality of binary image encoding methods.

The decoded signal is output via a signal line 432. Note that FIG. 22B does not illustrate the signal lines from the demultiplexing circuit 210, mode decoder 220, and transposition circuit 285 that supply signals to the binary image decoder 280.

Note that the switching information supplied via the signal line 433 may be a default value or may be information sent from an encoder that obtains the switching information from an incoming encoded bit stream.

An example of a circuit for attaining size conversion (up-sampling·down-sampling) will be described below.

The present invention performs rate control by performing size conversion in units of video object planes (VOPs) or in units of blocks (macro blocks). As an example of a technique used in that size conversion, "linear interpolation" disclosed in Japanese Patent Application No. 8-237053 by the present inventors is known. This technique will be explained below. The linear interpolation will be described with reference to FIGS. 23A and 23B using reference "Ogami ed.: "Video Processing Handbook", p. 630, Shokodo".

Figures 23A, 23B:
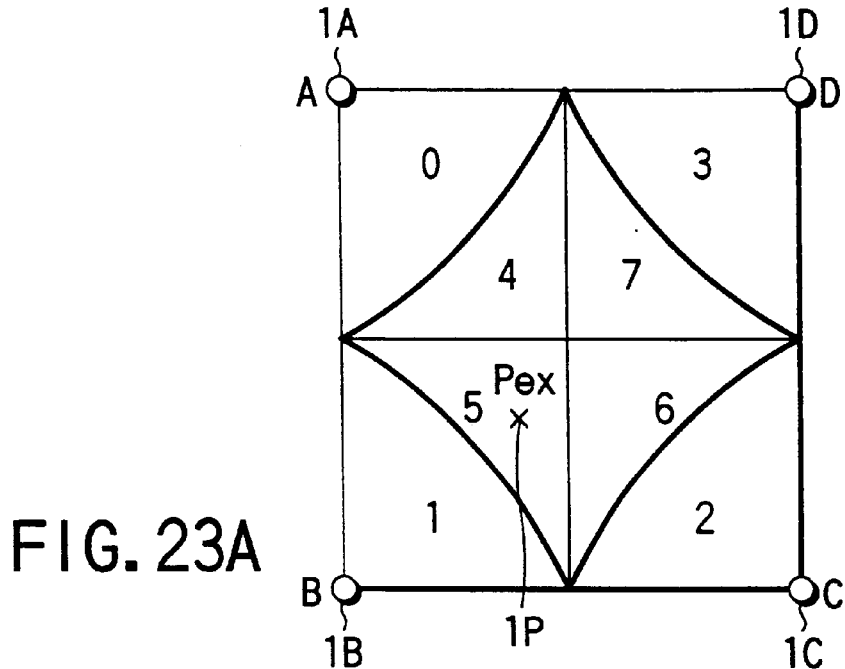
FIGS. 23A and 23B are views for explaining linear interpolation used in a size conversion (down-sampling/up-sampling) process.

In FIG. 23A, Pex is the pixel position after conversion, and this Pex indicates a real number pixel position, as shown in FIG. 23A.

Eight areas are divisionally defined based on the distance relationship with integer pixel positions A, B, C, and D of an input signal, and a pixel value Ip of Pex is obtained based on pixel values Ia to Id of A to D using logical expressions shown in FIG. 23B.

Such process is a process called "linear interpolation", and the pixel value Ip of Pex can be easily obtained from the pixel values Ia to Id of A to D.

Since this linear interpolation process is done using only four surrounding pixels, changes over a broad range are not reflected, and discontinuity in the oblique direction readily appears. As an example for solving this problem, Japanese Patent Application No. 8-237053 proposes an example for performing a smoothing filter process (smoothing process) after the up-sampling process.

The smoothing process will be described in detail below with reference to FIGS. 24A and 24B. FIG. 24A shows a binary image of an original size, and FIG. 24B shows a binary image obtained by down-sampling that image. In FIGS. 24A and 24B, the object area is indicated by full circles, and the background area is indicated by open circles.

In this example, in order to smooth discontinuity in the oblique direction arising from sampling conversion (up-sampling·down-sampling conversion), the upper, lower, right, and left pixels, i.e., neighboring pixels, of each pixel (open circle) in the background area are checked, and if these neighboring pixels include two or more pixels (full circles) in the object area, that pixel in the background area is incorporated in the object area.

More specifically, when the neighboring pixels of the pixel to be inspected as one pixel in the background area include two or more pixels (full circles) in the object area like those at the positions indicated by double circles in FIG. 24B, the pixel (i.e., the pixel to be inspected) at each position indicated by the double circle is converted into a full circle pixel, i.e., a pixel in the object area. If, for example, "1" represents a full circle pixel and "0" represents an open circle pixel, a process for replacing the pixel (pixel value "0") at each position indicated by the double circle by a pixel value "1" is done. With this process, the discontinuity in the oblique direction can be eliminated.

Figure 25:
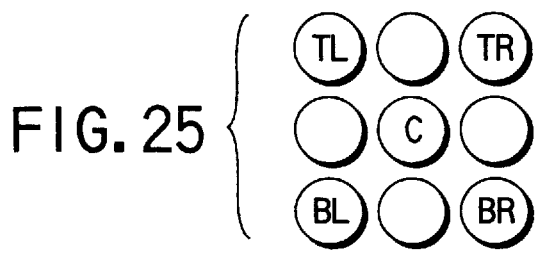
FIG. 25 is a view for explaining another example of a smoothing filter used in the present invention.

FIG. 25 shows another example of the smoothing filter (smoothing process filter). Let C in FIG. 25 be the central pixel of a 3×3 pixel mask, and TL, TR, BL, and BR be the upper left, upper right, lower left, and lower right pixels with respect to C. Then, the following equation can yield the filtered value of the pixel C. In this case, "1" represents the object value, and "0" represents the background value.

```
if (C = = 0)
{
    if (( TL + TR + BL = BR) > 2)
C = 1 :
    else
C = 0 :
}
else
{
    if (( TL + TR + BL = BR) < 2)
C = 1 :
    else
C = 0 :
}
```

More specifically, in this filter operation process, if the pixel C is "0", it is checked if the sum of the pixels TL, TR, BL, and BR is larger than "2". If the sum is larger than "2", the value of the pixel C is set at "1"; otherwise, the pixel C is set at "0". On the other hand, if the pixel C is not "0", it is checked if the sum of the pixels TL, TR, BL, and BR is smaller than "2". If the sum is smaller than "2", the value of the pixel C is set at "1"; otherwise, the pixel C is set at "0".

According to this filter, since the value of the pixel C is corrected in consideration of changes in pixel value located in the oblique direction with respect to the target pixel C, discontinuity in the oblique direction can be eliminated. Note that the arrangement of the smoothing filter is not limited to the above example, and a nonlinear filter such as a medium filter or the like may be used.

Figure 26A:
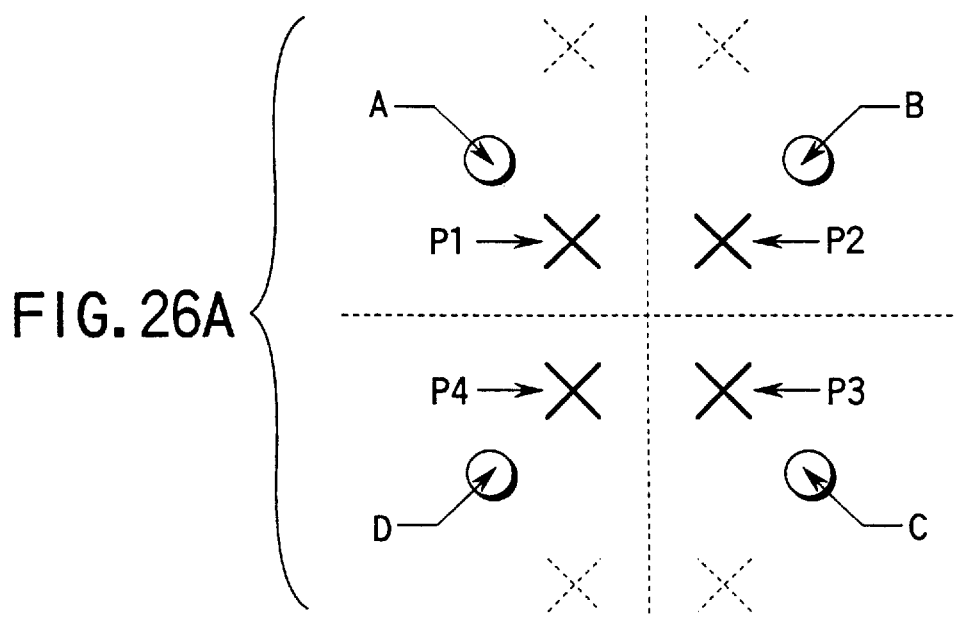
FIGS. 26A and 26B are views for explaining an example of the process for attaining 2× up-sampling in both the horizontal and vertical directions by linear interpolation.
Figure 26B:
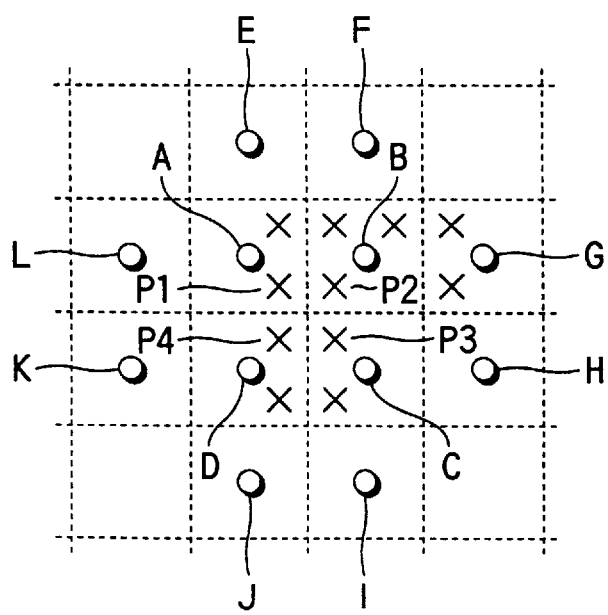

FIG. 26A is a view showing a process for attaining 2×up-sampling in both the horizontal and vertical directions by linear interpolation. In FIG. 26B, the decoded pixel in a down-sampled block is indicated by an open circle, i.e., "○" mark, and an interpolated pixel is indicated by a cross mark, i.e., "x" mark. These pixels take on either a pixel value "0" or "1".

In this case, if the values of the interpolated pixels are obtained by logical expressions shown in FIG. 23B, we have:

*Ip1=Ia, Ip2=Ib, Ip3=Ic, Ip4=Id*

Hence, since all the four interpolated pixels around the pixel A have a pixel value Ia, 2×2 pixels in the up-sampled image have identical values, and smoothness is impaired. By changing the weighting coefficients of linear interpolation as follows, the above problem can be solved:

*Ip1*: if($2*Ia+Ib+Ic+Id>2$) then "1" else "0"

*Ip2*: if($Ia+2*Ib+Ic+Id>2$) then "1" else "0"

*Ip3*: if($Ia+Ib+2*Ic+Id>2$) then "1" else "0"

*Ip4*: if($2*Ia+Ib+Ic+2*Id>2$) then "1" else "0"

where Pi (i=1, 2, 3, 4) is the interpolated pixel corresponding to the position "x" shown in FIG. 26A, and Ipi (i=1, 2, 3, 4) is the pixel value ("1" or "0") of the pixel Pi (i=1, 2, 3, 4). A, B, C, and D are the pixels in the down-sampled block, and Ia, Ib, Ic, and Id are the pixel values of these pixels A, B, C, and D.

⌈Ip1: if($2*Ia+Ib+Ic+Id>2$) then "1" else "0"⌋ means that the pixel value Ip1 of the pixel Ip1 is set at "1" if the sum of the doubled value of Ia, and Ib, Ic, and Id is larger than 2; otherwise, it is set at "0", ⌈Ip2: if($Ia+2*Ib+Ic+Id>2$) then "1" else "0"⌋ means that the pixel value Ip2 of the pixel Ip2 is set at "1" if the sum of the doubled value of Ib, and Ia, Ic, and Id is larger than 2; otherwise, it is set at "0", ⌈Ip3: if($Ia+Ib+2*Ic+Id>2$) then "1" else "0"⌋ means that the pixel value Ip3 of the pixel Ip3 is set at "1" if the sum of the doubled value of Ic, and Ia, Ib, and Id is larger than 2; otherwise, it is set at "0", and ⌈Ip4: if($Ia+Ib+Ic+2*Id>2$) then "1" else "0"⌋ means that the pixel value Ip4 of the pixel Ip4 is set at "1" if the sum of the doubled value of Id, and Ia, Ib, and Ic is larger than 2; otherwise, it is set at "0".

Note that 4× up-sampling in both the horizontal and vertical directions can be attained by repeating the above-mentioned process twice.

In the above example, the up-sampling process is done by arithmetic operations. However, the up-sampling process may be done without using any arithmetic operations. Such example will be described below.

In this example, a table is prepared and held in a memory, and pixels are uniquely replaced in accordance with that table.

A detailed explanation will be given. For example, assume that the memory address is defined by 4 bits, and Ip1, Ip2, Ip3, and Ip4 obtained in correspondence with the patterns of Ia, Ib, Ic, and Id are recorded in advance at addresses obtained by arranging Ia, Ib, Ic, and Id, as in the following table.

| Ia | Ib | Ic | Id | Ip1 | Ip2 | Ip3 | Ip4 |
|----|----|----|----|-----|-----|-----|-----|
| 0  | 0  | 0  | 0  | 0   | 0   | 0   | 0   |
| 0  | 0  | 0  | 1  | 0   | 0   | 0   | 0   |
| 0  | 0  | 1  | 0  | 0   | 0   | 0   | 0   |
| 0  | 0  | 1  | 1  | 0   | 0   | 0   | 0   |
| 0  | 1  | 0  | 0  | 0   | 0   | 0   | 0   |
| 0  | 1  | 0  | 1  | 0   | 1   | 0   | 1   |
| 0  | 1  | 1  | 0  | 0   | 1   | 1   | 0   |
| 0  | 1  | 1  | 1  | 1   | 1   | 1   | 1   |
| 1  | 0  | 0  | 0  | 0   | 0   | 0   | 0   |
| 1  | 0  | 0  | 1  | 0   | 0   | 0   | 1   |
| 1  | 0  | 1  | 0  | 1   | 0   | 1   | 0   |
| 1  | 0  | 1  | 1  | 1   | 1   | 1   | 1   |
| 1  | 1  | 0  | 0  | 1   | 1   | 1   | 1   |

-continued

| Ia | Ib | Ic | Id | Ip1 | Ip2 | Ip3 | Ip4 |
|----|----|----|----|-----|-----|-----|-----|
| 1  | 1  | 0  | 1  | 1   | 1   | 1   | 1   |
| 1  | 1  | 1  | 0  | 1   | 1   | 1   | 1   |
| 1  | 1  | 1  | 1  | 1   | 1   | 1   | 1   |

This example represents the table that can uniquely determine Ip1, Ip2, Ip3, and Ip4 if the combination of the contents of Ia, Ib, Ic, and Id is determined, in such a manner that if "Ia, Ib, Ic, Id" are "0, 0, 0, 0", "Ip1, Ip2, Ip3, Ip4" are "0, 0, 0, 0"; if "Ia, Ib, Ic, Id" are "0, 0, 0, 1", "Ip1, Ip2, Ip3, Ip4" are "0, 0, 0, 0"; if "Ia, Ib, Ic, Id" are "0, 0, 1, 1", "Ip1, Ip2, Ip3, Ip4" are "0, 0, 1, 1"; if "Ia, Ib, Ic, Id" are "0, 1, 0, 1", "Ip1, Ip2, Ip3, Ip4" are "0, 1, 0, 1"; if "Ia, Ib, Ic, Id" are "0, 1, 1, 0", "Ip1, Ip2, Ip3, Ip4" are "0, 1, 1, 0"; and so on.

When such table is set and held in the memory so that the contents of Ia, Ib, Ic, and Id represent an address, and data stored at that address are Ip1, Ip2, Ip3, and Ip4, the address defined by Ia, Ib, Ic, and Id is input to the memory to read out the corresponding Ip1, Ip2, Ip3, and Ip4, thus obtaining an interpolated value upon executing an interpolation process. Note that the arrangement of Ia, Ib, Ic, and Id defines a binary number, and if a numerical value obtained by converting this binary number into a decimal number is called a context, this scheme can be an embodiment for obtaining the interpolated values Ip1, Ip2, Ip3, and Ip4 using a context defined by Ia, Ib, Ic, and Id.

Note that the context is given by:

Context=2*2*2*Ia+2*2*Ib+2*Ic+Id

In the above-mentioned example of the scheme for obtaining an interpolated value using a context, the number of pixels to be referred to is four. However, this scheme is not limited to such specific number of pixels, and may be implemented using any numbers of pixels such as 12 pixels, as will be described below.

Figure 27A:
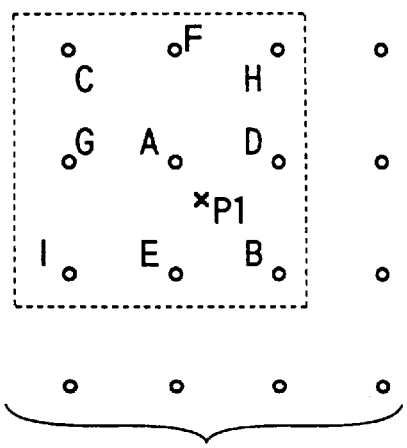
FIGS. 27A to 27D are views for explaining the interpolated pixel positions and the use range of a reference pixel in the up-sampling process used in the present invention.

As for the layout of the lecoded pixels and interpolated pixel, the following method is available. For example, nine pixels bounded by the dotted line are used as decoded pixels to obtain a context (=0 to 511) for an interpolated pixel P1, as shown in FIG. 27A, and the value of the interpolated pixel P1 is determined to be "0" or "1" depending on the obtained context.

Figure 27B:
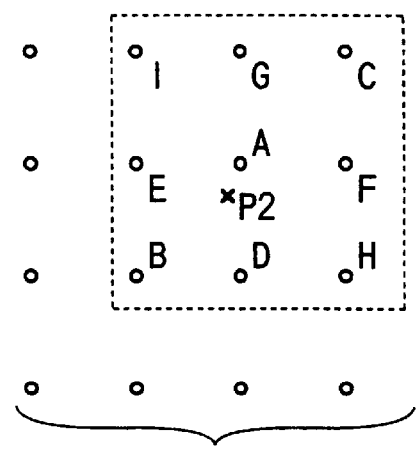
Figure 27C:
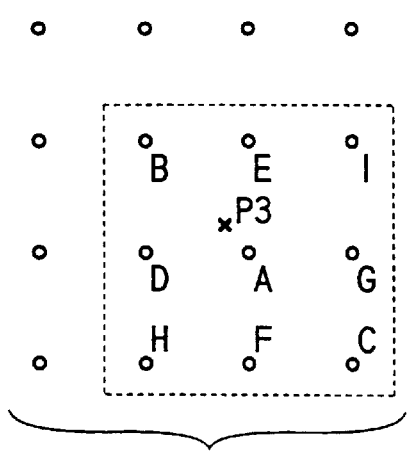
Figure 27D:
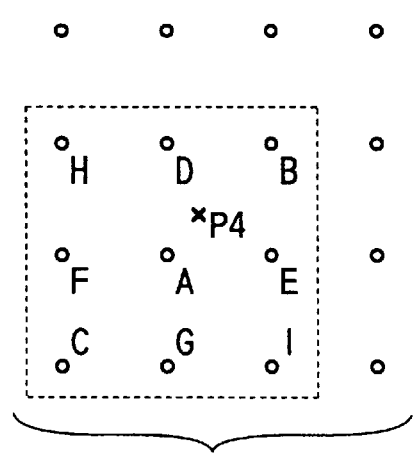

For interpolated pixels P2, P3, and P4, pixels bounded by the dotted lines in FIGS. 27B, 27C, and 27D are respectively used as decoded pixels in correspondence with the positional relationship between their interpolated position and four most neighboring decoded pixels that surround the position.

In this case, when decoded pixels A to I are set to have identical positions relative to the interpolated pixel P (for example, FIG. 27B has a layout obtained by rotating FIG. 27A 90° clockwise), if the decoded pixels have patterns obtained by rotating an identical pixel pattern, they yield an identical condext. Hence, interpolated pixels P1 to P4 can use a memory having common contents.

An example of up-sampling a 4×4 macro block to 16×16 pixels will be explained below.

When a 4×4 macro block is up-sampled to 16×16 pixels, a 4×4 size macro block MB is up-sampled to an 8×8 size, and the 8×8 size macro block MB is then up-sampled to a 16×16 size macro block MB.

Figure 28A:
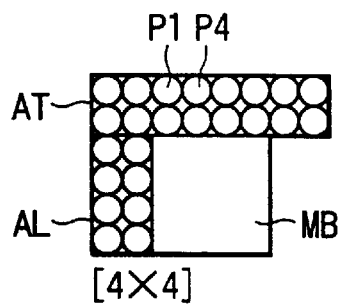
Figure 28B:
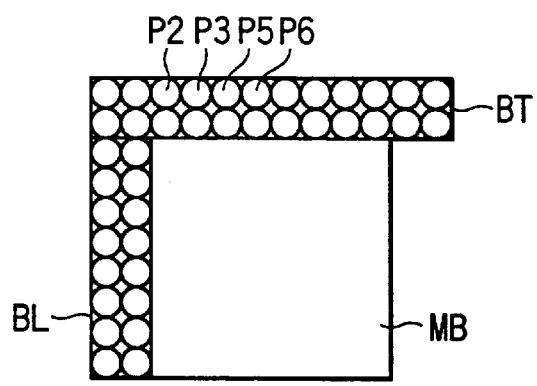

FIG. 28A shows external decoded pixels (to be referred to as borders hereinafter) AT and AL used when the 4×4 size macro block MB is up-sampled to an 8×8 size, and FIG. 28B shows borders BT and BL used when the 8×8 size macro block is up-sampled.

The borders AT have a 2 row×8 column layout, borders AL a 4 row×2 column layout, borders BT a 2 row×12 column layout, and borders BL an 8 row×2 column layout.

The values of these borders must be obtained as an average value of pixels at predetermined positions in the already decoded macro block, as will be described below with reference to FIG. 29. However, the binary image encoder 170 and binary image decoder 280 refer to the borders AT and AL upon encoding in a 4×4 pixel size, and when they refer to the borders BT and BL upon encoding in an 8×8 pixel size, the values of the borders AT and AL may be converted to obviate the need for border calculation only for up-sampling.

In this case, if the average values of the borders BT and BL are not calculated but are obtained from the borders AT and AL by the following process described in C language as a computer programming language, the average value operation can be omitted although the results are slightly different from average values:

BT[0][0]=AT[0][0]
BT[0][1]=AT[0][1]
BT[1][0]=AT[1][0]
BT[1][1]=AT[1][1]
BT[0][10]=AT[0 ][6]
BT[0][11]=AT[0][6]
BT[1][10]=AT[1][6]
BT[1][11]=AT[1][7]
for (j=0;j<2;j++) for (I=0;j<8;j++
{
  BT[j][i+2]=AT[j][i/2+2];
  BT[i][j]=AT[i/2][j]

The above-mentioned process generates BT and BL by additionally processing pixels repetitively using AT and AL values in such a manner that, for example, a pixel p1 in FIGS. 28A and 28B is copied to pixels p2 and p3, and a pixel p4 is copied to pixels p5 and p6. Note that "[ ] [ ]" in C program indicates an array, and a numeral in [] is a decimal number.

The detailed scheme of the up-sampling process have been described. The detailed scheme of the down-sampling process will be explained below.

Figure 30:
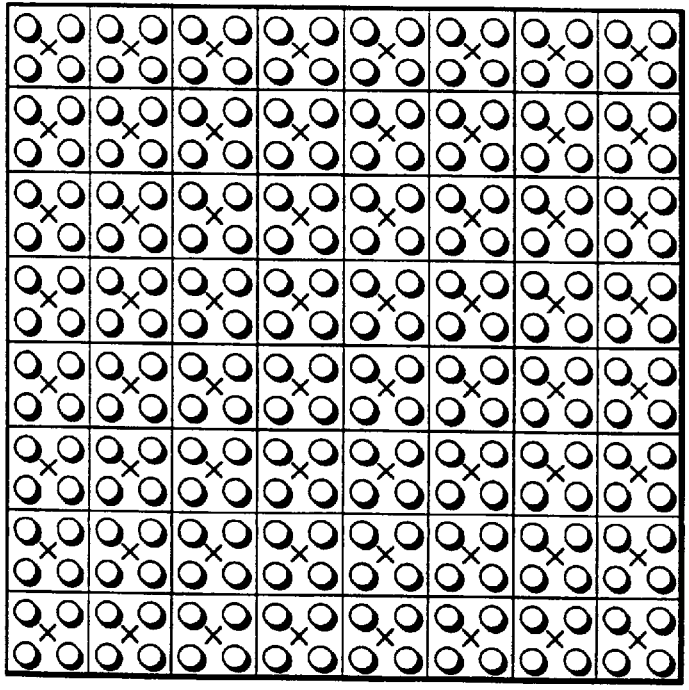
FIG. 30 is a view for explaining an example of a down-sampling process for down-sampling a block (macro block) to a size of "1/2" in both the vertical and horizontal directions.

FIG. 30 shows an example of the down-sampling process for down-sampling a block (macro block) to a "1/2" size in both the vertical and horizontal directions. In this example, assuming that the area in each dotted line window is a unit down-sampling block area, the average value of 2×2 pixels (a total of four pixels indicated by "○" in each dotted line window) in the unit down-sampling block area is used as a pixel value in that unit down-sampling block area. More specifically, when a macro block is down-sampled to a "1/4" size in both the vertical and horizontal directions, the average value of 4×4 pixels is obtained in units of unit down-sampling block areas, and is used as a pixel value in that unit down-sampling block area.

Figure 31:
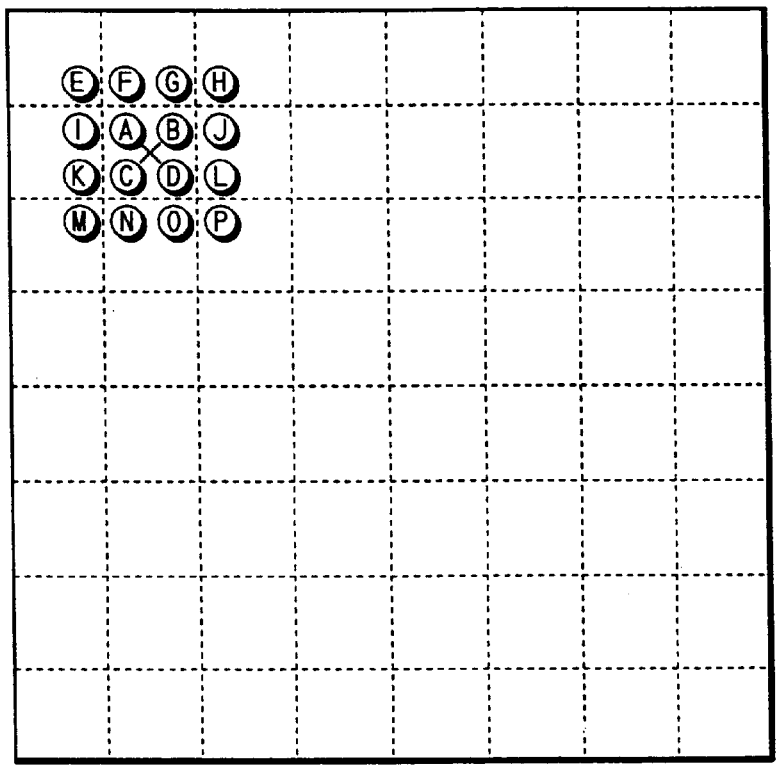
FIG. 31 is a view for explaining an example of a scheme for obtaining a pixel value of a down-sampled block.

Assuming a given unit down-sampling block area including pixels A, B, C, and D, as shown in FIG. 31, upon determining the value of this unit down-sampling block area by calculating the value of a pixel X in the unit down-sampling block area, pixels E, F, G, H, I, J, K, L, M, N, O, and P in a broader range may also be used, and the average value of these pixels A to P may be calculated in place of calculating the average value of the pixels A to D. That is, of pixels in neighboring unit down-sampling block areas, those that neighbor the pixels A to D are also used in calculating the average value, and the average value of these pixels is adopted.

In the above description, the average value of the existing pixel values is determined to be the pixel value of the unit down-sampling block area to decrease the number of pixels in that unit down-sampling block area, thereby down-sampling a macro block. Also, a macro block may be down-sampled by a mechanical thinning process without requiring such calculations.

This example will be explained below. A closed process within a macro block will first be explained.

Figure 32:
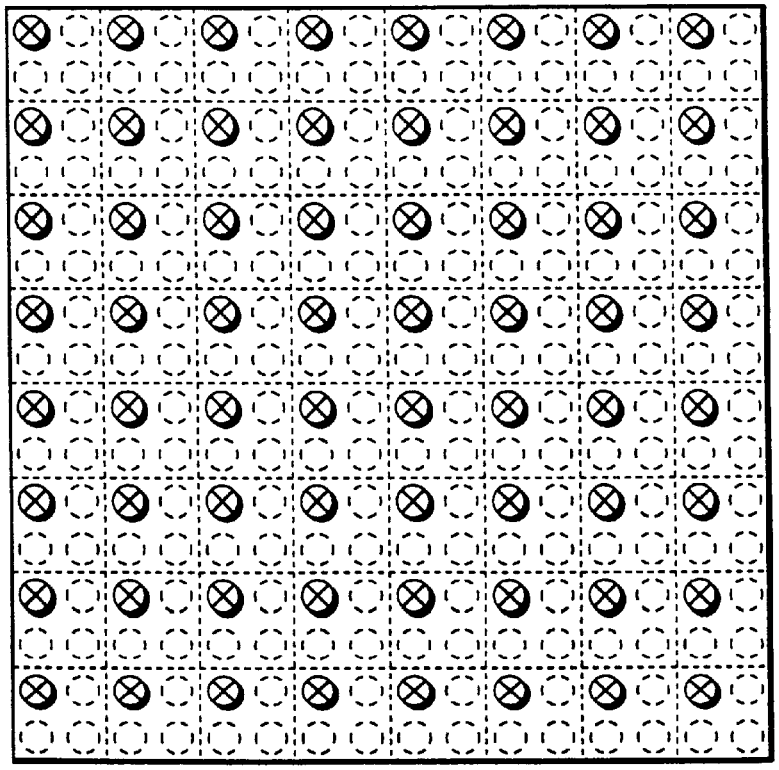
FIG. 32 is a view for explaining an example of a down-sampling process based on pixel thinning.

FIG. 32 shows an example of the down-sampling process by means of pixel thinning. More specifically, FIG. 32 shows the state wherein a macro block MB consisting of 16×16pixels is down-sampled by means of pixel thinning to a block consisting of 8×8 pixels. That is, the pixels indicated by dotted open circles in FIG. 32 are thinned pixels, and the pixels indicated by solid open circles become pixel values of unit down-sampling block areas ("x" in FIG. 32). In this case, the conversion ratio (CR) indicates the ratio of pixels to be thinned. Note that the pixel thinning method is not limited to the method described with the aid of FIG. 32. For example, pixels may be thinned in a 5-spot face pattern of one of dice. In this case, an up-sampling process corresponds to interpolation of thinned pixels. The detailed methods of various down-sampling processes have been explained. An up-sampling process will be explained below.

Figure 33:
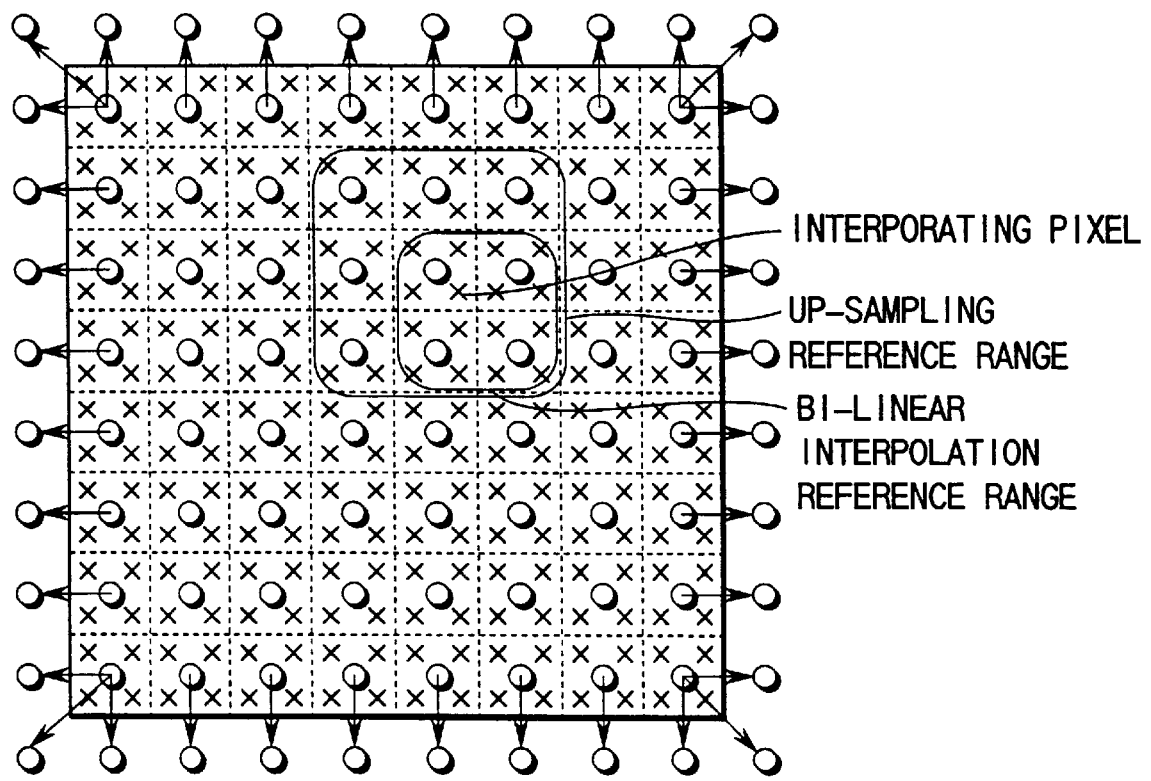
FIG. 33 is a view for explaining an example of an up-sampling process used in the present invention.

FIG. 33 shows an up-sampling process. In FIG. 33, a solid rectangular window indicates a macro block, and each square in portions indicated by dotted windows indicates a unit down-sampling block area. An open circle in each unit down-sampling block area represents a coded pixel, and the number of pixels is increased by interpolation to up-sample the macro block. The interpolated pixels are indicated by "x", and after interpolation, a pixel indicated by "○" becomes an unnecessary pixel.

Upon interpolating pixels in the boundary portion of a macro block, pixel values outside the macro block are required. In this case, as indicated by arrows in FIG. 32, most neighboring pixels in the macro block can be assigned.

More specifically, when pixel interpolation in a given unit down-sampling block area is to be done, a total of nine pixel values, i.e., its own pixel value and those of eight surrounding blocks as neighboring unit down-sampling block areas, are required in the process. However, when the unit down-sampling block area in the macro block is located in the boundary portion of the macro block, since some of eight surrounding blocks belong to another macro block, pixel values outside the macro block to which that down-sampling block area belongs must be additionally used. In this case, as indicated by arrows in FIG. 32, the pixel values of pixels closest to those in the macro block to which that down-sampling block area belongs are assigned to surrounding blocks, and can be temporarily used as the pixel values in the neighboring unit down-sampling block areas required in the process of the pixel values.

Figure 29:
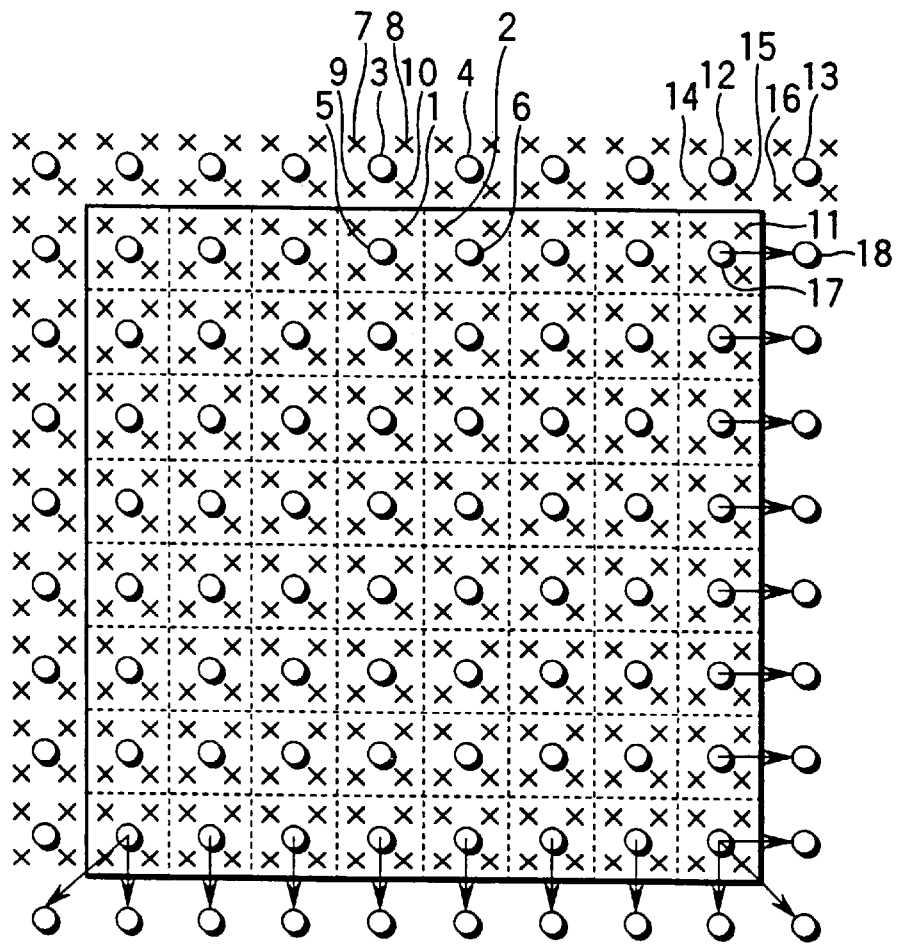
FIG. 29 is a view for explaining another example of the size conversion process in units of blocks.

Note that the size conversion process in units of macro blocks need not be closed within each macro block, but may use decoded values (pixel values in left, upper, upper left, and upper right neighboring blocks) near the block, as shown in FIG. 29.

This will be explained in detail below.

In FIG. 29, a solid rectangular window indicates a given block (macro block), and "x" marks indicate pixels of an image (standard magnification image) when the magnification is 1×. The macro block is normally made up of 16×16 pixels. When a frame is compressed to 1/2, the block is made up of 8×8 pixels, and an image for 2×2 pixels in the 16×16 pixel block is expressed by one pixel. The image for 2×2 pixels in this case is indicated by a "○" mark in FIG. 29 by expression information of a representative point in the one-pixel expression format. Each window bounded by dotted lines corresponds to a unit down-sampling block area, i.e., a 4-pixel (2×2) area in a standard magnification image. In case of 1/2 down-sampling, this dotted window area is expressed by one pixel.

When a 1/2 down-sampled image is restored to an original image size (i.e., is restored to a standard magnification image), each 1-pixel area of the 1/2 down-sampled image is restored to a 4-pixel area. This process is done by interpolation as follows in place of the closed process within the macro block.

For example, in FIG. 29, assume that pixels 1 and 2 in a given unit down-sampling block area (dotted window area) of a certain macro block are decoded by interpolation. At the time of the process, pixel information indicated by a "○" mark exists. Hence, since coded pixels present around pixels 1 and 2 to be interpolated are pixels 3, 4, 5, and 6, linear interpolation is done using these pixels 3, 4, 5, and 6. However, "pixel 3" and "pixel 4" are those belonging to a neighboring block (neighboring macro block), and are those before up-sampling (pixels of a 1/2 down-sampled image). In addition, since the neighboring block is located at a position to be processed before the macro block of interest, after up-sampling of this macro block, data of "pixel 3" and "pixel 4" may be already discarded to save memory resources since they are unnecessary ones at the time of the process of the macro block of interest.

In such system, as one method of determining the value of, for example, "pixel 3", the average value of pixels 7, 8, 9, and 10 as neighboring coded pixels that have already been interpolated in that macro block may be calculated, and may be used as the value of "pixel 3" that has already been discarded. When the calculations for obtaining the average value are to be simplified, the average value of pixels 9 and 10, near pixels 1 and 2 to be interpolated, of a total of four pixels 7, 8, 9, and 10, may be used as the value of "pixel 3" that has already been discarded.

Also, when pixel 10 is used as the value of "pixel 3", the calculations can be further simplified. As for "pixel 4" as well, a nearby pixel value is similarly used. In a similar case, upon interpolating "pixel 11", the average value of pixels 14 and 15 is used instead of "pixel 12", pixel 16 is used instead of "pixel 13", and pixel 17 is used instead of pixel 18.

Figure 34A:
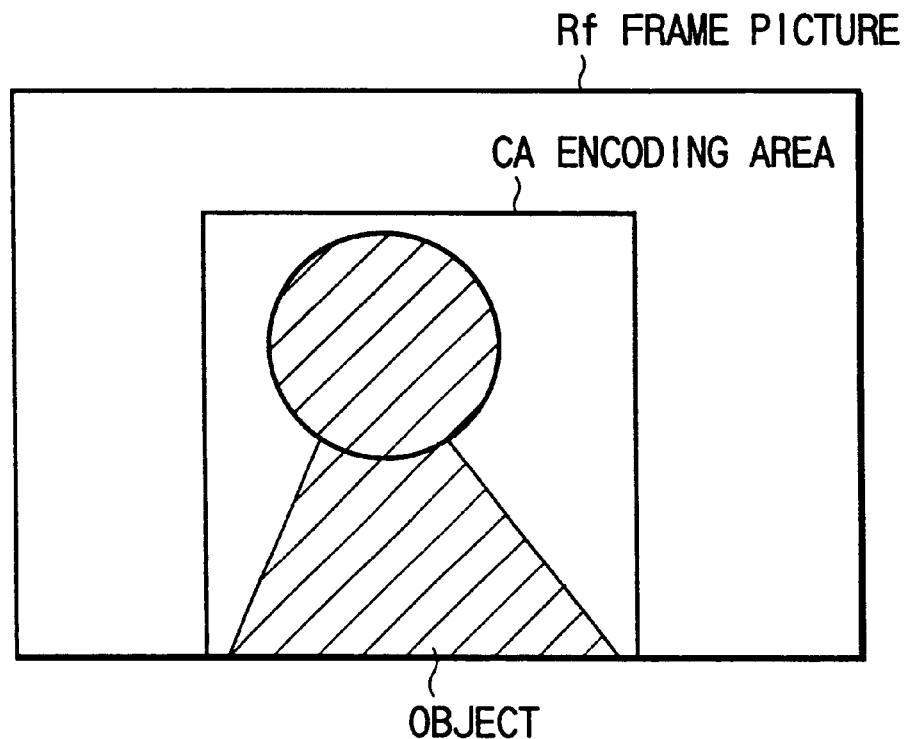
FIGS. 34A and 34B are views for explaining the process contents for attaining 2× up-sampling in both the horizontal and vertical directions by a linear interpolation process used in the present invention.

Since a frame image Pf is normally encoded by dividing a tightest rectangle range mainly including an object portion, e.g., a video object plane CA shown in FIG. 34A, into blocks (macro blocks), left, upper, upper left, and upper right neighboring blocks of a given block located in the boundary portion of the video object plane may often be located outside the video object plane CA.

In this case, even when decoded pixel values (values of decoded pixels) near the block are used, as shown in FIG. 29, if these pixel values belong to a macro block located outside the video object plane CA, these decoded bothxel values are not referred to, but the values of pixels closest to those in the own macro block may be temporarily assigned to that block and used, as shown in FIG. 33.

Furthermore, upon exchanging data via a transmission path that may be influenced by errors, the encoding process is often closed within a unit (this will be called a "video packet") smaller than the video object plane CA to avoid the influences of errors.

Figure 34B:
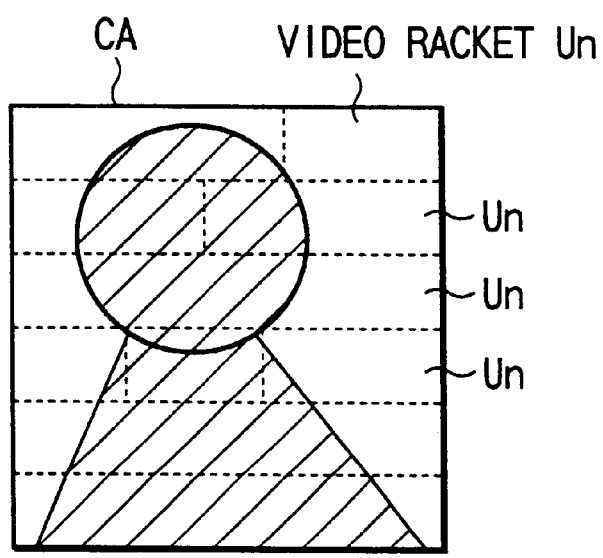

With this process, the influences of errors can be blocked by this "video packet", and an image is hardly influenced by errors. Note that the "video packet" indicates each area denoted by symbol Un and bounded by dotted lines in FIG. 34B. The "video packet" is a small area obtained by dividing the video object plane CA, but is also made up of a plurality of macro blocks.

In case of this method, since the encoding process is closed within the "video packet", even if data used in a given "video packet" include those suffering transmission errors, those error data are referred to and processed within that "video packet" alone, and neighboring "video packets" never refer to and process error data, thus realizing a process method in which transmission errors hardly propagate.

In this case as well, when decoded pixel values near the block are used, as shown in FIG. 29, closest pixel values within that macro block are assigned, as shown in FIG. 33, without referring to the decoded pixel values of a macro block that belongs to a video packet other than the "video packet" which includes that block.

"Whether or not values outside a macro block or video packet are to be referred to", described above, may be switched based on a switching bit prepared in a code, thus coping with various situations such as the transmission error frequency, allowable calculation volume, memory capacity, and the like.

In the above-mentioned linear interpolation, a process is done using four surrounding pixels alone. For this reason, discontinuity especially in the oblique direction is produced in an image defined by decoded pixels, and visual deterioration tends to occur. In order to avoid such tendency, for example, taking interpolation of the pixels to be interpolated in FIG. 33 as an example, these pixels are interpolated using pixels included in an up-sampling reference range broader than the reference range of linear interpolation.

That is, when pixels are interpolated using those included in the up-sampling reference range broader than the reference range of linear interpolation, the problem of discontinuity can be avoided. On the other hand, if an odd number of pixels like "nine pixels" is used in interpolation rather than an even number of pixels like "four pixels", a majority effect can be obtained and a marked effect of avoiding the discontinuity can be more obtained in some cases.

FIG. 26B shows an example of interpolation using 12 pixels. Using the descriptions of the embodiment described previously with the aid of FIG. 26A, when p1, p2, p3, and p4 represent the decoded pixels at certain positions in a given macro block in a 1/2 down-sampled image, and Ip1, Ip2, Ip3, and Ip4 represent their values (pixel values), these values Ip1, Ip2, Ip3, and Ip4 are described by:

Ip1: If($4*Ia+2*(Ib+Ic+Id)+Ie+If+Ig+Ih+Ii+Ij+Ik+Il)>8$ then "1" else "0"

Ip2: If($4*Ib+2*(Ia+Ic+Id)+Ie+If+Ig+Ih+Ii+Ij+Ik+Il)>8$ then "1" else "0"

Ip3: If($4*Ic+2*(Ib+Ia+Id)+Ie+If+Ig+Ih+Ii+Ij+Ik+Il)>8$ then "1" else "0"

Ip4: If($4*Id+2*(Ib+Ic+Ia)+Ie+If+Ig+Ih+Ii+Ij+Ik+Il)>8$ then "1" else "0"

where a is the pixel A, b the pixel B, c the pixel C, d the pixel D, e the pixel E, f the pixel F, g the pixel G, h the pixel H, i the pixel I, j the pixel J, k the pixel K, and l the pixel L.

On the other hand, a "1/4" size conversion process may be implemented by repeating the "1/2" size conversion process twice.

An example of a combination with the size conversion process in units of frames will be described below as the fifth embodiment.

The technique disclosed in Japanese Patent Application No. 8-237053 by the present inventors presents an embodiment for realizing rate control by executing size conversion in units of frames (in practice, a rectangle area including an object) and an embodiment for realizing rate control by executing size conversion in units of small areas such as blocks. Also, the first to third embodiments described above have presented examples of realizing rate control by executing size conversion in units of more practical small areas.

In this embodiment to be described below, an example of using a combination of a size conversion process in units of frames and that in units of small areas will be described.

Figure 35:
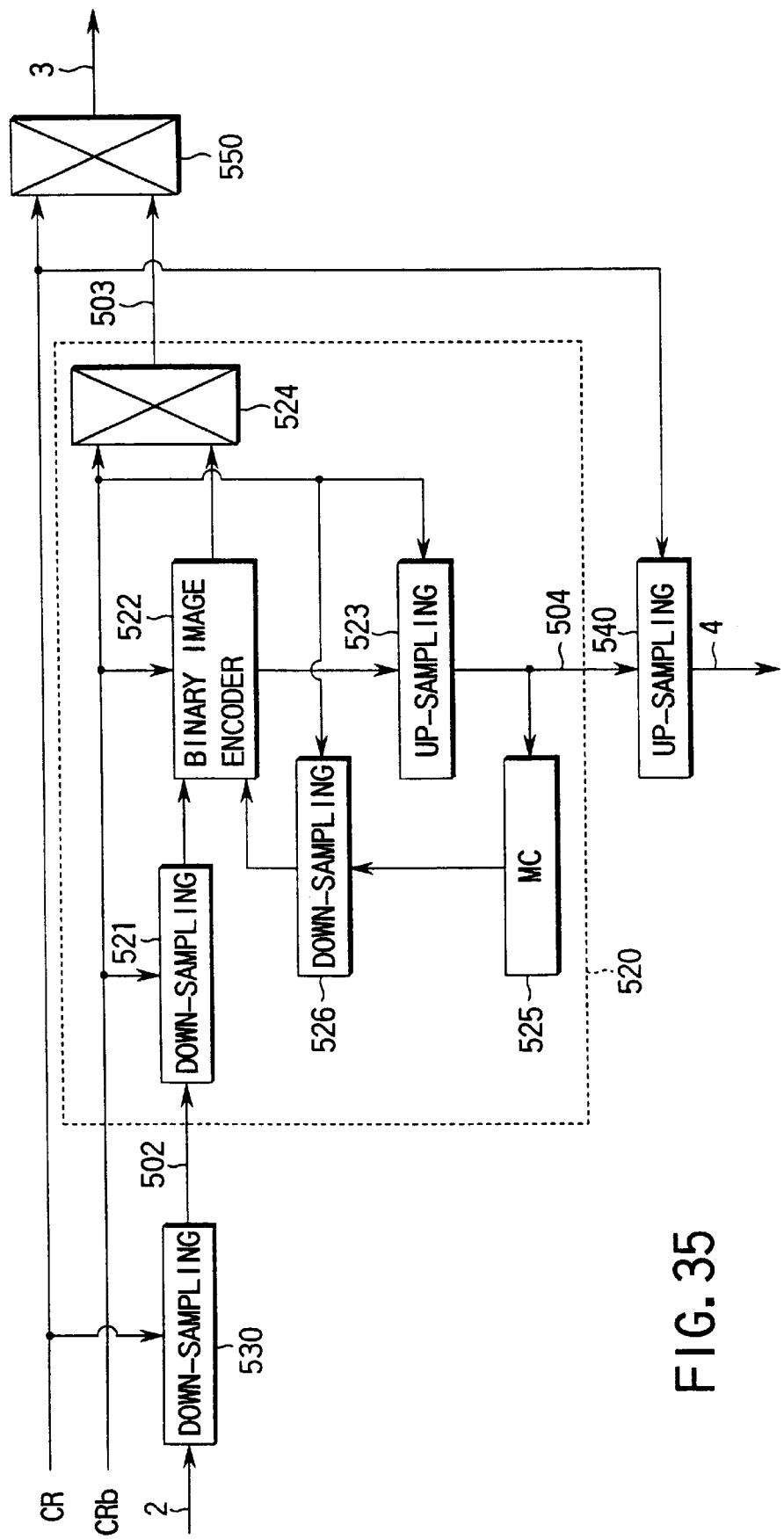
FIG. 35 is a block diagram of an alpha-map encoder as a combination of size conversion in units of frames and that in units of small areas according to the fifth embodiment of the present invention.

FIG. 35 is a view for explaining an alpha-map encoder of this embodiment. This encoder comprises down-sampling circuits 530, 521, and 526, binary image encoder 522, up-sampling circuits 523 and 540, motion estimation/compensation circuit 525, and multiplexers 524 and 550.

In this arrangement, a binary alpha-map image supplied via an alpha-map signal input line 2 is down-sampled by the down-sampling circuit 530 in units of frames on the basis of a conversion ratio CR. The signal down-sampled in units of frames is supplied to an alpha-map encoder 520 via a signal line 502, and is encoded after it is divided into small areas.

Since the alpha-map encoder 520 is equivalent to the alpha-map encoder 20 shown in FIG. 12, and the constituting elements 521 to 526 of the alpha-map encoder 520 respectively have the same functions as those of the constituting elements 21 to 26 of the alpha-map encoder 20 shown in FIG. 12, a detailed description of the alpha-map encoder 520 will be omitted. Also, since the arrangement of the alpha-map encoder 20 shown in FIG. 12 is obtained by more simply expressing that of the alpha-map encoder 20 shown in FIG. 1, the arrangement of the alpha-map encoder 520 may be equivalent to that of the alpha-map encoder 20 shown in FIG. 1.

Encoded information encoded by the alpha-map encoder 520 is multiplexed with a conversion ratio CRb in units of small areas. The conversion ratio CRb is supplied to the multiplexer 550 via a signal line 503, and is multiplexed with encoded information of a conversion ratio CR in units of frames. Then, the multiplexed signal is output via a signal line 3.

A decoded image of the alpha-map encoder 520 is supplied to the up-sampling circuit 540 via a signal line 504, and is up-sampled on the basis of the conversion ratio CR in units of frames. After that, the up-sampled image is output via a signal line 4.

Figure 36:
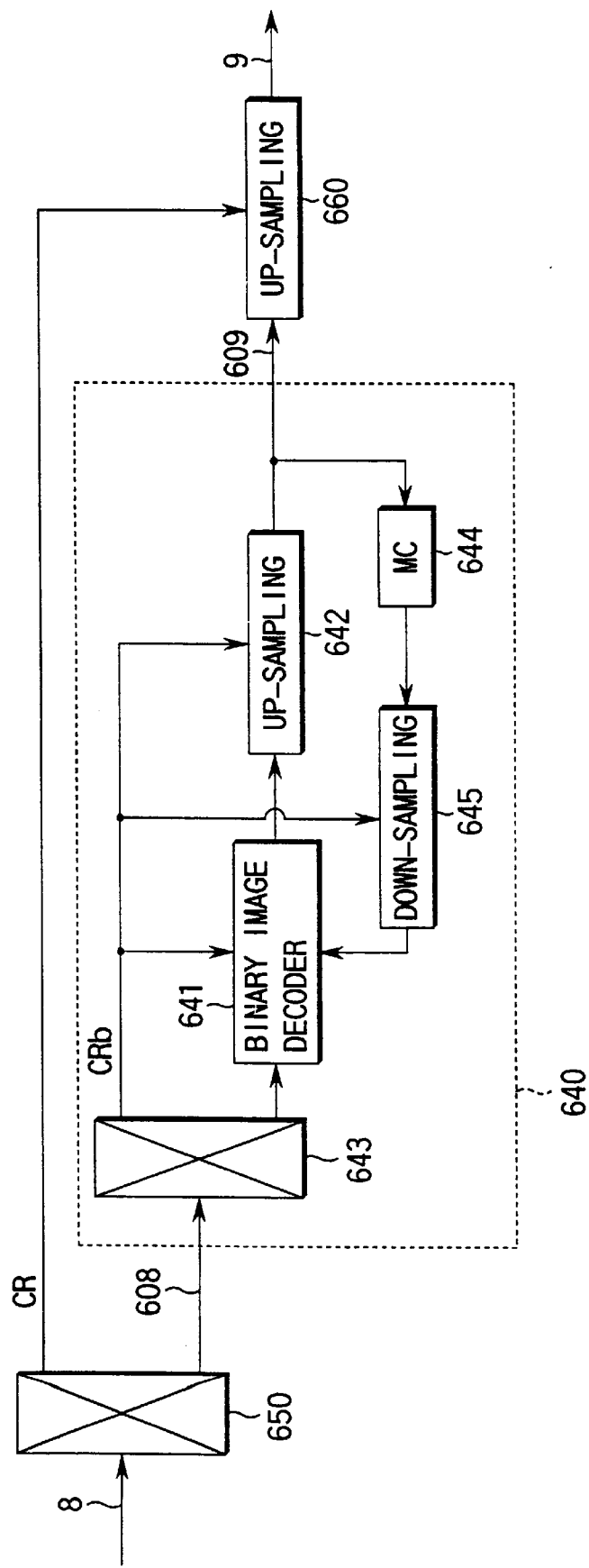
FIG. 36 is a block diagram of an alpha-map decoder corresponding to the alpha-map encoder shown in FIG. 35.

FIG. 36 is a view for explaining a decoding apparatus of this embodiment. This alpha-map decoding apparatus comprises demultiplexers 650 and 643, binary image decoder 641, down-sampling circuit 645, motion estimation/compensation circuit 644, and up-sampling circuits 642 and 660.

In this arrangement, encoded information supplied via a signal line 8 is demultiplexed by the demultiplexer 650 into a conversion ratio CR in units of frames and encoded information in units of small areas. The encoded information in units of small areas is supplied to the alpha-map decoder 640 via a signal line 608, and the decoded signal in units of small areas is supplied to the up-sampling circuit 660 via a signal line 609.

Since an alpha-map decoder 640 is equivalent to the alpha-map decoder 40 shown in FIG. 13, a description thereof will be omitted. Since the arrangement of the alpha-map decoder 40 shown in FIG. 13 is obtained by more simply expressing that of the alpha-map decoder 40 shown in FIG. 2, the arrangement of the alpha-map decoder 640 may be equivalent to that of the alpha-map decoder 40 shown in FIG. 2.

The up-sampling circuit 660 up-samples the decoded signal supplied via the signal line 609 on the basis of a conversion ratio CR in units of frames, and outputs the up-sampled signal via a signal line 9.

In this way, in this embodiment, an alpha-map signal is size-converted in units of frames, and is also size-converted in units of small areas. The combination of size conversion in units of frames and that in units of small areas is particularly effective for encoding at low encoding rate since the need for side information such as conversion ratio information can be obviated.

A frame memory will be briefly described below.

Figure 37:
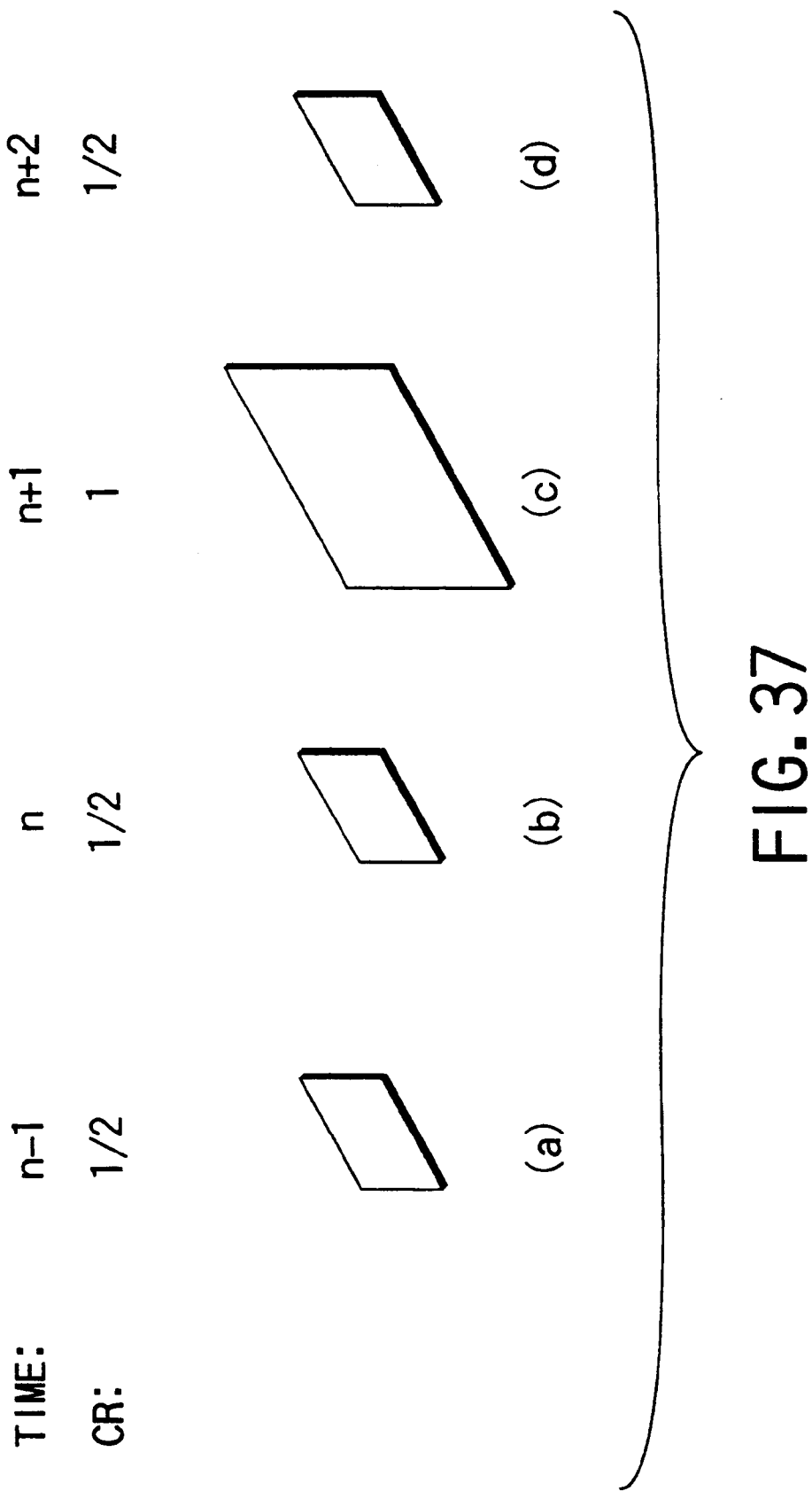
FIG. 37 is a view for explaining an example of resolutions in units of frames.

Although not clearly shown in FIGS. 35 and 36, both the encoding and decoding apparatuses require frame memories for storing decoded images. FIG. 37 shows an example of resolutions in units of frames. Since the present invention uses motion estimation/compensation, for example, when a frame at time n is to be encoded, the resolution of the frame at time n−1 must be matched with that (in this case, the conversion ratio) of the frame at time n. Note that a decoded image is stored in the frame memory in two ways, i.e., at a resolution in units of frames, as shown in FIG. 37 (in this example, a frame at time n is stored at CR=1/2 ((a) of FIG. 37); a frame at time n is stored at CR=1 ((c) of FIG. 37)) or at an original resolution (always stored at a conversion ratio CR=1 irrespective of time).

In the former case, the frame memory stores a decoded image at a resolution in units of frames supplied via the signal line 504 or 609. In the latter case, the frame memory stores a decoded image at an original resolution supplied via the signal line 4 or 9.

Figure 38:
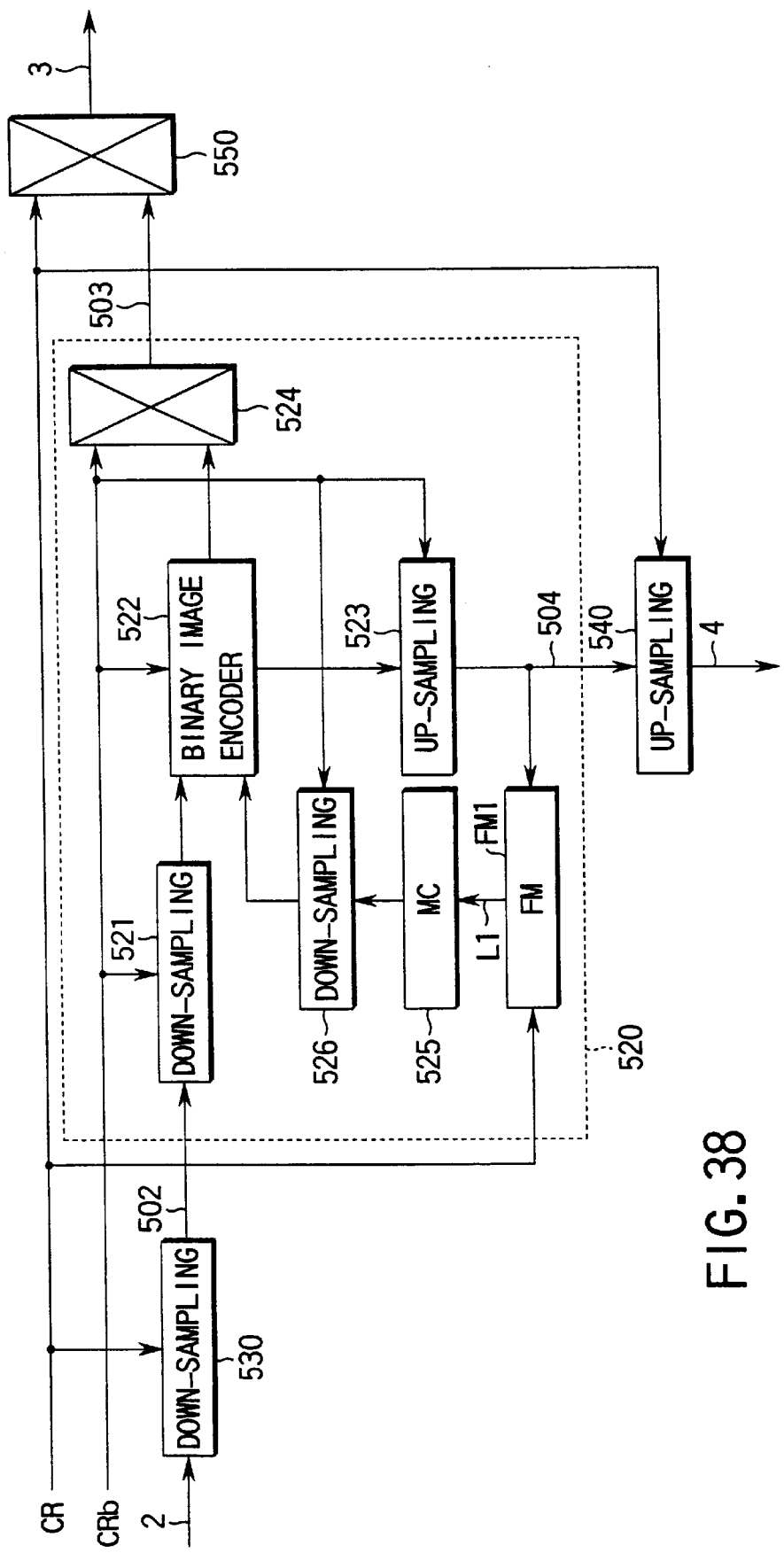
FIG. 38 is a block diagram of an encoding apparatus which is illustrated to actually include a frame memory required in the encoding apparatus shown in FIG. 35.
Figure 39:
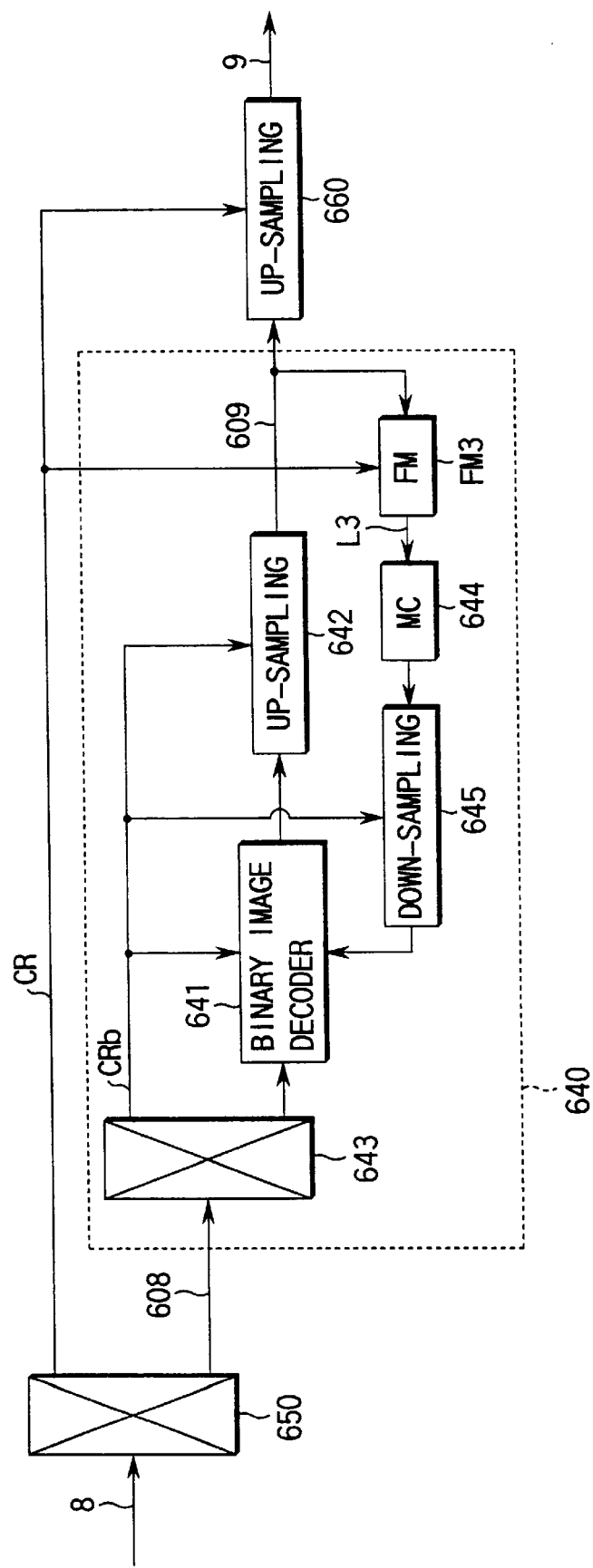
FIG. 39 is a block diagram of a decoding apparatus which is illustrated to actually include a frame memory required in the decoding apparatus shown in FIG. 36.
Figure 40:
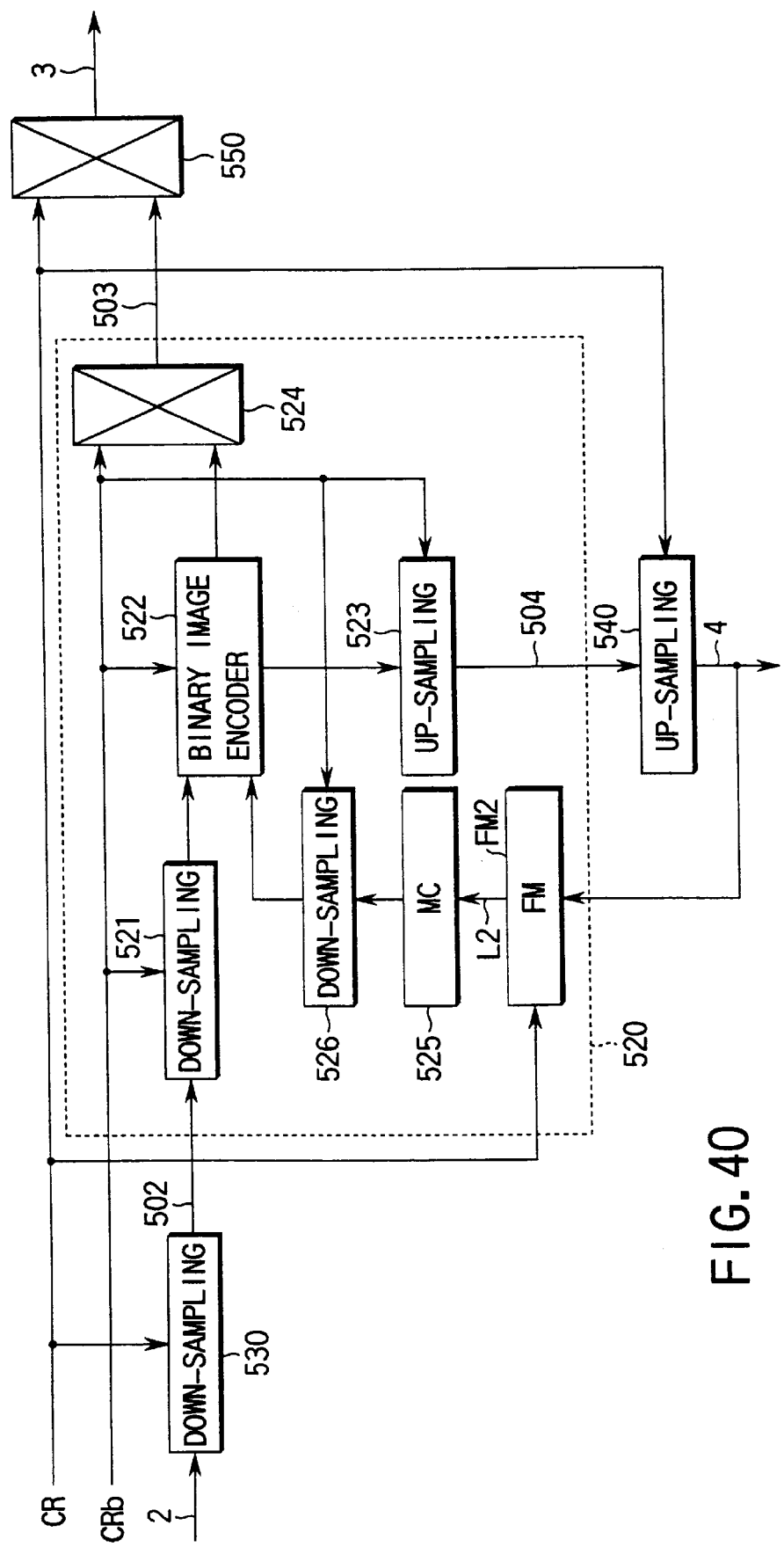
FIG. 40 is a block diagram of another encoding apparatus which is illustrated to clearly include a frame memory required in the encoding apparatus shown in FIG. 35.
Figure 41:
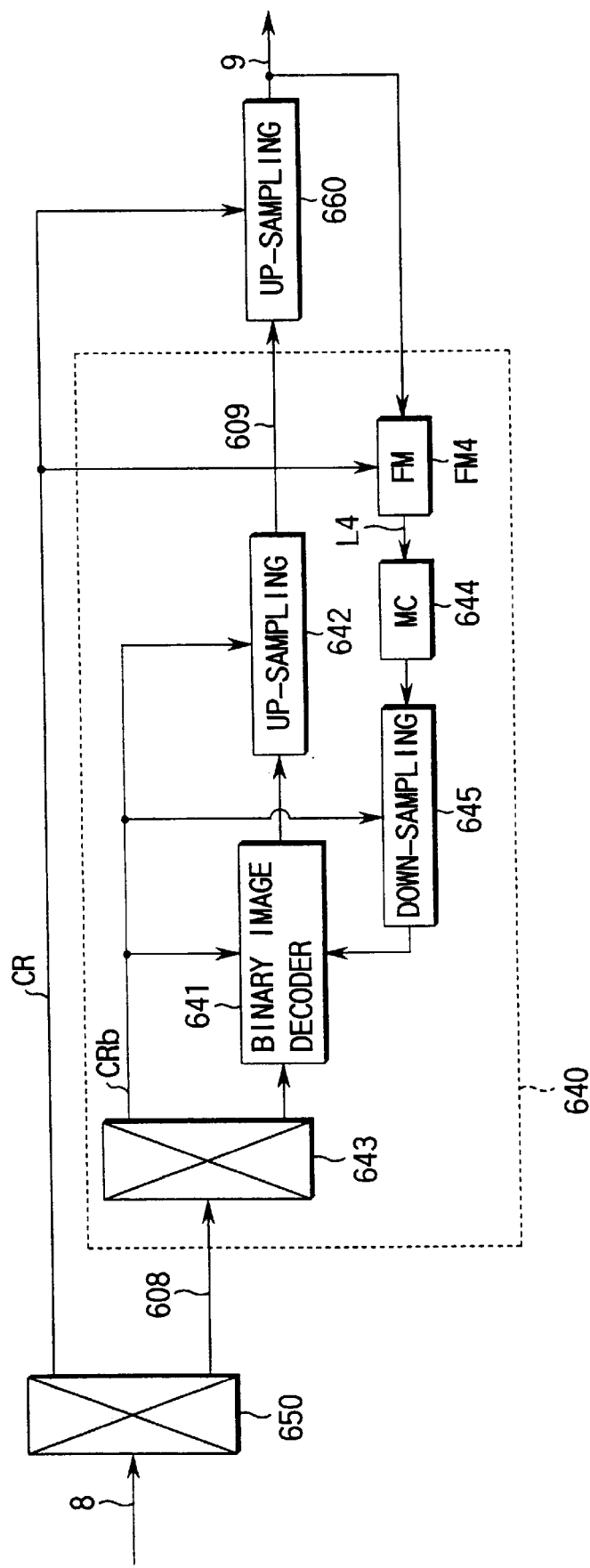
FIG. 41 is a block diagram of another decoding apparatus which is illustrated to clearly include a frame memory required in the decoding apparatus shown in FIG. 36.

Therefore, when the frame memories are explicitly included in the elcoding apparatus shown in FIG. 35 and decoding apparatus shown in FIG. 36, the former frame memories (indicated by FM1 (for the encoding apparatus) and FM3 (for the decoding apparatus) are as shown in FIGS. 38 and 39, and the latter frame memories (indicated by FM2 (for the encoding apparatus) and FM4 (for the decoding apparatus) are as shown in FIGS. 40 and 41.

More specifically, in the encoding apparatus shown in FIG. 38, information of a conversion ratio CR and output information of the up-sampling circuit 523 are stored in the frame memory FM1, and the held information is supplied to the MC (motion estimation/compensation circuit) 525. In the decoding apparatus shown in FIG. 39, CR information and the output from the up-sampling circuit 642 are stored in the frame memory FM3, and the stored output is supplied to the motion estimation/compensation circuit 644.

On the other hand, in the encoding apparatus shown in FIG. 40, information of a conversion ratio CR and output information of the up-sampling circuit 540 are held in the frame memory FM2, and that held information is supplied to the MC (motion estimation/compensation circuit) 525. In the decoding apparatus shown in FIG. 41, CR information and the output from the up-sampling circuit 660 are stored in the frame memory FM3, and the stored output is supplied to the motion estimation/compensation circuit 644

Figure 42A:
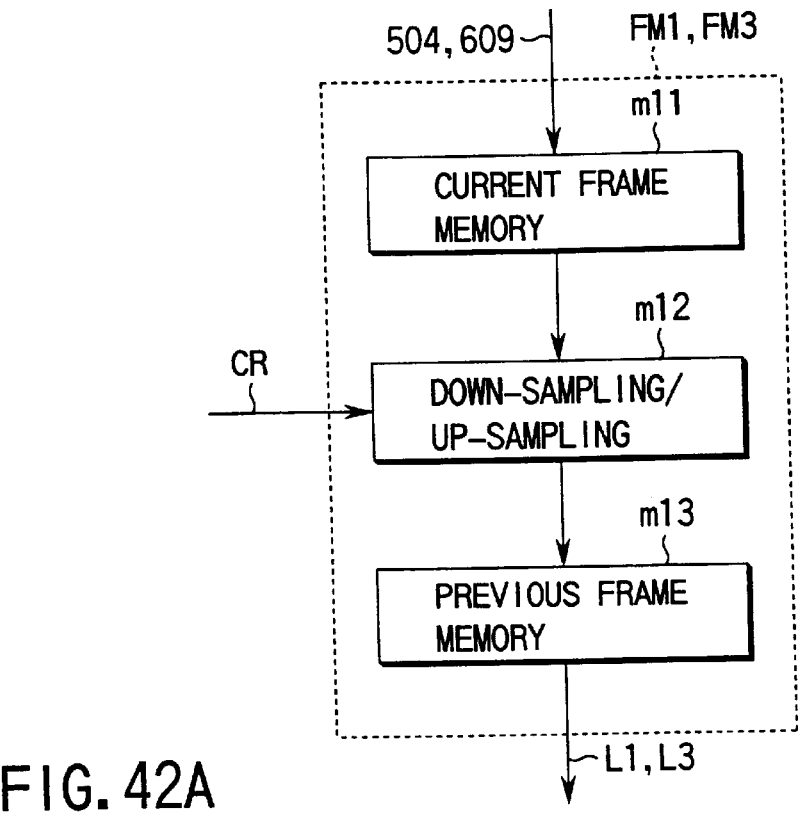
FIG. 42A is a block diagram of the frame memory used in the encoding apparatus of the present invention.
Figure 42B:
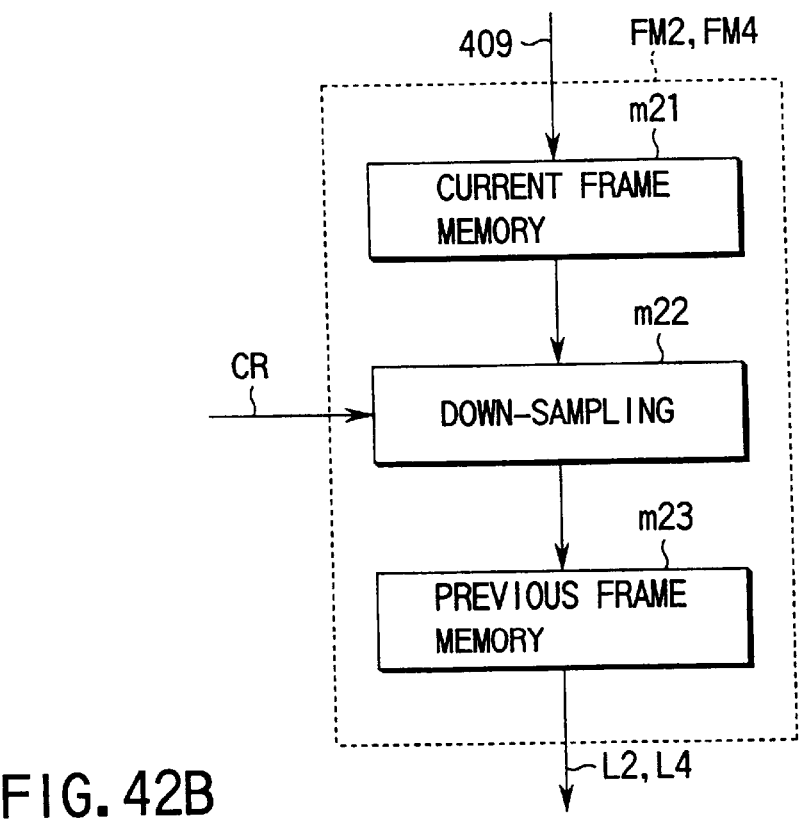
FIG. 42B is a block diagram of the frame memory used in the decoding apparatus of the present invention.

FIG. 42A shows the detailed arrangement of the frame memories FM1 and FM3, and FIG. 42B shows the detailed arrangement of the frame memories FM2 and FM4.

As shown in FIG. 42A, the frame memory FM1 or FM3 comprises a frame memory m11 for holding an image of the current frame, a size conversion circuit m12 for performing a size conversion process for the image held in the frame memory m11 in correspondence with separately input information of a size conversion ratio CR, and a frame memory m13 for storing the output size-converted by the size conversion circuit m12. On the other hand, as shown in FIG. 42B, the frame memory FM2 or FM4 comprises a frame memory m21 for storing an image of the current frame, a down-sampling circuit m22 for down-sampling the image held in the frame memory m21 in correspondence with separately input information of a size conversion ratio CR, and a frame memory m12 for storing the output down-sampled by the down-sampling circuit m22.

The operations in the frame memories with such arrangements will be described below.

In case of the frame memory FM1 or FM3, a decoded image having a resolution corresponding to the current frame is supplied in units of frames via the signal line 504 or 609, and is stored in the frame memory m11 for storing the current frame. The frame memory m11 stores the entire decoded image of the current frame at the time of completion of encoding of the current frame (e.g., at time n).

At the beginning of encoding of a frame at time n+1, the size conversion circuit m12 reads out the decoded image of the frame at time n from the frame memory m11, and performs a size conversion process (resolution conversion) to match the size conversion ratio CR in units of frame for the frame at time n+1.

In the example shown in FIGS. 37A to 37D, the size conversion ratio CR of a frame at time n is "1/2", as shown in FIG. 37A, and the size conversion ratio CR of a frame at time n+1 as the next frame is "1", as shown in FIG. 37B. In this case, the size conversion circuit m12 performs a process for converting the size conversion ratio CR from "1/2" to "1".

The decoded image at time n resolution-converted by the size conversion circuit m12 is stored in the frame memory m13 for the previous frame, and is used as a reference image in motion estimation/compensation for the frame at time n+1.

In case of the frame memory FM2 or FM4, a decoded image having an original resolution (CR=1) is supplied to the frame memory via the signal line 4 or 9, and is stored in the frame memory m21 for the current frame. The frame memory m21 stores the entire decoded image of the current frame at the time of completion of encoding of he current frame (e.g., at time n).

At the beginning of encoding of a frame at time n+1, the down-sampling circuit m22 reads out the decoded image of the frame at time n from the frame memory m21, and performs down-sampling (resolution conversion) to match the size conversion ratio CR in units of frames for the frame at time n+1.

Since the decoded image stored in the frame memory m21 always has a size conversion ratio CR=1, and the size conversion ratio CR at time n+1 is "1" in the example shown in FIGS. 37A to 37D, the down-sampling circuit m22 does not perform any resolution conversion process in this case. In the example shown in FIGS. 37A to 37D, when the current frame is that at time n+1, since the resolution of a frame at time n+2 is "1/2", the down-sampling circuit m22 performs a resolution conversion process for converting the size conversion ratio CR from "1" to "1/2".

The decoded image of the frame at time n, which is resolution-converted by the down-sampling circuit m22 is stored in the frame memory m33 for the previous frame, and is used as a reference image in motion estimation/compensation of a frame at time n+1.

The detailed arrangements and operations of the frame memories FM1, FM2, FM3, and FM4 have been described.

The frame memories FM1 and FM3 are characterized in that they store decoded images having resolutions in units of frames supplied via the signal lines 504 and 609, and the frame memories FM2 and FM4 are characterized in that they store decoded images having resolutions in units of frames supplied via the signal lines 4 and 9. For this reason, these memories may have various other arrangements.

An example of a method of encoding mode information of a macro block will be described below as the sixth embodiment. A method proposed by Japanese Patent Application No. 8-237053 will first be explained.

FIGS. 43A and 43B show an example of mode information of macro blocks at times n and n−1. Note that the mode information is information indicating the contents of each macro block such as "transparent" (all the constituting pixels in that macro block are transparent), "opaque" (all the constituting pixels in that macro block are opaque), and "Multi" (the constituting pixels in that macro block are partly transparent and partly opaque).

For example, "transparent" is labeled by code "0", "opaque" is labeled by code "3", and "Multi" is labeled by code "1".

When a tightest rectangle area including an object portion in a frame is considered, and is set so that its upper right position contacts the boundary portion of the area, the distribution (label distribution) of mode information of macro blocks included in the set rectangle area becomes as shown in, e.g., FIGS. 43A and 43B.

As can be seen from the distribution examples of the constituting pixel mode information of the macro blocks for the frames at times n and n−1 shown in FIGS. 43A and 43B, alpha-maps for temporally adjacent frames have very similar label distributions.

Therefore, in such case, since the labels have high correlation between the frames, the encoding efficiency can be greatly improved by encoding labels of the current frame using those of the already encoded frame.

In general, the video object plane (a tightest rectangle area mainly including an object portion, e.g., the video object plane CA shown in FIG. 34A) in the frame at time n may have a size different from that in the frame at time n−1. In this case, for example, the video object plane size in the frame at time n−1 is adjusted to that in the frame at time n in the procedure shown in FIGS. 44A and 44B. For example, when the video object plane size in the frame at time n is longer by one row and is shorter by one column than that in the frame at time n−1, the rightmost macro block array for one column of the video object plane with a smaller number of rows in the frame at time n−1 is cut, as shown in FIG. 44A, and thereafter, the lowermost macro block array for one row is copied to the bottom of the video object plane to add one row. This state is shown in FIG. 45B.

When the video object plane size in the frame at time n−1 is shorter by one column and longer by one row than that in the frame at time n, the lowermost macro block array for one row in the video object plane is cut, and thereafter, the rightmost macro block array in that video object plane is copied to its neighboring position to add one column.

When adjacent frames have different sizes, the sizes are adjusted in this way. Note that the size adjustment method is not limited to the above-mentioned specific method. The labels in the frame at time n−1, whose size is finally adjusted to that in the frame at time n, as shown in FIG. 44B, will be referred to as those at time n−1' for the purpose of convenience, and will be used in the following description.

FIG. 46A shows the differences between mode information of the above-mentioned macro blocks at times n and n−1', i.e., the differences between labels at identical macro block positions.

In FIG. 46A, "S" indicates "labels match", and "D" indicates "labels do not match".

On the other hand, FIG. 46B shows the differences between labels at neighboring pixel positions in mode information of the above-mentioned macro blocks at time n. In this case, for a label at the left end position, the difference from a label at the right end pixel position in one line above is calculated, and for a label at the upper left end pixel position, the difference from "0" is calculated. FIG. 46A will be referred to as inter frame coding, and FIG. 46B will be referred to as intra frame coding hereinafter for the purpose of convenience.

As can be seen from FIGS. 46A and 46B, since the number of "S"s in inter frame coding is larger than that in intra frame coding, and inter frame coding can provide more accurate prediction results, the number of encoded bits can be reduced.

When the correlation between adjacent frames is very small, the encoding efficiency of inter frame coding may become lower than that in intra frame coding. In this case, whether intra or inter frame coding is done is switched using a 1-bit code, and the intra frame coding is selected. Of course, since the first frame to be encoded has no labels to be referred to, it is subjected to intra frame coding. In this case, there is no code for switching inter/intra frame coding.

An example for switching some prediction methods will be described in more detail below.

In the above-mentioned example, when the correlation between adjacent frames is small, intra frame coding is done. However, intra frame coding is also effective, for example, when the present invention is used in video transmission or the like, and transmission errors pose a problem.

For example, when transmission errors have been produced and the previous frame cannot be normally decoded, if inter frame coding is used, the current frame cannot be normally decoded, either. However, if intra frame coding is used, the current frame can be normally decoded.

Even intra frame coding is weak against transmission errors if it refers to many macro blocks. That is, when the number of macro blocks to be referred to is increased, the number of encoded bits can be reduced. However, as the number of macro blocks to be referred to is increased, it is likely to refer to macro blocks including transmission errors, and the errors included in the referred macro blocks are fetched and reflected in the process result. Hence, such intra frame coding is weak against transmission errors. Conversely, when the number of macro blocks to be referred to is decreased, the number of encoded bit is increased but the intra frame coding becomes robust against transmission errors for the above-mentioned reasons.

In such situation, a means which is robust against transmission errors and can reduce the number of encoded bits is required. Such means is realized as follows.

For example, to attain coding which is robust against transmission errors and can reduce the number of encoded bits, it is effective to prepare some prediction modes and to selectively use these methods.

The prediction modes include, for example:

(A) Inter frame coding mode
(B) Intra frame coding mode
(C) Intra video packet coding mode
(D) No prediction mode Note that the "video packet" is an area obtained by subdividing the rectangle area of an object, i.e., an area obtained by dividing the rectangle video object plane CA in units of a predetermined number of macro blocks, as described above. For example, the video object plane is divided so that the individual video packets have the same number of encoded bits or a predetermined number of macro blocks form a video packet.

In the "intra video packet coding mode", even when a reference block (which is the macro block to be referred to and is a macro block that neighbors the own macro block) is located within the frame, if it is located outside the "video packet", that block is not referred to, and for example, a predetermined label is used as a prediction value.

With this process, even when transmission errors have been produced in the frame, if they are located outside the "video packet", that "video packet" can be normally decoded.

In the no prediction mode, a label of each macro block is encoded without referring to any other macro blocks, and this mode is most robust against errors.

Such plurality of different modes are prepared, and an optimal one is selected and used in correspondence with the frequency of errors. The switching may be done in units of "video packets", frames, or sequences. Information indicating the coding mode used is sent from the encoder to the decoder.

As another mode, a method of switching encoding tables in accordance with the position of the area to be encoded within the frame is also available.

As a general tendency of an image, for example, as shown in FIG. 18, an object is likely to be present at the central portion of the frame, and is likely to be absent at the end of the frame.

In consideration of such tendency, a table in which a short code is assigned to "transparent" is used for macro blocks that contact the end of the frame, and a table in which a short code is assigned to "opaque" is used for other macro blocks, thus reducing the number of encoded bits without using any prediction. This is the no prediction mode.

More simply, a method of preparing a plurality of encoding tables and selectively using these tables may also be used. Switching information of such tables is encoded in units of, e.g., "video packets", frames, or sequences.

Figure 47A:
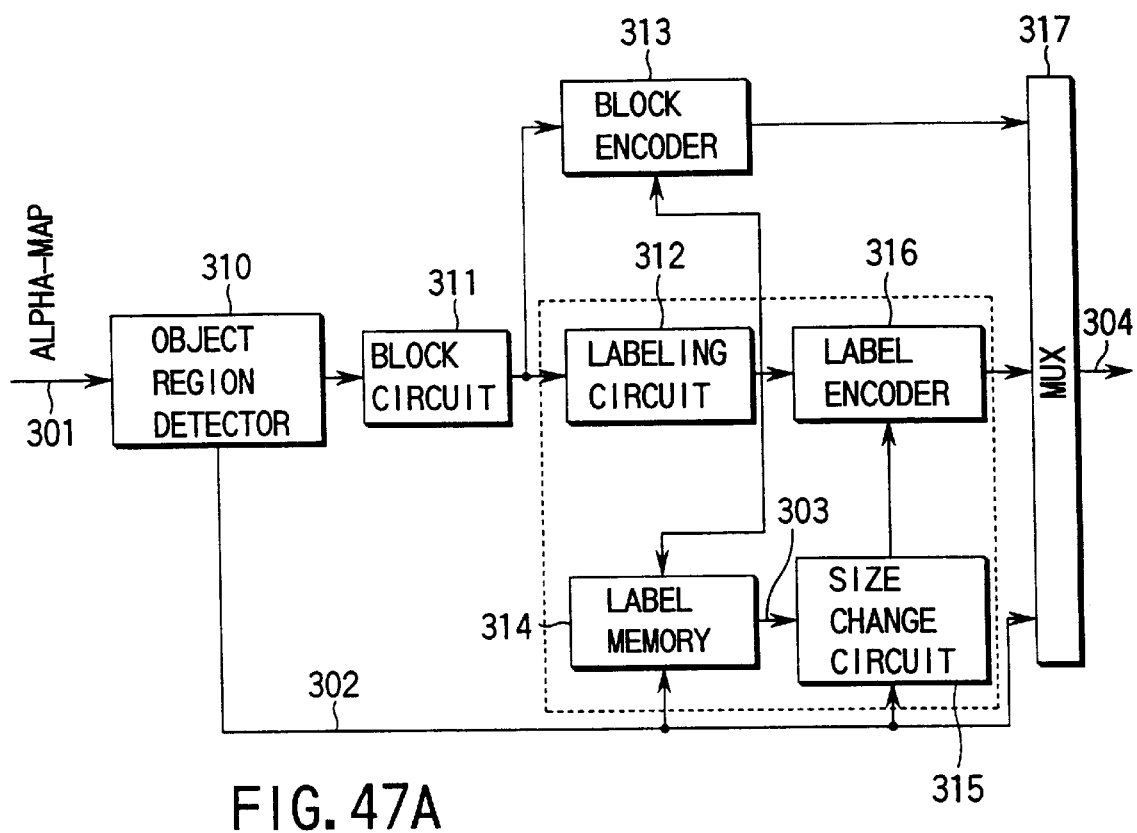
FIG. 47A is a view for explaining an encoding apparatus associated with the sixth embodiment of the present invention.
Figure 47B:
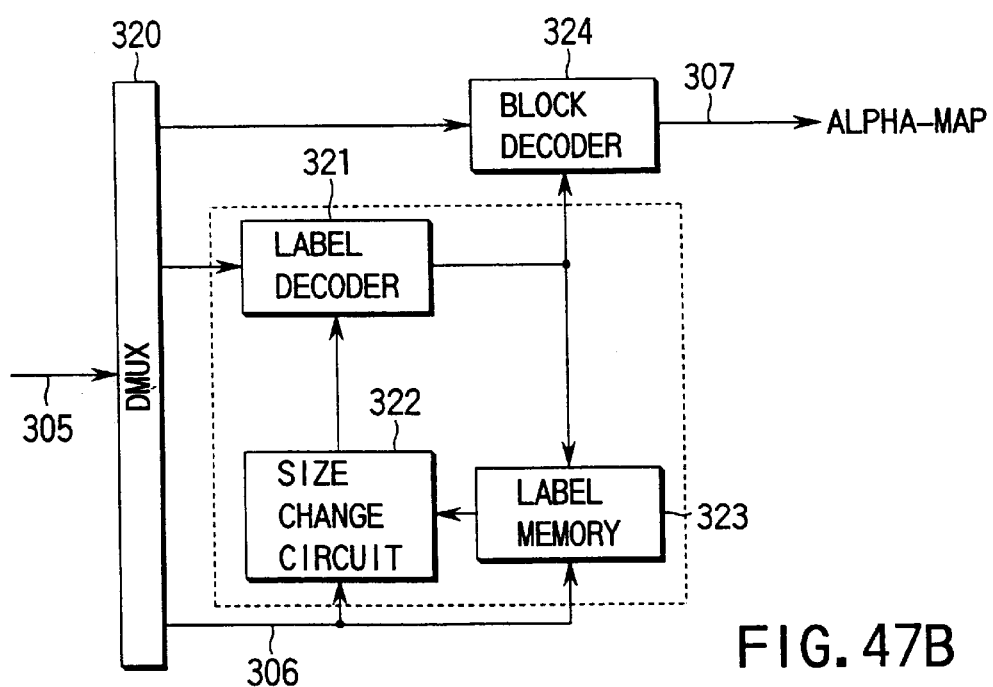
FIG. 47B is a view for explaining a decoding apparatus associated with the sixth embodiment of the present invention.

FIGS. 47A and 47B are block diagrams showing the system arrangement of this embodiment that can implement the above-mentioned processes. The flow of the processes will be explained below with reference to these block diagrams.

In the arrangements shown in FIGS. 47A and 47B, portions bounded by broken lines are associated with this embodiment that can implement the above-mentioned processes. FIG. 47A shows an alpha-map encoding apparatus, which comprises an object area detection circuit 310, block forming circuit 311, labeling circuit 312, block encoder 313, label memory 314, size changing circuit 315, label encoder 316, and multiplexer (MUX) 317.

Of these circuits, the object area detection circuit 310 detects a rectangle area corresponding to a portion including an object in an input alpha-map signal on the basis of that alpha-map signal, and outputs the alpha-map signal of that rectangle area together with information associated with the size of the rectangle area. The block forming circuit 311 is a circuit for dividing the alpha-map signal of this rectangle area into macro blocks. The labeling circuit 312 is a circuit for determining the modes (transparent (transparent pixels alone), Multi (both transparent and opaque pixels), and opaque (opaque pixels alone) of the alpha-map signal contents in units of macro blocks of the alpha-map signal, and assigning labels ("0","1", and "3") corresponding to the modes.

The block encoder 313 is a circuit for encoding an alpha-map signal in a macro block having the mode with label "1" (Multi). The label memory 314 is a memory for storing label information supplied from the labeling circuit 312, and size information of the area supplied from the object area detection circuit 310 via a label memory output line 302, and supplying both the stored label information and size information to the size changing circuit 315.

The size changing circuit 315 is a circuit for changing label information at time n–1 to a size at time n on the basis of the label information and size information for a frame at time n–1, which are supplied from the label memory 314, and the size information for a frame at time n, which is supplied from the object area detection circuit 310. The label encoder 316 is a circuit for encoding the label information supplied from the labeling circuit 312 using the size-changed label information as a prediction value.

The multiplexer 317 is a circuit for multiplexing encoded information obtained by the label encoder 316, encoded information supplied from the block encoder 313, and size information supplied from the object area detection circuit 310, and outputting the multiplexed information.

In the encoding apparatus with the above-mentioned arrangement, an alpha-map signal supplied via a signal line 301 is supplied to the object area detection circuit 310, which detects a rectangle area including an object from that alpha-map signal. Information associated with the size of the detected rectangle area is output via a signal line 302, and the alpha-map signal within the detected area is supplied to the block forming circuit 311.

The block forming circuit 311 divides the alpha-map signal with the area into macro blocks. The alpha-map signal divided into macro blocks is supplied to the labeling circuit 312 and block encoder 313.

The labeling circuit 3120 determines the modes ("transparent", "Multi", "opaque") in units of macro blocks, and assigns labels ("0", "1", "3") corresponding to the modes. The assigned label information is supplied to the block encoder 313, label memory 314, and label encoder 316.

The block encoder 313 encodes the alpha-map signal in a macro block when its label is "1" (Multi), and the encoded information is supplied to the multiplexer 317. The label memory 314 stores the label information supplied from the labeling circuit 312 and the size information of the area via the label memory output line 302, and supplies both the label information and size information to the size changing circuit 315 via a label memory output line 303.

The size changing circuit 315 changes the size of label information at time n–1 to a size corresponding to that at time n on the basis of the label information and size information for a frame at time n–1, which are supplied via the label memory output line 303, and the size information at time n supplied via the signal line 302, and supplies the size-changed label information to the label encoder 316.

The label encoder 316 encodes label information supplied form the labeling circuit 312 using the label information supplied from the size changing circuit 315 as a prediction value, and supplies the encoded information to the multiplexer 317. The multiplexer 317 multiplexes the encoded information supplied from the block encoder 313, label encoder 313, and label encoder 316, and the size information supplied via the label memory output line 302, and outputs the multiplexed information via a signal line 304.

The arrangement and operation of the encoding apparatus have been described. The arrangement and operation of a decoding apparatus will be explained below.

The alpha-map decoding apparatus shown in FIG. 47B comprises a demultiplexer (DMUX) 320, label decoder 321, size changing circuit 322, label memory 323, and block decoder 324.

Of these circuits, the demultiplexer 320 is a circuit for demultiplexing encoded information supplied via a signal line 305. The label decoder is a circuit for decoding label information at time n using, as a prediction value, information which is supplied form the size changing circuit 322 and is obtained by changing the size of label information at time n−1.

The size changing circuit 322 is a circuit having the same function as that of the size changing circuit 315, i.e., a circuit for changing the size of label information for a frame at time n−1 to a size corresponding to that at time n on the basis of label information and size information for the frame at time n−1, which are supplied from the label memory 323, and the size information for the frame at time n, which is demultiplexed by and supplied from the demultiplexer 320. The label memory 323 is a circuit having the same function as that of the label memory 314, i.e., a circuit for storing label information decoded by and supplied from the label decoder 321 and the size information of the area supplied from the demultiplexer 320, and supplying both the stored label information and size information to the size changing circuit 322.

The block decoder 324 decodes an alpha-map signal in units of blocks in accordance with the decoded label information supplied from the label decoder 321.

The operation of the decoding apparatus with the above arrangement will be described below.

The demultiplexer 320 demultiplexes encoded information supplied via the signal line 305, supplies the demultiplexed information to the block decoder 324 and label decoder 321, and also outputs size information via a signal line 306. The label decoder 321 decodes label information for a frame at time n using, as a prediction value, information which is supplied from the size changing circuit 322 and is obtained by changing the size of label information for a frame at time n−1.

The decoded label information is supplied to the block decoder 324 and label memory 323. The block decoder 324 decodes an alpha-map signal in units of blocks in accordance with the decoded label information supplied from the label decoder 321. Note that the size changing circuit 322 and label memory 323 respectively perform the same operations as those of the size changing circuit 315 and label memory 314, and a detailed description thereof will be omitted.

The examples of the encoding and decoding apparatuses which assign labels to an alpha-map divided in units of macro blocks, and encode the labels of macro blocks of the current frame using the labels of macro blocks in the already encoded frame have been described. Macro blocks of alpha-maps for temporally adjacent frames are assigned very similar labels. Hence, in such case, since label correlation is high between frames, the labels of the current frame are encoded using those of the already encoded frame, thus greatly improving the encoding efficiency.

In the invention as such prior art, VLC (variable-length coding) tables are switched with reference to one neighboring block (one macro block) in a frame or between frames. In this case, the VLC table is switched with reference to the "neighboring block between frames" if inter frame correlation is high; or with reference to the "neighboring block in a frame" if inter frame correlation is low. However, in practical applications, both inter and intra frame correlations are often preferably used.

Let "M(h, v, t)" (h, v, and t represent the coordinate axes in the horizontal, vertical, and time directions) be the mode at a certain pixel position. In this case, assume that, for example, a VLC table is selected with reference to "M(x−1, y, n)", "M(x, y−1, n)", and "M(x, y, n−1)" upon encoding a mode "M(x, y, n)". When the number of modes is three as in FIGS. 43A and 43B, if the number of reference blocks is three blocks (three macro blocks), the number of VLC tables is 33 (=27). On the other hand, the number of reference blocks may be set to be larger than three (for example, "M(x−1, y−1, n)", "M(x, y, n−2)").

In this case, since not only the number of VLC tables increases, but also inter block correlation with newly added reference blocks lowers, encoding efficiency does not improve much even if the number of reference blocks is increased. Hence, a trade-off between the number of VLC tables and encoding efficiency must be considered.

An embodiment of another method of encoding mode information of blocks will be explained below.

In the following description, a method of encoding mode information of blocks using labels of the previous frames in prediction will be explained.

Figure 48:
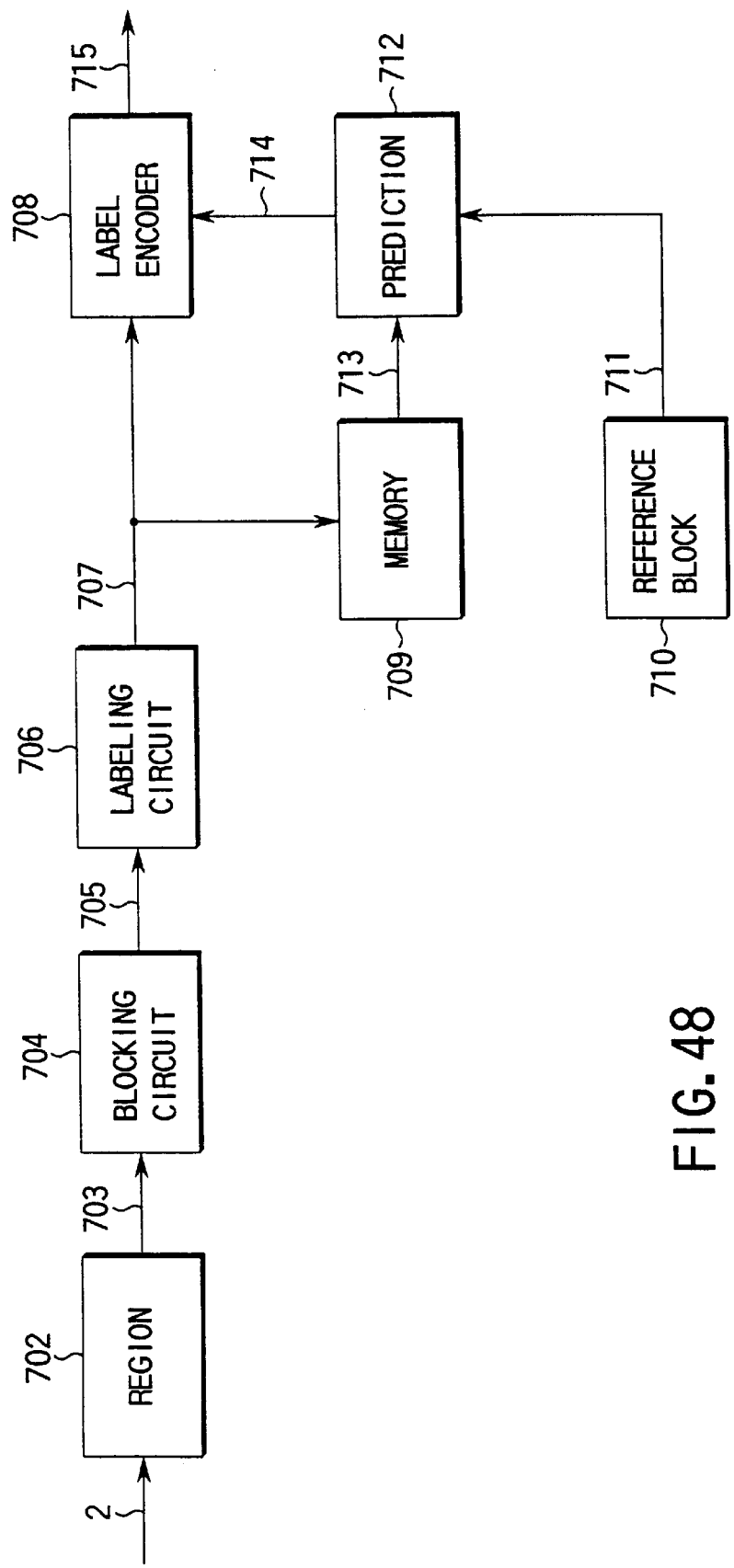
FIG. 48 is a block diagram of an encoder according to the sixth embodiment of the present invention.

FIG. 48 is a block diagram of an encoder according to one embodiment of the present invention. As shown in FIG. 48, this encoder comprises an object area detection circuit 702, block forming circuit 704, labeling circuit 706, label encoder 708, label memory 709, reference block determination circuit 710, and prediction circuit 712.

Of these circuits, the object area detection circuit 702 is a circuit for setting, as a video object plane, an area, which includes an object and is expressed by a multiple of a block size, on the basis of an alpha-map signal 701, and extracting an alpha-map signal 703 of the set video object plane. The block forming circuit 704 divides (forms into blocks) the extracted alpha-map signal 703 into 16×16 pixel blocks (macro blocks) and outputs the divided blocks. The labeling circuit 706 assigns predetermined labels to an alpha-map signal 705 divided into blocks in accordance with the ratio of the object included, and outputs the assigned labels as label information 707.

The label encoder 708 encodes the label information 707 while switching encoding tables in accordance with an input prediction value 714, and outputs encoded information. The label memory 709 stores the label information 707 assigned by the labeling circuit 706 in units of blocks. The reference block determination circuit 710 executes a process for determining, as a reference block 711, a block which is located at the same position in the previous frame as the block to be encoded. The prediction circuit 712 predicts a label at the position of the reference block 711 with reference to the label 713 of the previous frame held in the label memory 709, and sends the predicted label as a prediction value 714 to the label encoder 708.

In the encoding apparatus with the above arrangement, an alpha-map signal 701 is input to the object area detection circuit 702. The object area detection circuit 702 sets, as a video object plane, an area which includes an object and is expressed by a multiple of a block size, and supplies an alpha-map 703 extracted based on the set video object plane to the block forming circuit 704. The block forming circuit 704 divides the alpha-map 703 into 16×16 pixel blocks (macro blocks), and supplies an alpha-map 705 divided into blocks to the labeling circuit 706. The labeling circuit 706 assigns, in units of blocks, label information 707 (mode information), for example:

Block does not include any object: "label 0"
Block locally includes object: "label 1"
Entire block corresponds to object: "label 3"
The label information 707 is sent to the label encoder 708, and is also stored in the label memory 709. The label memory 709 stores labels encoded so far.

On the other hand, the reference block determination circuit 710 determines, as a reference block 711, for example, a block, which is located at the same position in the previous frame as the block to be encoded and sends it to the prediction circuit 712. The prediction circuit 712 also receives the labels 713 of the previous frame from the label memory 709, and sends the label at the position of the reference block 711 as a prediction value 714 to the label encoder 708. The label encoder 708 encodes the label information 707 while switching encoding tables in accordance with the prediction value 714, and outputs a code 715.

When the video object plane always agrees with the frame, a reference block is uniquely determined. However, when the video object plane is smaller than the frame and the previous and current frames have different positions of that video object planes, and a different reference block is selected depending on whether coordinate axes having the corner of the frame as an origin or those having the corner of the video object plane as an origin are used.

Handling of the coordinate axes will be described in detail below.

Figure 49A:
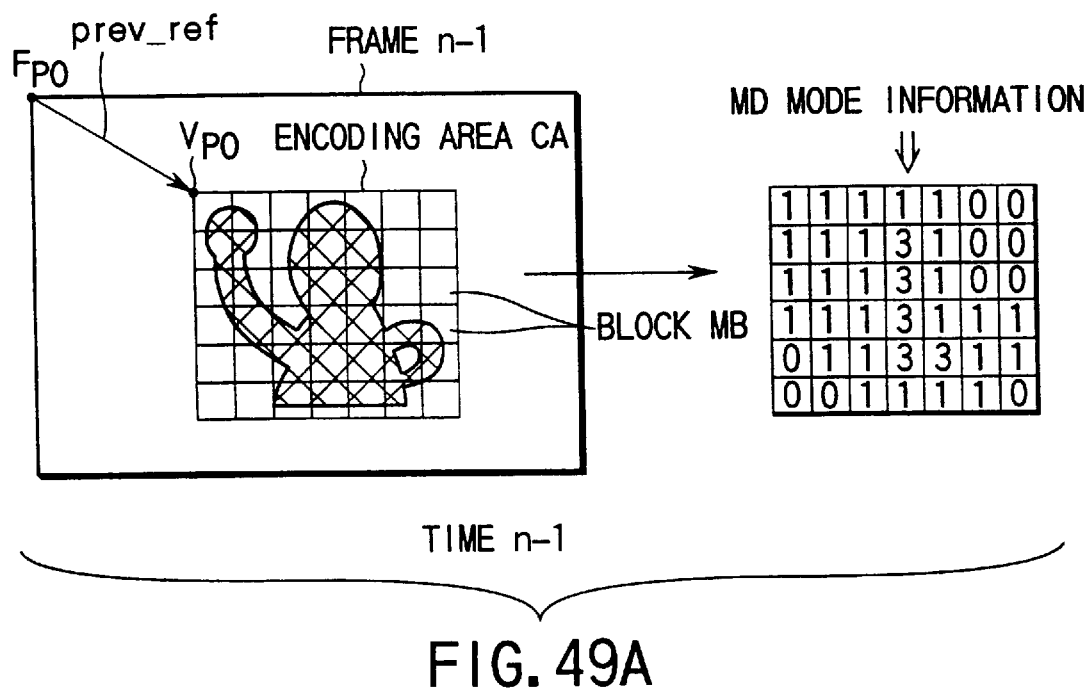
FIGS. 49A and 49B are views for explaining an example of frame images Fn−1 and Fn at times n−1 and n, and shape mode information MD of macro blocks in video object planes CA in the individual frames Fn−1 and Fn.
Figure 49B:
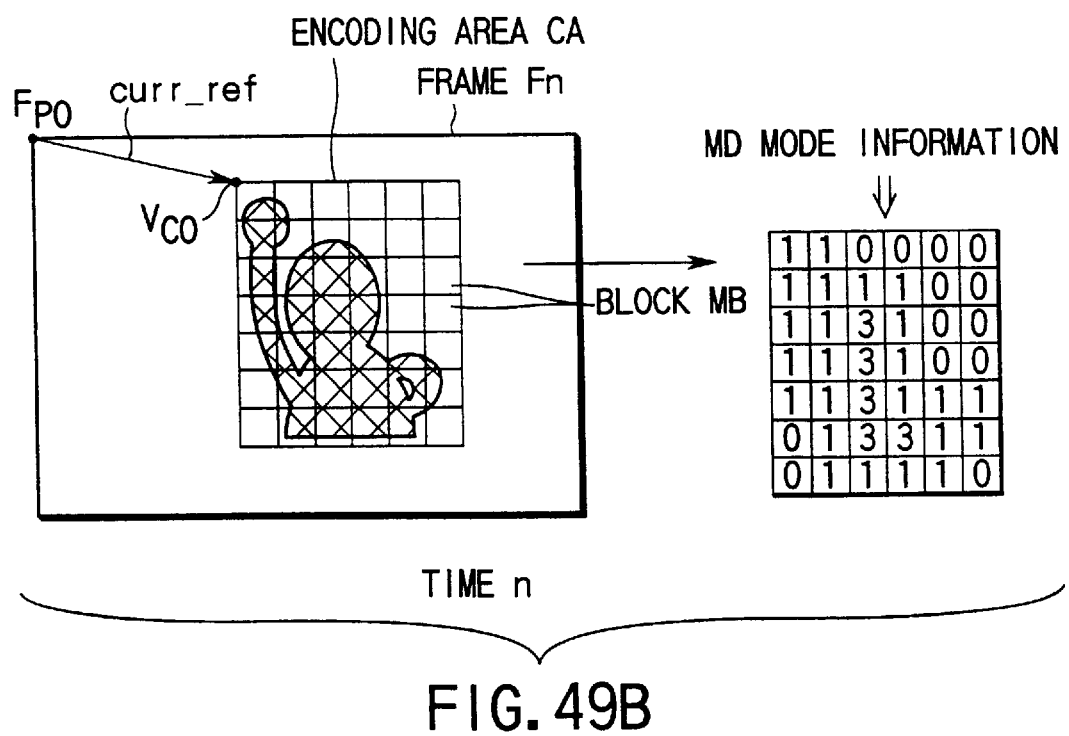

FIGS. 49A and 49B show an example of frame images Fn−1 and Fn at times n−1 and n, and mode information MD of macro blocks in the individual frames Fn−1 and Fn.

Japanese Patent Application No. 8-237053 mentioned earlier proposes, as an example, an embodiment for determining the block to be referred to upon encoding mode information of the current block by matching an origin Vc0 of the video object plane in the current frame (time n) and an origin Vp0 of the video object plane in the previous frame (time n−1) with each other. In this embodiment, blocks are made to correspond to each other on the basis of the coordinate axes of the video object plane.

In this case, as shown in FIG. 50A, the size of the video object plane of the previous frame is matched with that of the current frame by "cutting" or "no updating" the right end or lower end of the video object plane of the previous frame.

In the example shown in FIGS. 49A and 49B, blocks at the left and upper ends of the video object planes have changed. In such case, since blocks corresponding to the mode information in the current frame include unmatched blocks (21 blocks) in the previous frame, as indicated by hatched portions in FIGS. 50A and 50B, encoding efficiency may deteriorate if the mode information is encoded using such values.

In the example shown in FIGS. 49A and 49B, it is preferable that an origin Fc0 of the current frame be matched with an origin Fp0 of the previous frame to determine, as a reference block, a block at the closest block position on the coordinate axes of the frame.

When a reference block is obtained on the basis of the coordinate axes of the frame, the blocks become as shown in FIG. 50B. That is, in the example shown in FIGS. 49A and 49B, since blocks at the left and upper ends have changed, the size of the video object plane of the previous frame is matched with that of the current frame by "cutting" or "no updating" the left and upper ends, as shown in FIG. 50B. In this case, blocks corresponding to the mode information of the current frame include a smaller number of unmatched blocks indicated by hatched portions (three blocks) in FIG. 50B.

More specifically, whether the labels of the previous frame are changed on the basis of the coordinate axes of the video object plane or frame is switched in correspondence with situations, thus improving the encoding efficiency. As the determination method of the coordinate axes, the encoder may select an optimal method and send switching information, or both the encoder and decoder may determine the coordinate axes using known information.

Figure 45A:
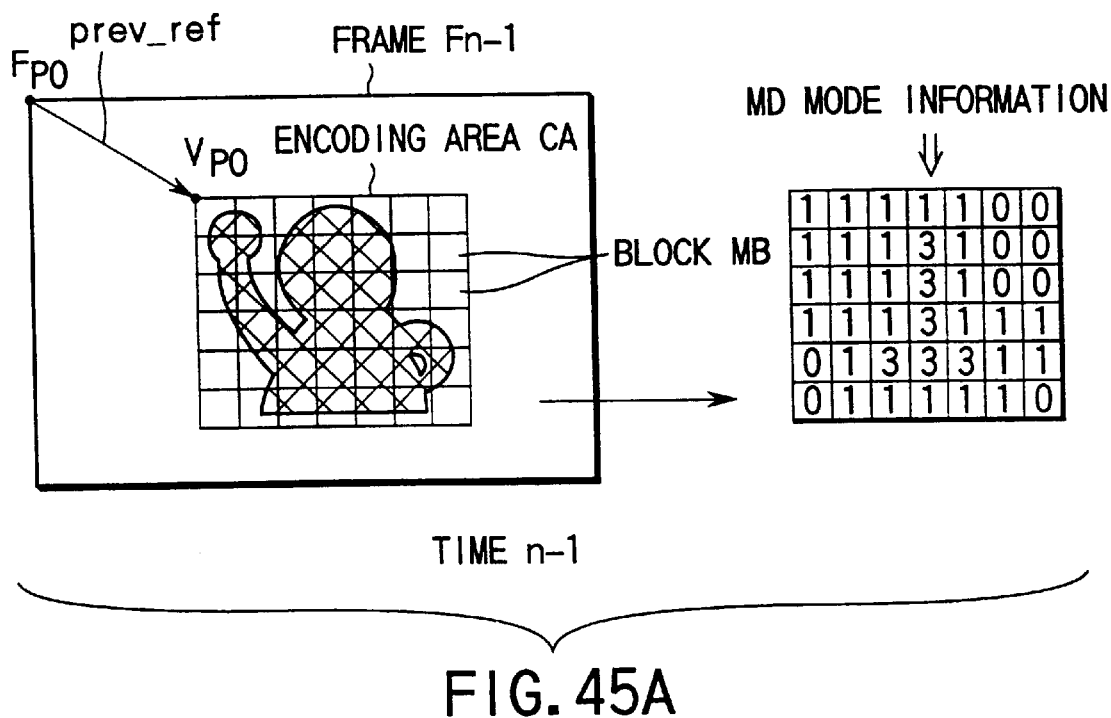
FIGS. 45A and 45B are views for explaining an example of frame images Fn−1 and Fn at times n−1 and n in the present invention, and shape mode information MD of macro blocks in video object planes CA in the individual frames Fn−1 and Fn.
Figure 45B:
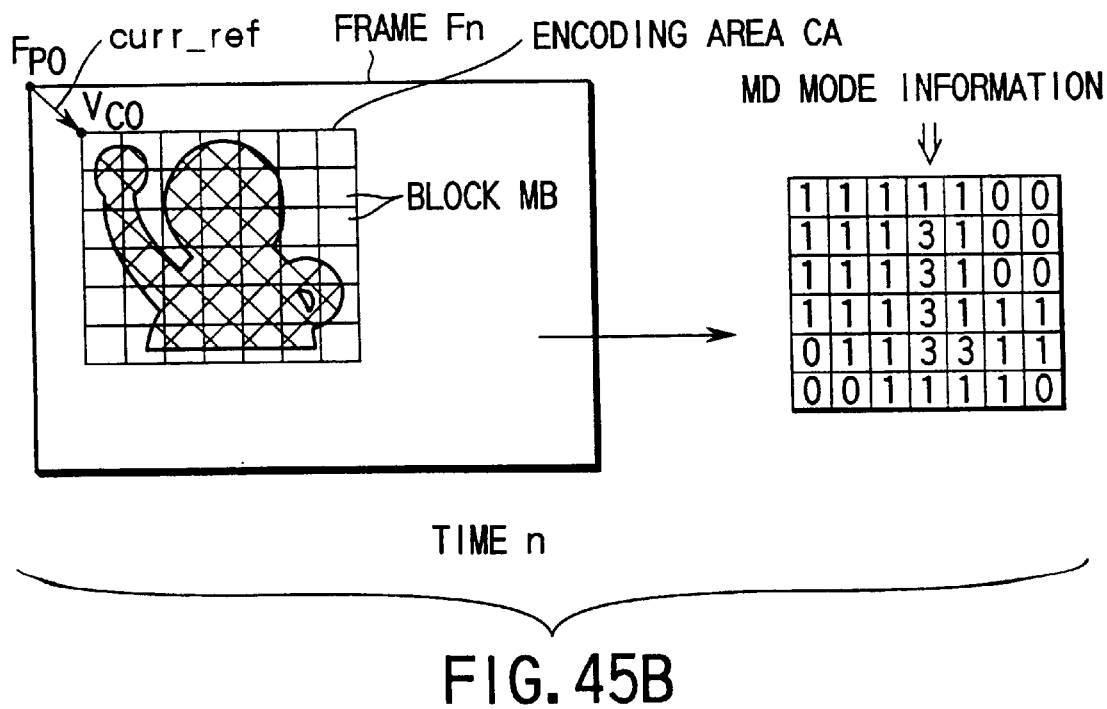

FIGS. 45A and 45B show an example wherein the coordinate axes of the video object plane are preferably used. This example shows that the frames have considerably changed from the frame Fn−1 in FIG. 45A to the frame Fn in FIG. 45B like in a case wherein the camera is panned to the right. In this case, as can be seen from FIGS. 45A and 45B, since the positions of the video object planes in the frames are considerably different from each other, it is not effective to determine the reference block on the basis of the coordinate axes of the frame.

More specifically, when the current frame (the frame Fn at time n) and the previous frame (the frame Fn−1 at time n−1) have considerably different positions of video object planes CA, the coordinate axes of the video object plane are preferably used; when the positions of the video object planes in the frames are not so different, the coordinate axes of the frame are preferably used.

Whether or not the current frame Fn and previous frame Fn−1 have considerably different video object plane positions can be determined on the basis of information (vector) prev_refscurr_ref indicating the position of the video object plane in the frame and the size of the video object plane.

Figure 51:
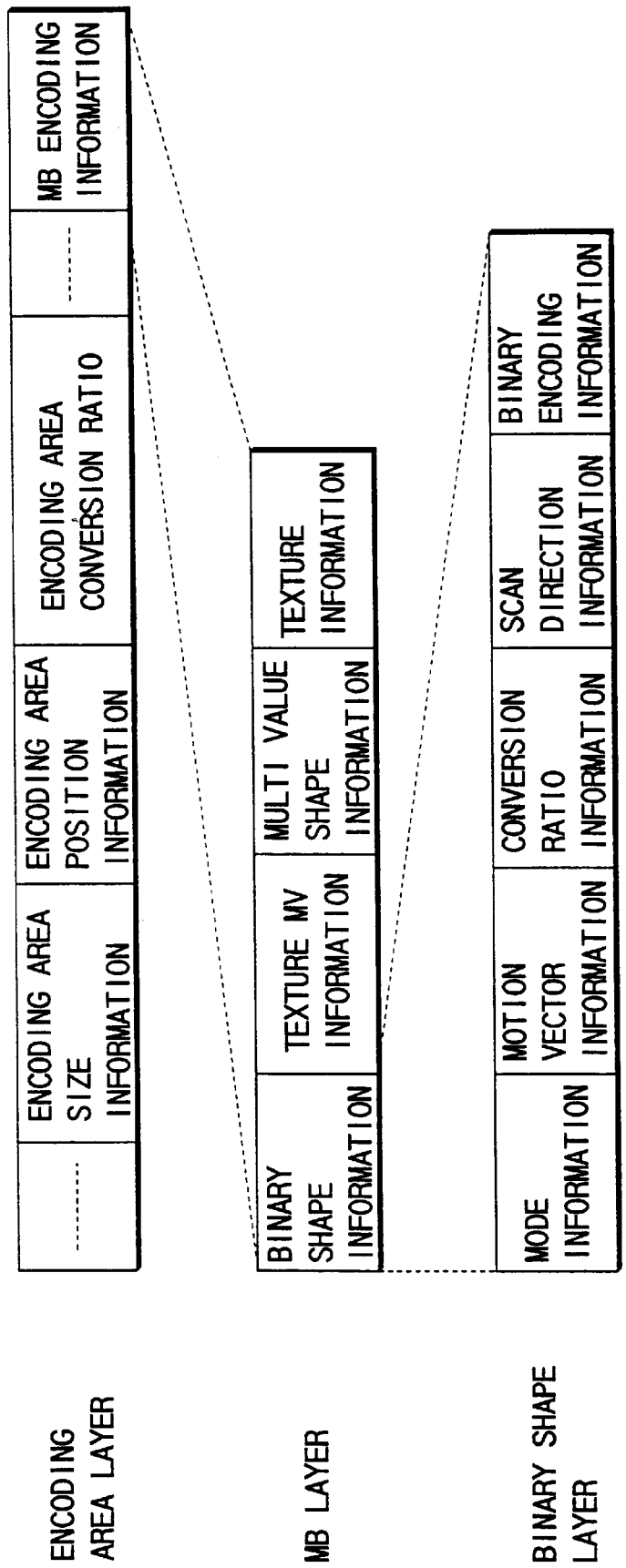
FIG. 51 is a view for explaining an encoded data architecture in a motion video encoding apparatus that also uses an alpha-map.

More specifically, the encoded data format in the motion video encoding apparatus that also uses an alpha-map is as shown in FIG. 51 according to standards. More specifically, encoded data includes a video object plane layer, macro block MB layer, and binary shape layer, and the video object plane layer includes video object plane size information, video object plane position information, video object plane size conversion ratio information, and the like. The MB layer includes binary shape information, texture MV information, multi-valued shape information, and texture information, and the binary shape information includes mode information, motion vector information, size conversion ratio information, scan type information, and binary encoding information.

Of such information, the video object plane size information indicates information representing the size (two-dimensional size) of the video object plane, the video object plane position information indicates information representing the position (positions of Vp0 and Vc0) of the video object plane, and the video object plane size conversion ratio information indicates size conversion ratio (CR) information of a binary image in units of video object planes.

The MB encoding information indicates information for decoding an object in an MB. The binary shape information in the MB layer indicates information representing whether or not pixels in an MB fall within an object, the texture MV information indicates motion vector information used for performing motion estimation/compensation of luminance and color difference signals in an MB, the multi-valued shape information indicates weighting information used upon synthesizing an object with another object, and the texture information indicates encoding information of luminance and color difference signals in an MB.

The mode information in the binary shape layer indicates information representing the shape mode of a binary image in an MB, the motion vector information indicates motion vector information for performing motion estimation/ compensation of a binary image in an MB, the size conversion ratio information indicates size conversion ratio (CR) information of a binary image in units of MBs, the scan type information indicates information representing whether the encoding order is in the horizontal or vertical direction, and the binary encoding information indicates encoding information of a binary image.

The information indicating the position (the positions of Vp0 and Vc0) of the video object plane is stored in the video object plane position information, and hence, the position (the positions of Vp0 and Vc0) of the video object plane can be detected using this information. The frames Fn-1 and Fn are compared using this information. This comparison is done using vectors obtained from the home position of the frame to that of the video object plane.

As a result, for example, as shown in FIGS. 45A and 45B, when the difference between "prev_ref and curr_ref" is large and the sizes of the video object planes of the current and previous frames are nearly equal to each other, a reference block is preferably determined based on the coordinate axes of the video object plane. Since "prev_ref and curr_ref", and the video object plane size information are encoded prior to encoding of the video object plane and are known ones in the decoding apparatus side as well, no additional information indicating the coordinate axes used is required.

Figures 52A, 52B, 52C, 52D:
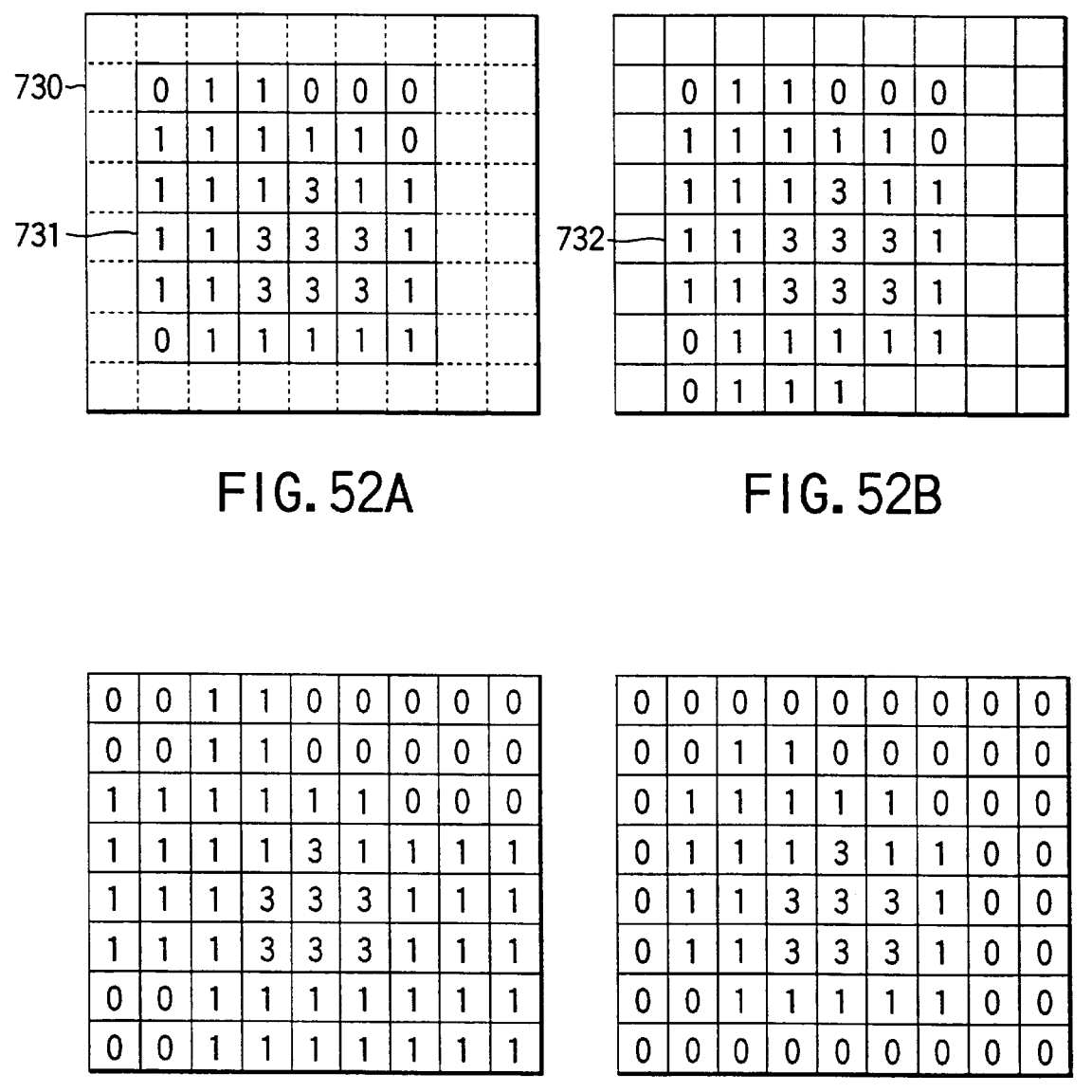

As shown in FIG. 52A, when a video object plane 731 is set as a portion of a frame 730, labels cannot be determined for blocks outside the video object plane 731. However, at the time of encoding the next frame, blocks outside the video object plane 731 may be used as a reference block, and any labels must be inserted.

FIG. 52D shows an example wherein a predetermined value, "0" in this case, is inserted into unlabeled portions in FIG. 52A. FIG. 52C shows an example wherein labels for unlabeled portions in FIG. 52A are obtained from the video object plane by extrapolation. This method is effective when an object is likely to appear in the next frame in a portion where no object was present in the previous frame like in a case wherein the object moves largely or its shape changes abruptly.

FIG. 52B shows an example wherein labels for unlabeled portions in FIG. 52A corresponding to only a portion of a video object plane 732 of the next frame are obtained by extrapolation in the memory space of the label memory 709, and other portions are not overwritten. In this way, labels of the frame two or more frames before the current frame can be used in prediction.

When the labels of the previous frame are to be used in prediction, for example, neither extrapolation nor insertion of predetermined values are done, and the video object plane alone is updated in the memory space, in addition to the above methods.

A label prediction method used when the size conversion ratio (CR) of a frame is switched in units of frames, as has been described above with reference to FIGS. 37A to 37D, will be explained below.

Figure 53:
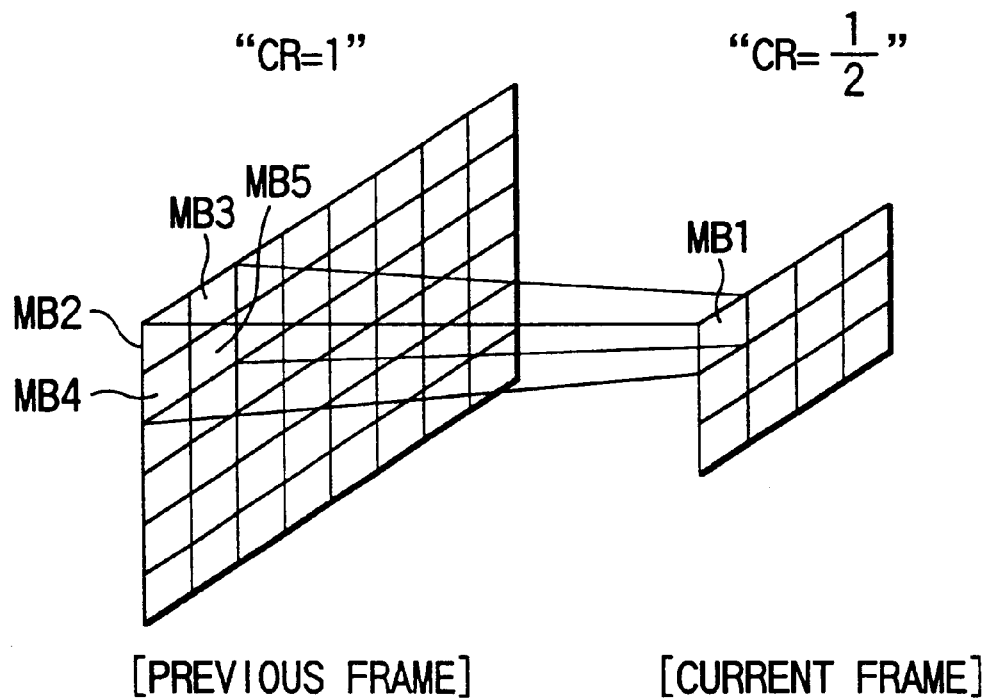
FIG. 53 is a view for explaining an example of a down-sampling process used in the present invention.

FIG. 53 shows an example of the down-sampling process, i.e., when the previous frame has "CR=1" and the current frame has "CR=1/2". In this case, there are four blocks MB2 to MB5 in the previous frame corresponding to, e.g., a macro block MB1 as the block to be encoded in the current frame to be down-sampled, as shown in FIG. 53 (see FIG. 54). More specifically, the macro blocks MB2, MB3, MB4, and MB5 in the previous frame become the macro block MB1 after down-sampling.

Assuming that (x, y) represents the address of the macro block MB1 of the current frame, the addresses of the blocks MB2 to MB5 of the previous frame are (2x, 2y), (2x+1, 2y), (2x, 2y+1), and (2x+1, 2y+1).

The coefficient "2" in this case is given as the ratio of the values of the size conversion ratios CR of the previous and current frames.

Upon prediction in encoding of the label of the block MB1, it is proper to use the label of one of the blocks MB2, MB3, MB4, and MB5. In this case, some determination methods are available.

The simplest method with the smallest calculation amount is a method of using the label of a block located at a predetermined position (e.g., upper left) of the four blocks. Alternatively, when the four labels include the same ones, the majority label can be used as a prediction value, thus improving the accuracy of prediction.

Figure 54:
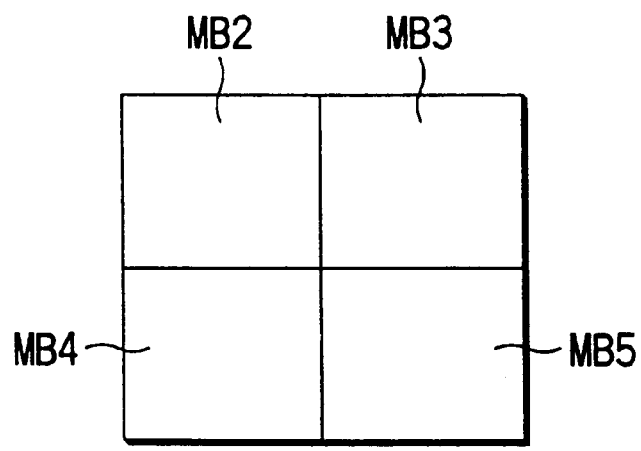
FIG. 54 is a view for explaining an example of a down-sampling process used in the present invention.

When the numbers of labels having identical contents are equal to each other, i.e., two pairs of labels have identical contents, the order of labels is determined in advance in the order of higher appearance frequencies, and a higher-order label is selected as a prediction value. When a rectangle video object plane CA is set in the frame, if coordinate axes having the corner of the video object plane CA as an origin are used, the boundary of a block (the macro block to be encoded) in the current frame overlaps that of a macro block in the reference frame, as shown in FIG. 54.

Figure 55:
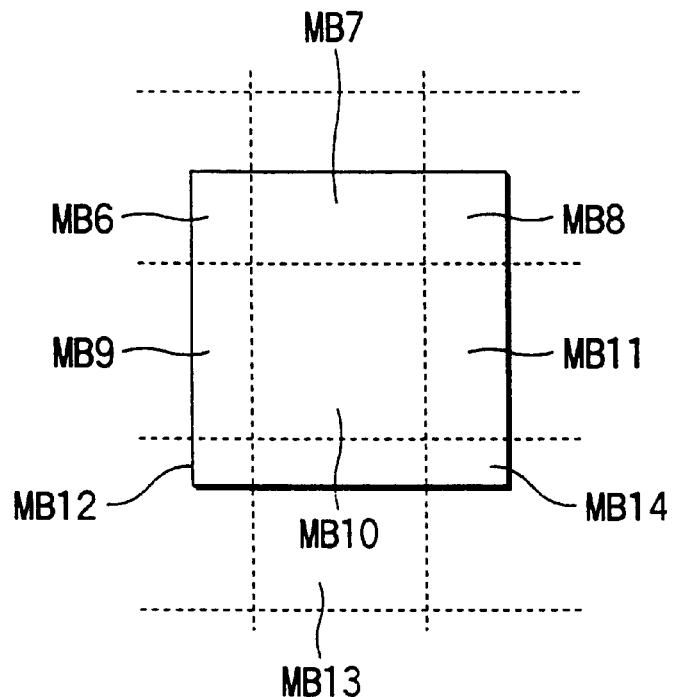
FIG. 55 is a view for explaining a label prediction method used in the present invention.

However, when the position is allowed to be set in the area to be encoded at a step smaller than the width of a macro block, and coordinate axes having the corner of the frame as an origin are used, the boundaries of blocks do not normally overlap each other, and a total of nine macro blocks MB6 to MB14 can be referred to, as shown in FIG. 55.

In this case, the label of the macro block MB10, which is entirely referred to, is used.

Figure 56:
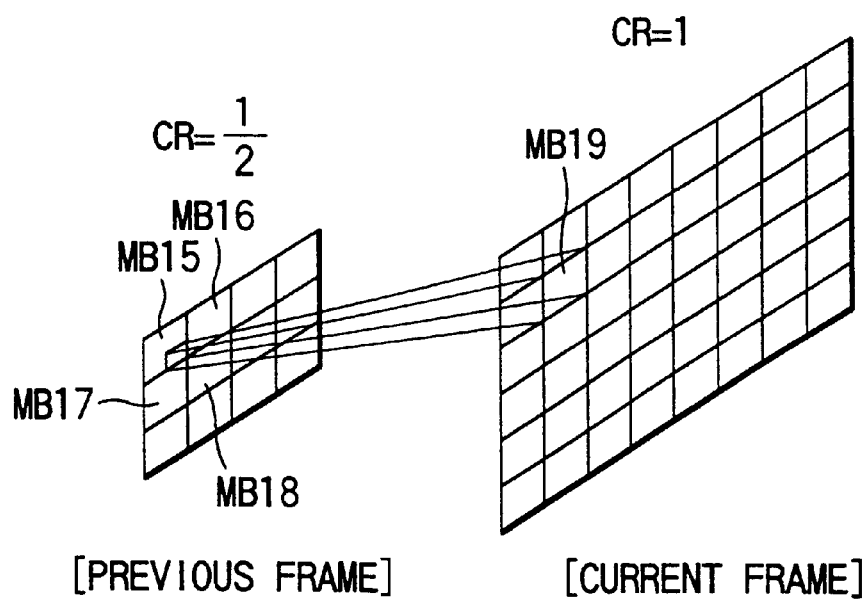
FIG. 56 is a view for explaining a process for restoring a frame from a down-sampled frame by an up-sampling process used in the present invention.

FIG. 56 shows an example wherein the previous frame has a size conversion ratio CR=1/2, and the current frame has a size conversion ratio CR=1. In this case, a macro block MB19 refers to the lower right portion to a macro block MB15 in the down-sampled frame. At this time, the label of the block MB15 may be used as a prediction value, or since the portion to be referred to is also close to blocks MB16 to MB18, the labels of these blocks may also be taken into consideration, and the prediction value may be determined by, e.g., the principle of majority rule or the like, as described above.

Figure 57:
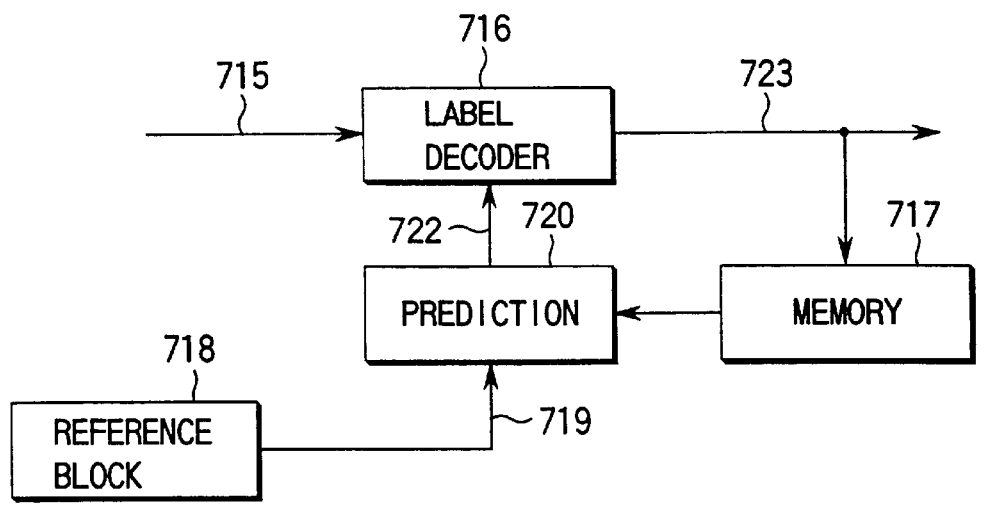
FIG. 57 is a block diagram of a decoding apparatus of the present invention, which uses labels in prediction.

FIG. 57 is a block diagram showing an example of the arrangement of a decoding apparatus of the present invention, which uses labels in prediction.

This decoding apparatus comprises a label decoder 716, label memory 717, reference block determination circuit 718, and prediction circuit 720.

Of these circuits, the label decoder 716 decodes label data from input code data to be decoded. The label memory 517 stores the decoded label data. The reference block determination circuit 718 executes a process for determining, as a reference block 719, a block, which is located at the same position as the encoded block in the previous frame.

The prediction circuit 720 has a function of obtaining a prediction value 722 on the basis of a label 721 of the previous frame and the reference block 719, and supplying it to the label decoder 716.

In the decoding apparatus with the above arrangement, an encoded data stream 715 as data to be decoded is input to the label decoder 716, and labels are decoded.

On the other hand, the label memory 717 stores the labels decoded so far. The reference block determination circuit 718 determines the reference block in the same manner as described in the encoder, and supplies it to the prediction circuit 720. Also, the prediction circuit 720 obtains the prediction value 722 on the basis of the label 721 of the previous frame and the reference block 719 in the same manner as in the encoder, and sends it to the label decoder 716. The label decoder 716 switches decoding tables using the prediction value 722, and decodes and outputs a label 723.

Upon encoding a mode "M(h, v, t)" (h, v, and t represent the coordinate axes in the horizontal, vertical, and time directions) of a certain block, an encoding table is selected with reference to "M(x−1, y, n)", "M(x, y−1, n)", "M(x, y, n−1)", and the like. The modes used herein may include some motion vector information used in motion compensation, and the following mode set (to be referred to as mode set A hereinafter) may be used.

[Mode Set A]
(1) "transparent"
(2) "opaque"
(3) "no update (motion vector==0)"
(4) "no update (motion vector!=0)"
(5) "coded"

Note that both (3) and (4) in mode set A are copy modes. However, (3) in mode set A means that the motion vector is zero, and (4) in mode set A means that the motion vector is other than zero. In case of (4) in mode set A, the value of the motion vector must be separately encoded. However, in case of (3) in mode set A, no motion vector need be encoded. When the motion vector is likely to be zero, if mode set A is used, a total of the numbers of encoded bits of the modes and motion vectors can be reduced.

In this example, if all the pixels in a block obtained as "no update (motion vector==0)" are, e.g., opaque, an identical decoded image can be obtained in either mode (2) or (3) above. That is, these modes need not be selectively used. Similarly, when all the pixels in a block obtained as "copy (motion vector==0)" are transparent, (1) and (3) above need not be selectively used. In view of this, the following mode set is prepared:

[Mode Set B]
(1) "transparent"
(2) "opaque"
(3) "no update (motion vector!=0)"
(4) "coded"

Step A1: If all motion estimation/compensation images obtained in "no update (motion vector==0)"" are opaque, the control advances to step A3; otherwise, the control advances to step A2.

Step A2: If all motion estimation/compensation images obtained in "no update (motion vector==0)" are transparent, the control advances to step A4; otherwise, the control advances to step A5.

Step A3: If "M(*, *, *)" to be referred to is "no update (motion vector==0)", "M(*, *, *)" is replaced by "opaque". The control advances to step A6.

Step A4: If "M(*, *, *)" to be referred to is "no update (motion vector==0)", "M(*, *, *)" is replaced by "transparent". The control advances to step A6.

Step A5: After "M(x, y, n)" is encoded using an encoding table of mode set A, encoding ends.

Step A6: After "M(x, y, n)" is encoded using an encoding table of mode set A, encoding ends.

When an algorithm (FIG. 58) that fulfills A0 to A6 above is used, a plurality of modes can be prevented from being prepared for an identical result, and the number of encoded bits of mode information of blocks can be reduced. This is because the average code length of a code for switching four modes (mode set B) can be set to be shorter than that of a code for switching five modes (mode set A). However, since the method of switching mode set A alone in units of blocks slightly increases the calculation amount and memory capacity as compared to a case using mode set A alone, it is used when that increase does not pose any problem.

Figure 58:
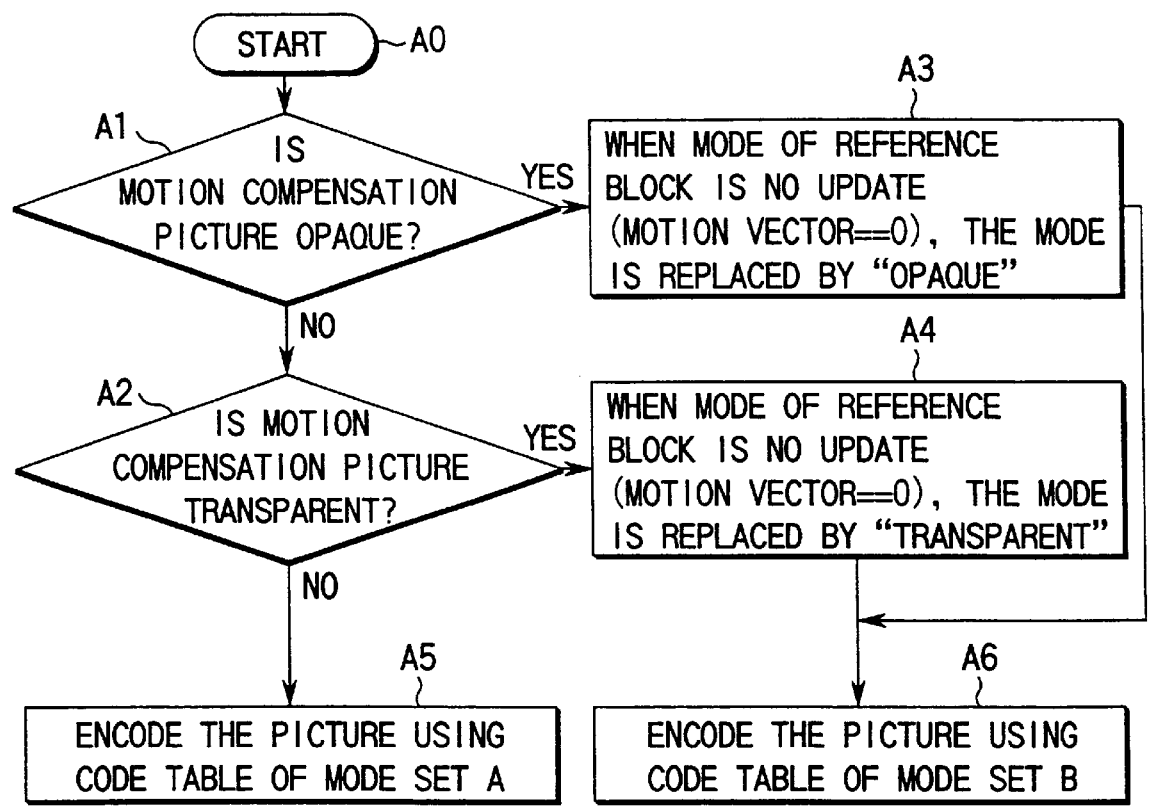
FIG. 58 is a flow chart showing an example of an encoding process procedure used in an encoding apparatus of the present invention.

A decoding process determines the encoding table for mode set A or B by the same algorithm as that shown in the flow chart in FIG. 58, and executes decoding using the determined table.

Figure 59:
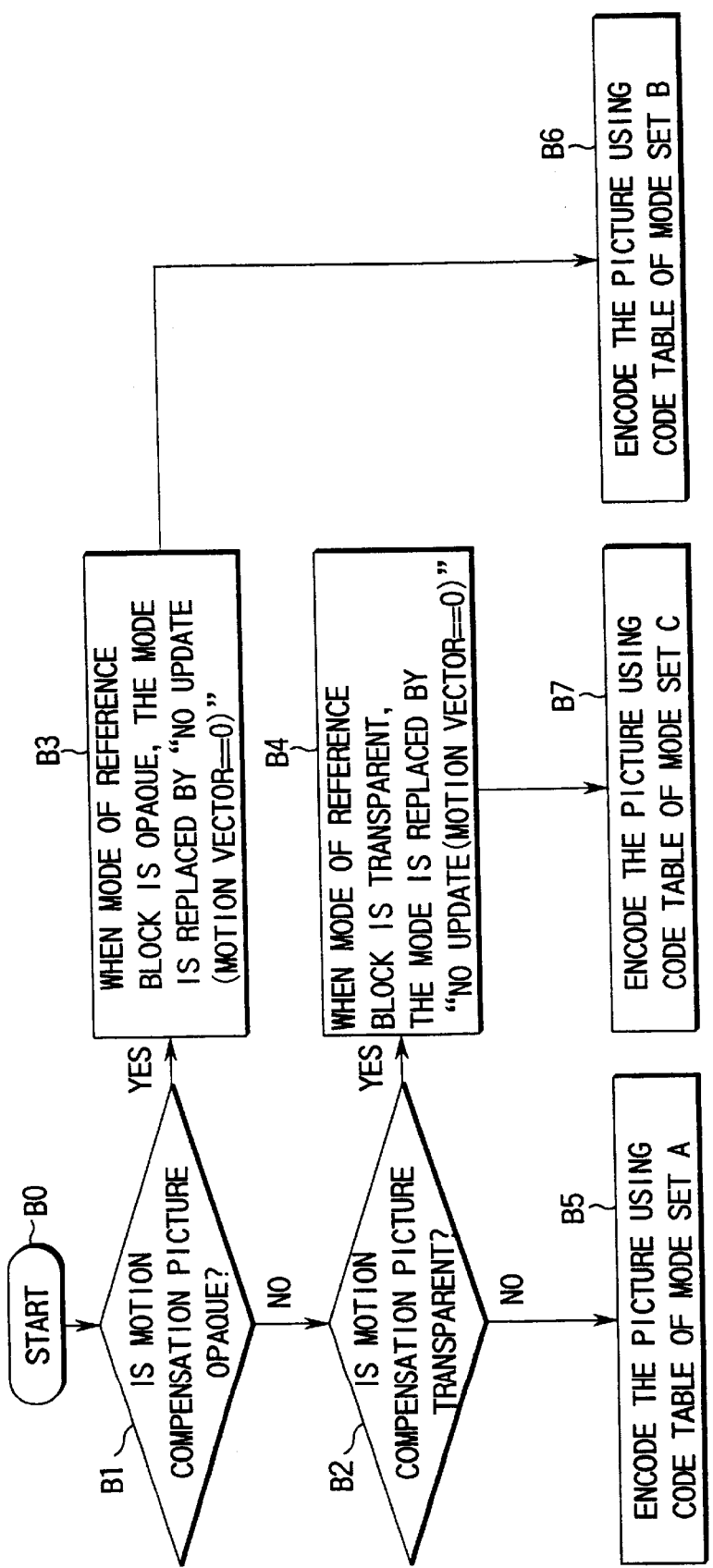
FIG. 59 is a flow chart showing another example of the encoding process procedure used in the encoding apparatus of the present invention.

FIG. 59 shows another algorithm that can obtain the same effect as in the above-mentioned algorithm. In this case, the mode sets used are:

[Mode Set C]
(1) "transparent"
(2) "no update (motion vector==0)"
(3) "no update (motion vector!=0)"
(4) "coded"

[Mode Set D]
(1) "opaque"
(2) "no update (motion vector==0)"
(3) "no update (motion vector!=0)"
(4) "coded"

The flow chart in FIG. 59 will be explained below.

Step B1: If all motion estimation/compensation images obtained in "no update (motion vector==0)" are opaque, the control advances to step B3; otherwise, the control advances to step B2.

Step B2: If all motion estimation/compensation images obtained in "no update (motion vector==0)" are transparent, the control advances to step B4; otherwise, the control advances to step B5.

Step B3: If "M(*, *, *)" to be referred to is "opaque", "M(*, *, *)" is replaced by "no update (motion vector==0)". The control advances to step B6.

Step B4: If "M(*, *, *)" to be referred to is "transparent", "M(*, *, *)" is replaced by "no update (motion vector==0)". The control advances to step b7.

Step B5: After "M(x, y, n)" is encoded using an encoding table of mode set A, encoding ends.

Step B6: After "M(x, y, n)" is encoded using an encoding table of mode set C, encoding ends.

Step B7: After "M(x, y, n)" is encoded using an encoding table of mode set D, encoding ends.

As the mode of a block, encoding parameters, for example, the block size, block down-sampling ratio, encoding scan type, motion vector value, and the like may be included as needed. An example including scan type will be explained below.

[Mode Set E]
(1) "transparent"
(2) "opaque"
(3) "no update (motion vector==0)"
(4) "no update (motion vector!=0)"
(5) "coded & horizontal scan"
(6) "coded & vertical scan"

Note that "==" indicates that the values of the left- and right-hand sides are equal to each other, and "!=" indicates that the values of the left- and right-hand sides are not equal to each other.

As has been described above, according to the present invention, the reference block of the previous block is used in prediction. In this case, the alpha-map itself may be used in prediction instead of the label of the reference block. More specifically, an alpha-map may be stored in a memory, and every time the mode of each block is encoded, the mode ("transparent", "Multi", "opaque", or the like) is determined, and an encoding table is selected in accordance with the mode.

In this way, a block separated by several pixels from a block used upon encoding the previous frame can be used as a reference block. That is, the reference block need not precisely overlap the block used upon encoding the previous frame, and prediction with higher accuracy can be realized.

On the other hand, prediction using an alpha-map of the reference block and that using a label may be combined.

For example, an encoding table is selected depending on "transparent", "Multi", or "opaque" using the alpha-map of the reference block, and for a block with "Multi", an encoding table is selected using the label of the reference block.

As for the portion to be referred to in the previous frame, a method of using motion vectors given in units of blocks may be used. More specifically, a portion indicated by the motion vector of the already encoded macro block that neighbors the block to be encoded is extracted from the previous frame, and an encoding table is selected depending on whether the mode of the extracted portion is "transparent", "Multi", or "opaque".

The present invention uses an alpha-map signal that represents an object shape and its position in a frame so as to separate the background and object in the method of encoding a frame while dividing it into the background and object upon encoding an image. This alpha-map signal is encoded together with encoded information of the image to form a bit stream, which is transmitted or stored. The former one is used in broadcasting or personal computer communications, and the latter one is subjected to transactions as a product that stores contents like a music CD.

When motion video contents recorded on a storage medium are provided as a product, encoded information of images and alpha-map signals are compressed, encoded, and stored in the storage medium as a bit stream, so that a single medium stores long-time contents to allow the user to enjoy movies and the like. An example of a decoding system for a storage medium that stores a compressed and encoded bit stream including alpha-map images will next be described as the seventh embodiment.

Figure 60:
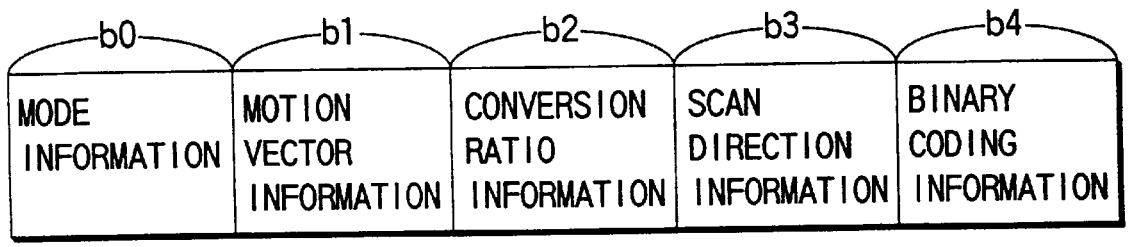
FIG. 60 is a view for explaining the arrangement order of a bit stream output from an alpha-map encoder of the present invention.

This embodiment will be explained using FIGS. 60 and 61. FIG. 60 shows an example of the format of a bitstream of mode information (shape mode) b0, motion vector information b1, size conversion ratio information (conversion ratio) b2, scan type information (scan type) b3, and encoded binary image information b4. In the present invention, upon decoding the encoded binary image information b4, information b0 to information b3 must have already been decoded. If the mode information b0 is not decoded prior to other information b1 to b4, other information cannot be decoded. Hence, these pieces of information b0 to b4 must have the format in which the mode information is set at the head of the bit stream, and the encoded binary frame image information is set at the end of the bit stream.

Figure 61:
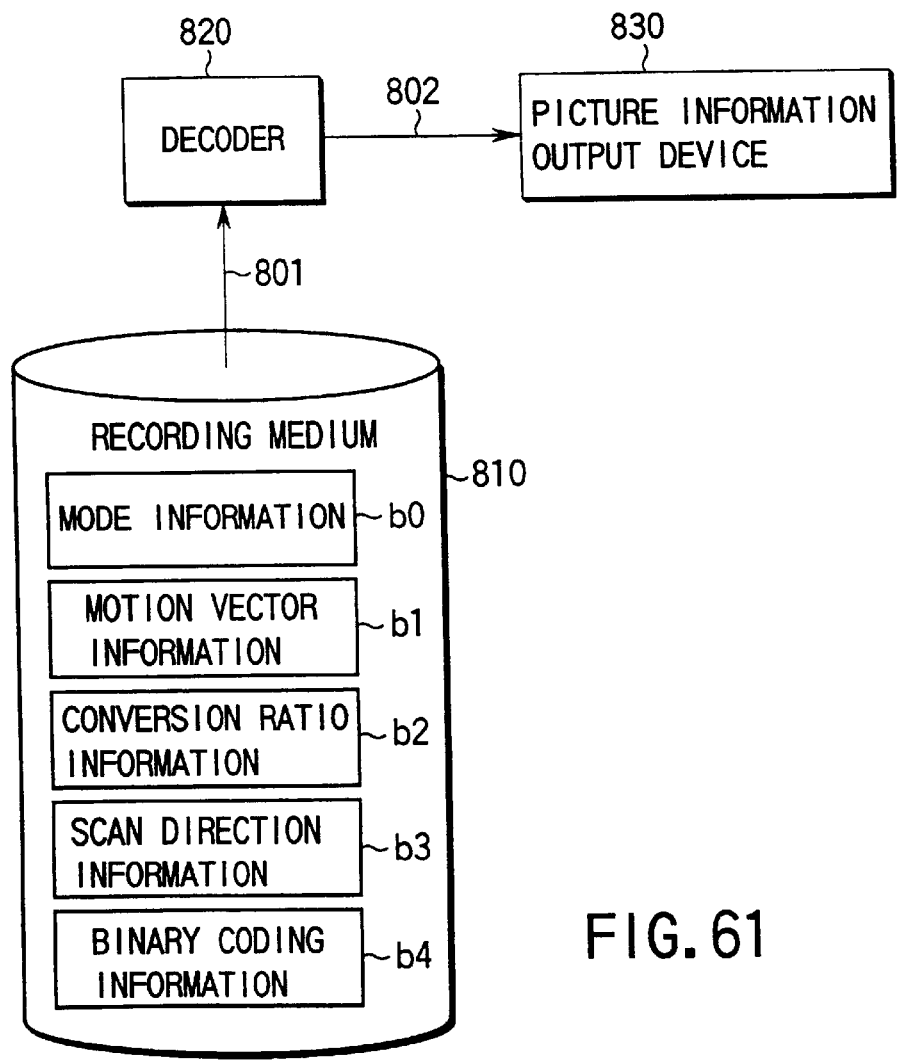
FIG. 61 is a block diagram showing an example of the system arrangement according to the sixth embodiment of the present invention.

FIG. 61 shows a system for decoding a video signal using a recording medium 810 that stores the bit stream shown in FIG. 60. The recording medium 810 stores bit streams including the bit stream shown in FIG. 60. A decoder 820 decodes a video signal from the bit streams stored in the storage medium 810. A video information output apparatus 830 it outputs a decoded image.

Figure 62:
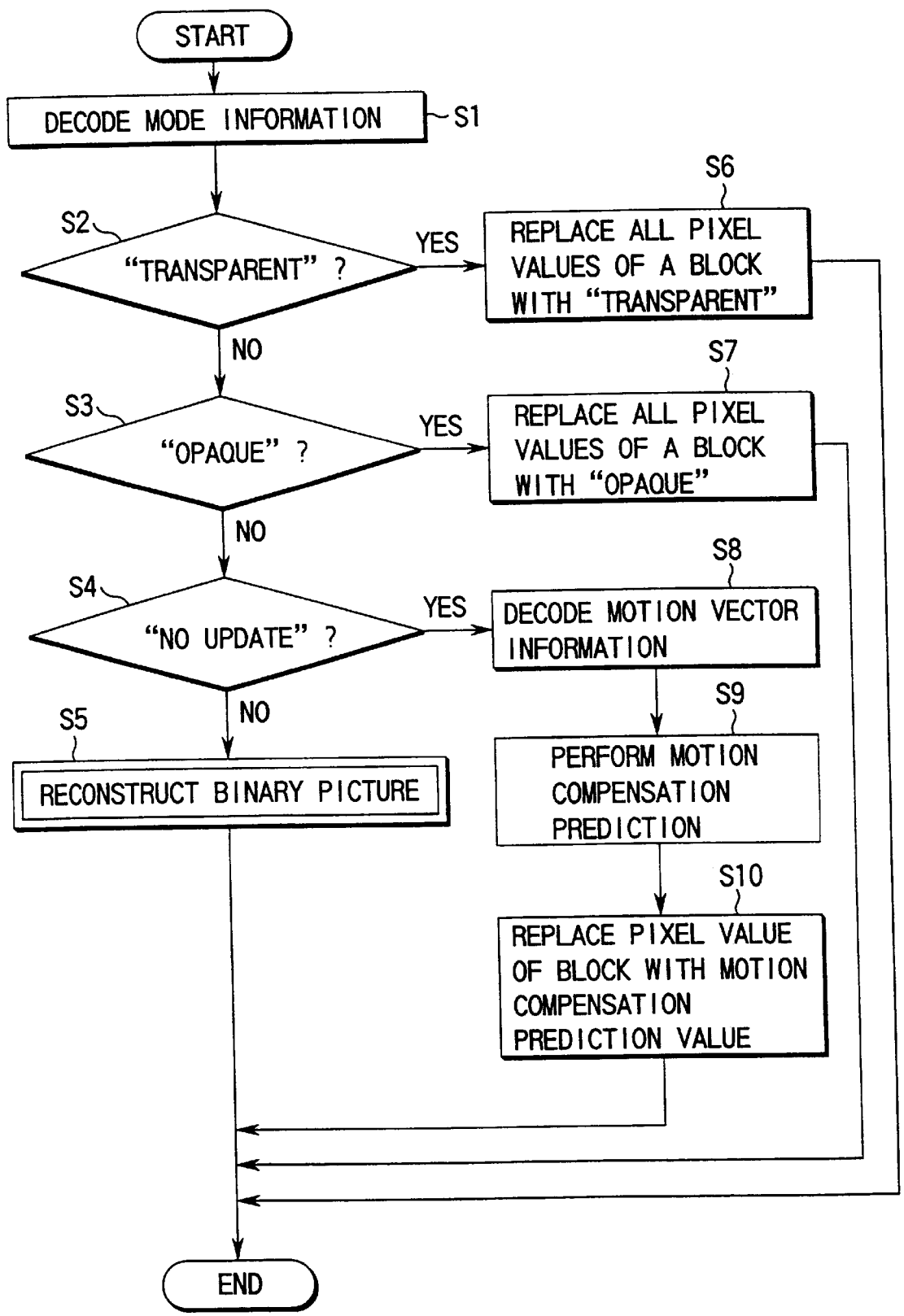
FIG. 62 is a flow chart for explaining the process procedure in the sixth embodiment of the present invention.
Figure 63:
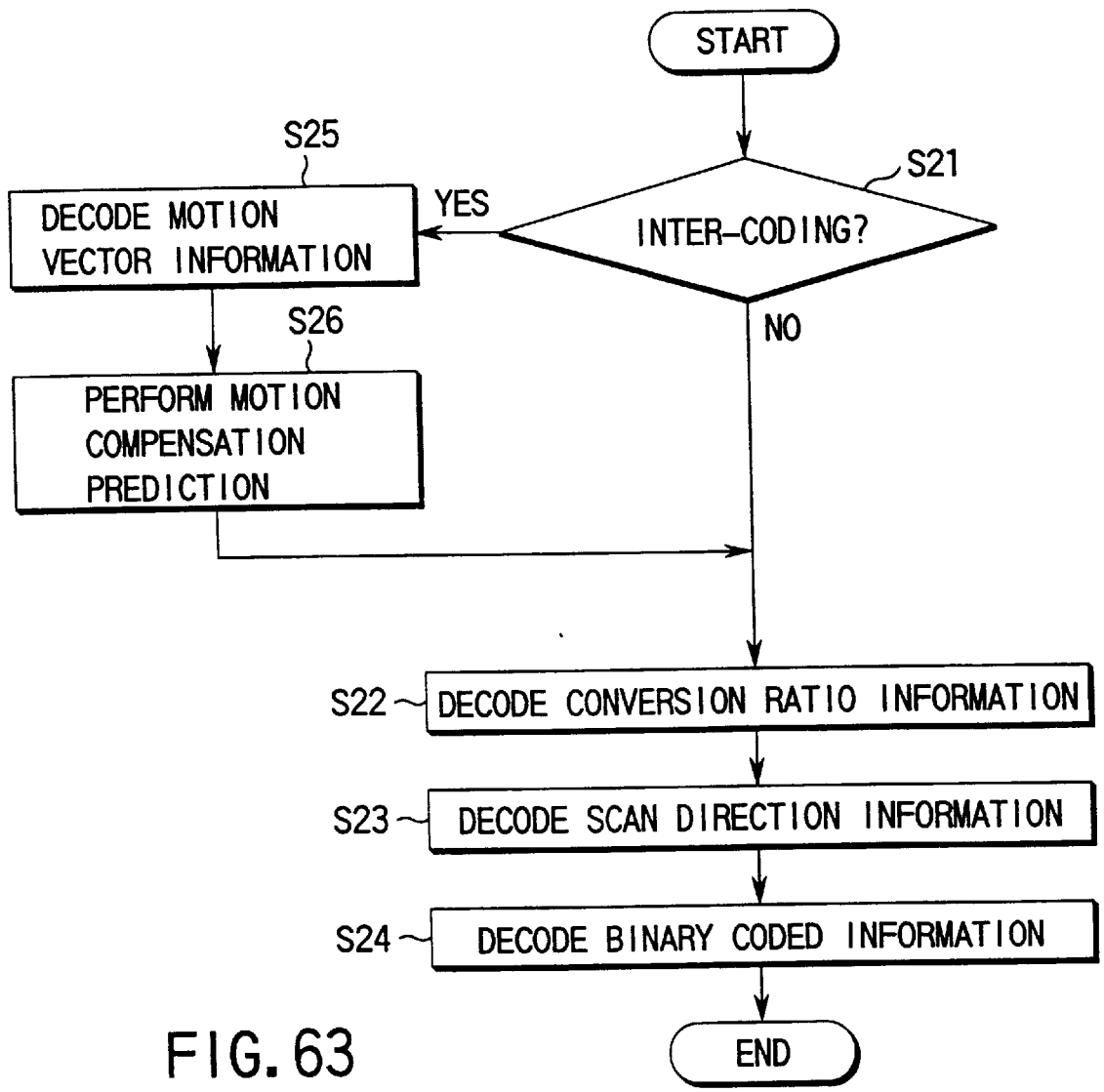
FIG. 63 is a flow chart for explaining the process procedure in the sixth embodiment of the present invention.

In this system with the above arrangement, the bit streams are stored in the storage medium 810 in the format shown in FIG. 60. The decoder 830 decodes a video signal from the bit streams stored in the storage medium 810. That is, the decoder 820 reads the bit streams from the storage medium 810 via a signal line 801, and generates a decoded image in the procedure shown in FIGS. 62 and 63. Note that FIG. 63 is a flow chart of the "binary image decoding" step (S5) in FIG. 62.

The contents process of the decoder 820 will be explained with reference to FIGS. 62 and 63. More specifically, mode information is initially decoded (step S1), and it is checked if the decoded mode information corresponds to "transparent", "opaque", and "no update" (steps S2, S3, S4).

As a result, if the decoded mode information is "transparent", all the pixel values in the macro block of interest are set at transparent values, and the process ends (step S6); if the decoded mode information is not "transparent" but "opaque", all the pixel values in the macro block of interest are set at opaque values, and the process ends (step S7). If the decoded mode information is neither "transparent" nor "opaque" but is "no update", motion vector is information is decoded (step S8), motion estimation/compensation is done (step S9), the obtained motion estimation/compensation value is copied to the macro block of interest (step S10), thus ending the process.

On the other hand, if the decoded mode information is none of "transparent", "opaque", and "no update" in steps S2, S3, and S4, the control advances to the binary image decoding process (step S5).

The process in S5 is as shown in FIG. 63. It is checked if "inter" coding is used (step S21). As a result, if "inter" coding is used, motion vector information is decoded (step S25), motion estimation/compensation is done (step S26), size conversion ratio information is decoded (step S22), and scan type information is decoded (step S23). Encoded binary information is then decoded (step S24), thus ending the process.

On the other hand, if it is determined as a result of checking in step S21 that "inter" coding is not used, size conversion ratio information is decoded (step S22), and scan type information is decoded (step S23). Encoded binary information is then decoded (step S24), thus ending the process.

In this manner, the decoder 820 decodes an image, and supplies the decoded frame image to the video information output apparatus 830. Then, the decoded frame image is displayed on the video information output apparatus 830.

Note that the video information output apparatus is, for example, a display, printer, and the like. In case of the encoder·decoder that combines size conversion in units of frames and that in units of small areas as in the previous embodiments, the size conversion ratio information in units of frames must be decoded prior to the bit stream in units of small areas shown in FIG. 60. Hence, the code of the size conversion ratio in units of frames is located before all the bit streams in units of small areas in that frame.

As described above, when a motion video and its alpha-map signal as the contents are compressed and encoded, and the encoded information is stored as bit streams in the storage medium, a decoding system for that storage medium can be provided.

An embodiment associated with prediction coding of the motion vectors will be explained below as the eighth embodiment.

FIGS. 19 and 20 show the framework of the present invention. In FIG. 19, a motion vector detected by a motion vector detection circuit 178 is supplied to and encoded by an MV encoder 179 via a signal line 107. The encoded motion vector is supplied to a VLC-multiplexing circuit 180, and is multiplexed with other encoded information. The multiplexed information is then output via a line 3.

In FIG. 20, motion vector information b1 demultiplexed by a VLD-demultiplexing circuit 210 from encoded information supplied via a signal line 8 is decoded into a motion vector signal by a motion vector decoder 290.

This embodiment is associated with the MV encoder 179 and the vector decoder 290.

In general, since the motion vector signal has strong correlation between neighboring blocks, the motion vector is encoded by prediction coding to remove such correlation.

Figure 64:
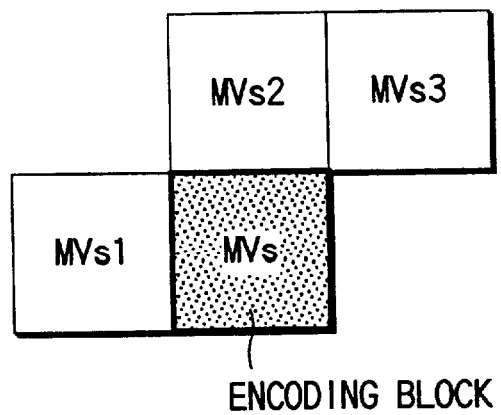
FIG. 64 is a view for explaining an example of motion vector prediction encoding used in the present invention.

FIG. 64 is a view for explaining an example of prediction coding of the motion vectors.

In FIG. 64, rectangle windows indicate macro blocks, and a rectangle window whose background is indicated by a dot pattern corresponds to the block to be encoded. If MVs represents the motion vector of this block to be encoded, a motion vector MVs1 of a macro block immediately before the block to be encoded (the left neighboring block to the block to be encoded in FIG. 64), a motion vector MVs2 of a macro block immediately above the block to be encoded (the upper left neighboring block to the block to be encoded in FIG. 64), and a motion vector MVs of the right neighboring block to the macro block immediately above the block to be encoded are used so as to obtain a prediction vector MVPs for the block to be encoded.

In this fashion, the prediction vector MVPs for the motion vector MVs of the block to be encoded is normally obtained using the motion vectors MVs1, MVs2, and MVs3 of the blocks surrounding the block to be encoded.

For example, horizontal and vertical components MVPs_h and MVPs_v of MVPs are obtained by:

$$MVPs\_h = Median(MVs1\_h, MVs2\_h, MVs3\_h)$$

$$MVPs\_h = Median(MVs1\_v, MVs2\_v, MVs3\_v)$$

where "Median ( )" is the process for obtaining the central value of the values in "( )", and the horizontal and vertical components of a motion vector MVsn (n=1, 2, 3) are respectively expressed by:

$$MVsn\_h, MVsn\_v$$

As another example of obtaining the prediction vector MVPs, it is checked in the order of MVs1, MVs2, and MVs3 if motion vectors are present in the individual blocks, and the motion vector of a block from which the presence of a motion vector is detected first is determined to be MVPs.

Figure 65A:
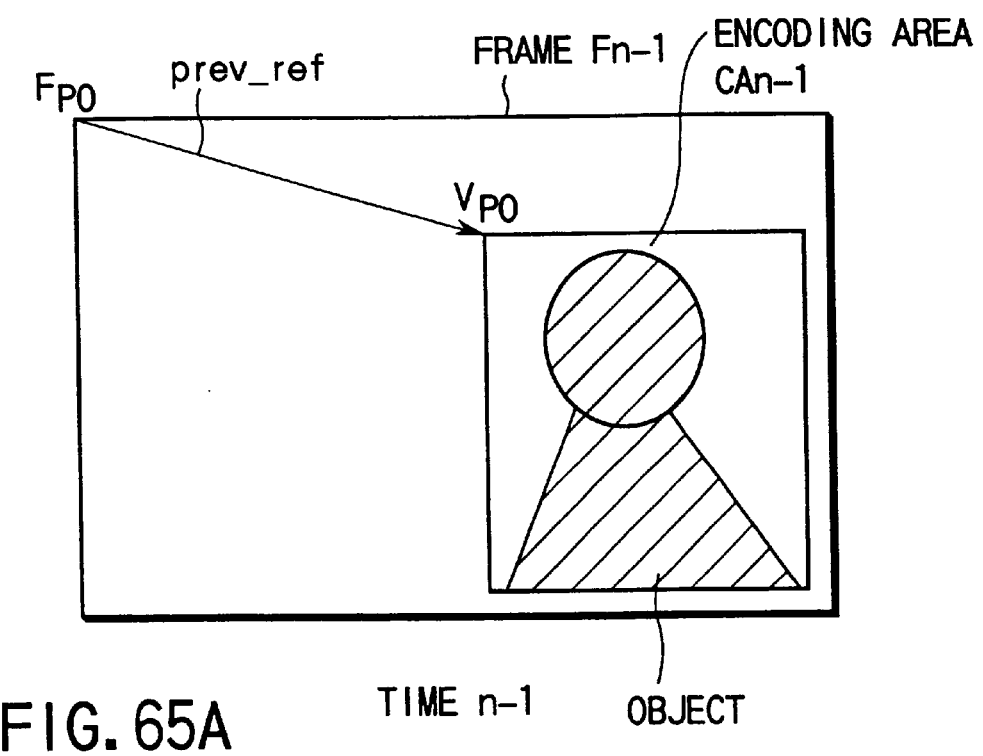
FIGS. 65A and 65B are views for explaining shortcomings of motion vector precision when the motion of the object position is large in a frame.
Figure 65B:
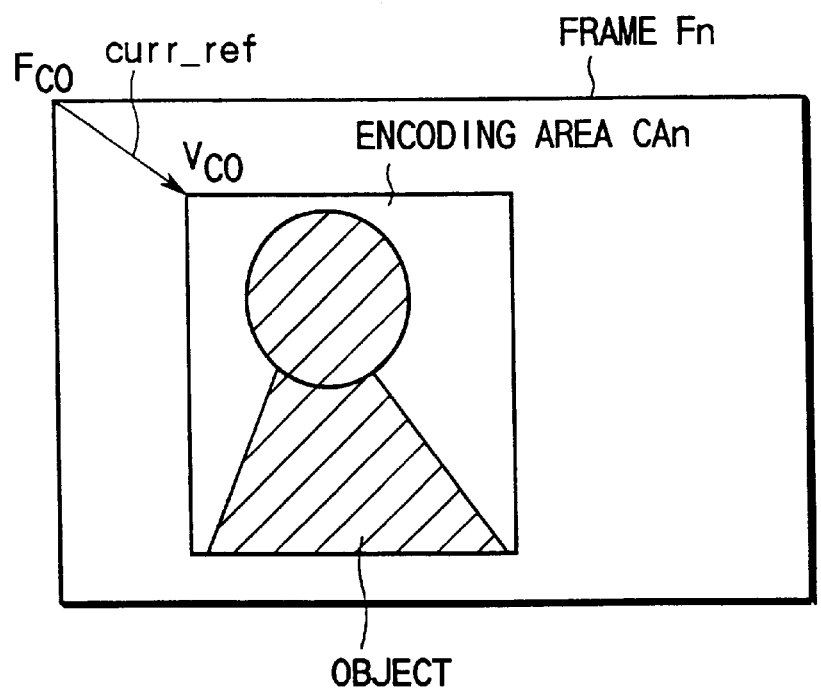

FIGS. 65A and 65B show an example of frame images Fn−1 and Fn at times n−1 and n, and video object planes CAn−1 and CAn in these frames. In this case, when the blocks around the block to be encoded are those which do not include any object, no motion vectors are present in these blocks. Also, in case of a block subjected to intra frame coding, no motion vector is present in that block.

For example, if none of MVs1, MVs2, and MVs3 are present, a default value (vector) is used as the prediction vector MVPs.

When the motion of an object is small, "zero vector" as a motion vector=zero may be used as this default value. However, when the motion of the position of an object within the frame is large like in transition from the frame shown in FIG. 65A to the frame shown in FIG. 65B, the motion vector cannot be accurately predicted, and the encoding efficiency drops.

The present invention is characterized in that a difference vector "offset" between vector "prev_ref" show in FIG. 65A and vector "curr_ref" shown in FIG. 65B, and "zero vector" are adaptively and selectively used as that default value.

Note that "offset" is obtained by:

offset=prev_ref-curr_ref

Switching between the default values "offset" and "zero vector" may be done as follows. For example, an error value between the objects at times n and n−1 obtained based on the coordinate axes of the frame is compared with an error value between the objects at times n and n−1 obtained based on the coordinate axes of the video object plane, and if the former value is larger, "offset" may be used as the default value; if the latter value is larger, "zero vector" may be used as the default value.

In this case, 1-bit side information must be sent as switching information. Switching between "offset" and "zero vector" as the default value of the prediction value of the motion vector can be similarly applied to prediction coding of the motion vector of texture information.

The detailed arrangements of the MV encoder 179 shown in FIG. 19 and the MV decoder 290 shown in FIG. 20 will be described below as the ninth embodiment.

Figure 66A:
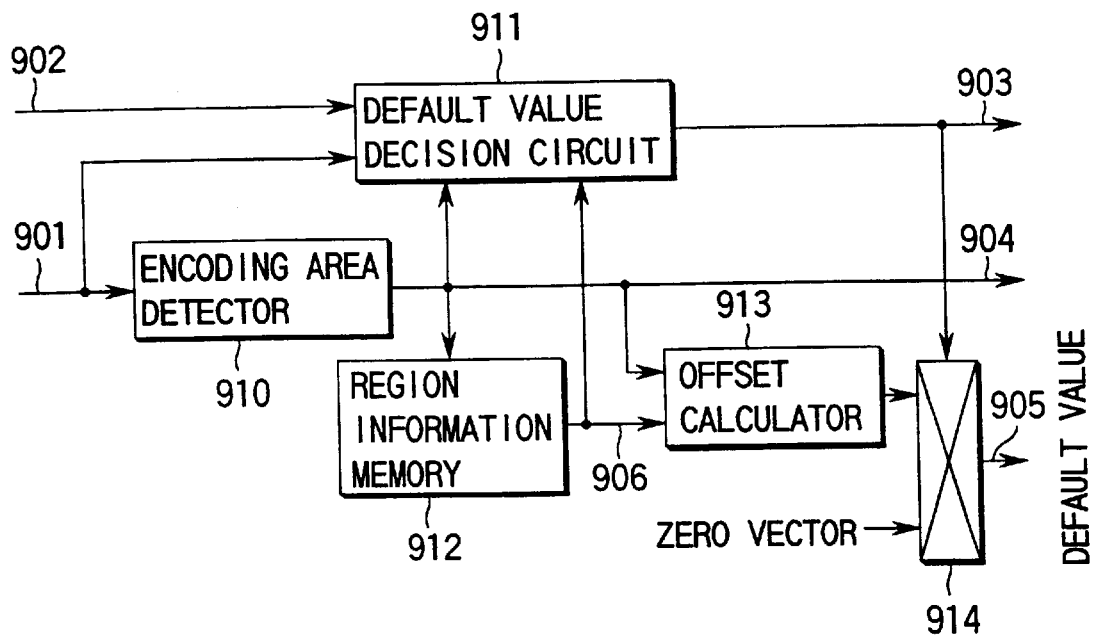
FIGS. 66A and 66B are block diagrams of an MV encoder and its peripheral circuits in a system of the present invention.
Figure 66B:
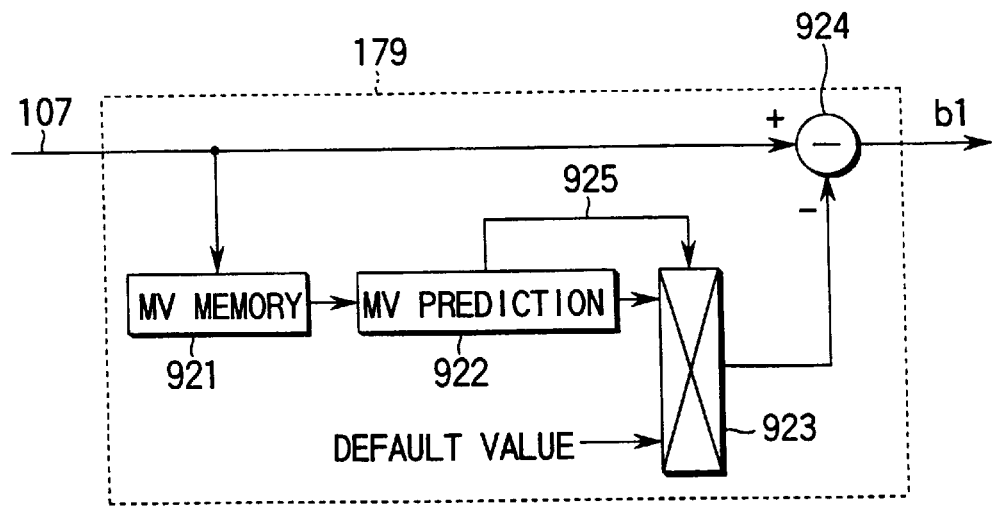

FIGS. 66A and 66B are block diagrams showing an embodiment of the MV encoder 179 and its peripheral circuit in the system shown in FIG. 19. FIG. 66A shows a default value operation circuit as a peripheral circuit, and FIG. 66B shows the MV encoder 179.

The default value operation circuit as the peripheral circuit shown in FIG. 66A operates any position shift of an object in the frame at the current timing when viewed from the previous timing on the basis of the process frames at the current and previous timings in terms of the object area, and comprises a video object plane detection circuit 910, default value determination circuit 911, plane information memory 912, offset calculation circuit 913, and selector 914, as shown in FIG. 66A.

A signal line 902 is a signal line for inputting frame data at the current timing, corresponds to the signal line 2 in the system shown in FIG. 19, and is used for receiving the frame data at the current timing input from the signal line 2 as an input. A signal line 902 in FIG. 66A is a signal line for supplying the previous timing frame data held in the frame memory 130, and the frame data at the previous timing is received from the frame memory 330 via this signal line 902. A signal line 903 is a signal line for outputting flag information from the default value determination circuit 911, a signal line 904 is a signal line for supplying information of a video object plane CAn from the video object plane detection circuit 910, and a signal line 906 is a signal line for supplying position information of a video object plane CAn−1 read out from the plane information memory 912.

The video object plane detection circuit 910 detects the size and position information VC0 of the video object plane CAn on the basis of the video signal of the current timing frame Fn−1 supplied via the signal line 901, and supplies the detection result to the default value determination circuit 911, plane information memory 912, and offset calculation circuit 913 via the signal line 904.

The plane information memory 912 is a memory for storing the information of the size and position of the video object plane CAn−1, and stores the size and position information of the video object plane CAn upon completion of encoding the frame at the timing of time n.

The offset calculation circuit 913 calculates a vector value "offset" using the position information of the video object plane CAn supplied via the signal line e4 and that of the video object plane CAn-1 supplied via the signal line 906, and supplies it to the selector 914.

The selector 914 is a circuit for receiving "zero vector" as a zero motion vector value, and "offset" supplied form the offset calculation circuit 913, and selecting one of these values in accordance with a flag supplied from the default value determination circuit 911. The vector value selected by the selector 914 is output as the default value to a selector 923 in the MV encoder 179 via a signal line 905.

The arrangement of the default value operation circuit has been described.

The arrangement of the MV encoder 179 will be explained below.

The MV encoder 179 comprises an MV memory 921, MV prediction circuit 922, selector 923, and difference circuit 924, as shown in FIG. 66B.

Of these circuits, the MV memory 921 is a memory for storing motion vector information supplied from the motion vector detection circuit 178 via a signal line 107 in FIG. 19, and stores motion vectors MVsn (n-1, 2, 3) around the block to be encoded.

The MV prediction circuit 922 is a circuit for obtaining a prediction vector MVPs on the basis of the motion vectors MVsn (n-1, 2, 3) around the block to be encoded, which are supplied from the MV memory 921. If MVsn (n-1, 2, 3) does not exist, the prediction sector MVPs cannot be normally obtained. Hence, the MV prediction circuit 1792 has a function of outputting a signal for identifying if the prediction vector MVPs is normally obtained, and has a mechanism for supplying this identification signal to the selector 923 via a signal line 925.

The selector 923 receives MVPs supplied from the MV prediction circuit 922 and the default value supplied via the signal line 905, selects one of these values in accordance with the signal supplied via the signal line 925, and supplies the selected value to the difference circuit 924.

The difference circuit 924 is a circuit for obtaining a prediction error signal for the motion vector. More specifically, the circuit 924 calculates the difference between the motion vector information supplied form the motion vector detection circuit 178 supplied via the signal line 107, and the MVPs or default value supplied via the selector 923, and outputs the calculation result from the MV encoder 179 as motion vector information b1.

The operation of the encoder with the above arrangement will be explained below.

In FIG. 66A, the video signal of the frame Fn as a video signal at the previous timing (frame data of the frame at the previous timing), which is stored in the frame memory 130, is supplied onto the signal line 901, and the video signal of the frame Fn-1 as a video signal at the current timing (frame data of the frame at the current timing) is supplied onto the signal line e2.

The video signal of the frame Fn is input to the default value determination circuit 911, and the video signal of the frame Fn-1 is input to the default value determination circuit 911 and video object plane detection circuit 910.

The video object plane detection circuit 910 detects the size and position information VC0 of the video object plane CAn on the basis of the video signal of the frame Fn-1, and supplies the detection result to the default value determination circuit 911, plane information memory 912, and offset calculation circuit 913 via the signal line 904.

On the other hand, the default value determination circuit 911 compares the error amount between the frames Fn and Fn-1 with that between the video object planes CAn and CAn-1 using the information of the video object plane CAn supplied from the video object plane detection circuit 910 via the signal line 904, and the size and position information of the video object plane CAn-1 supplied from the plane information memory 912 via the signal line 906. As a result of comparison, if the former value is larger, the circuit 911 determines that "offset" is used as the default value; otherwise, it determines that zero vector is used as the default value, and outputs flag information for identifying if "offset" or zero vector is used as the default value via the signal line 903.

The flag information output from the default value determination circuit 911 via the signal line 903 is multiplexed on the video object plane layer in the data format shown in FIG. 51 together with the size and position information of the video object plane CAn output from the video object plane detection circuit 910 via the signal line 904. After that, the multiplexed information is subjected to transmission or storage in a recording medium.

On the other hand, the plane information memory 912 is a memory for storing the size and position information of the video object plane CAn-1, and stores the size and position information of the video object plane CAn upon completion of encoding at time n.

The offset calculation circuit 913 calculates a vector value "offset" using the position information of the video object plane CAn supplied via the signal line 904 and that of the video object plane CAn-1 supplied via the signal line 906, and supplies it to the selector 914.

The selector 914 selects, as the default value, one of "offset" and zero vector in accordance with the flag supplied form the default value determination circuit 911 via the signal line 903. This default value is output to the selector 923 of the MV encoder 179 via the signal line 905.

The MV encoder 179 shown in FIG. 66B receives the motion vector MVs of the block to be encoded via the signal line 107, and supplies it to the MV memory 921 and difference circuit 924.

The MV prediction circuit 922 receives the motion vectors MVsn (n-1, 2, 3) around the block to be encoded from the MV memory 921, and obtains the prediction vector MVPs. In this case, if MVsn (n-1, 2, 3) does not exist, since the prediction vector MVPs cannot be normally obtained, the circuit 922 generates a signal for identifying if the prediction vector MVPs is normally obtained, and supplies that signal to the selector 923 via the signal line 925.

The selector 923 selects MVPs supplied from the MV prediction circuit 922 or the default value as the output on the signal line 905 in accordance with the identification signal supplied via the signal line 925, and supplies the selected value to the difference circuit 924.

The difference circuit 924 calculates the prediction error signal of the motion vector, and the calculation result is output as motion vector information b1 from the MV encoder 179.

The process contents of motion vector coding have been described. The decode process of the motion vector encoded in this way will be explained below.

Figure 67A:
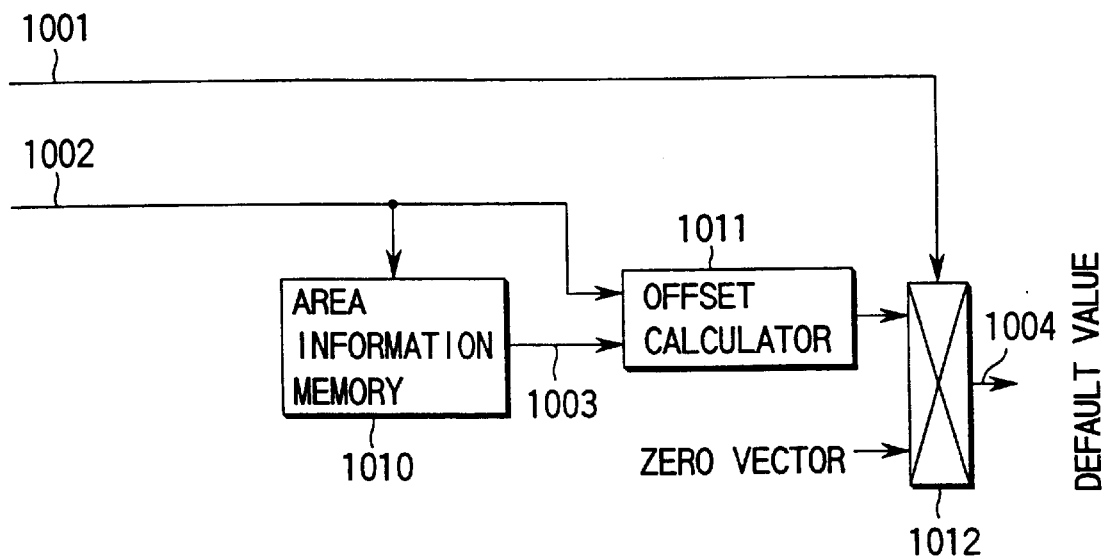
FIG. 67A is a block diagram of an MV decoder in the system of the present invention.
Figure 67B:
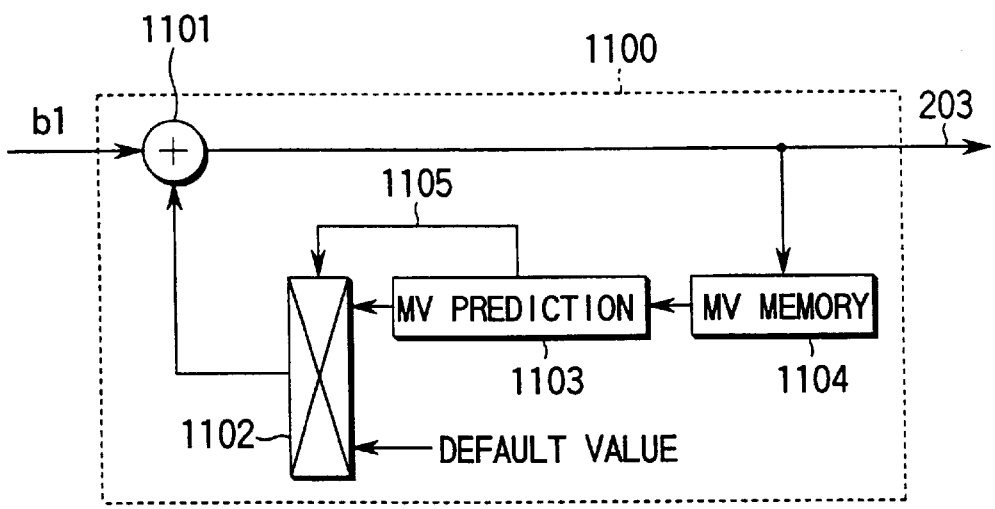
FIG. 67B is a block diagram of peripheral circuits of the MV decoder in the system of the present invention.

FIGS. 67A and 67B are block diagrams showing an embodiment of a decoder that realizes the present invention, i.e., showing the principal part arrangement for decoding MV encoded data and showing an embodiment of the MV decoder 290 and its peripheral circuit in the system shown in FIG. 20. FIG. 67A shows a default value operation circuit as a peripheral circuit, and FIG. 67B shows the MV decoder 290.

The default value operation circuit as the peripheral circuit shown in FIG. 67A comprises a plane information memory 1010, offset calculation circuit 1011, and selector 1012. Reference numeral 1001 denotes a signal line for supplying flag information used for identifying the selected default value, which information is included in an upper layer in transmitted encoded data or data stored in and read out from a storage medium; and 1002, a signal line for supplying the position information of the plane CAn included in the upper layer of the transmitted encoded data. These signal lines correspond to 1003 and 1004 in the encoder side.

Reference numeral 1003 denotes a signal line for supplying the position information of the plane CAn−1; and 1004 is a signal line for outputting a default value.

The plane information memory 1010 is a memory for storing the position information of the plane CAn−1. The offset calculation circuit 1011 calculates a vector value "offset" using the position information of the plane CAn supplied via the signal line 1002 and that of the plane CAn−1 supplied via the signal line 1003, and supplies the calculated vector value "offset" to the selector 1012.

The selector 1012 selects and outputs one of zero motion vector value given in advance, and the vector value "offset" supplied to the offset calculation circuit 1011 corresponding to the flag information used for identifying the selected default value supplied via the signal line 1001. The output from this selector 1012 is output as the default value onto the signal line 1004, and is supplied to the MV decoder 290.

The arrangement of the default value operation circuit on the decoding side has been described.

The arrangement of an MV decoder 1100 will be described below.

The MV decoder 1100 comprises an adder 1101, selector 1102, MV prediction circuit 1103, and MV memory 1104, as shown in FIG. 67B.

Of these circuits, the adder 1101 receives the motion vector information b1 as the prediction error signal of the motion vector of the block to be decoded, and the default value supplied via the selector 1102, adds the two values, and outputs the sum. This sum output is output to the MV memory 1104 and onto a signal line 203 in the arrangement shown in FIG. 20.

The MV memory 1104 holds the sum output from the adder 1110, and supplies the motion vectors MVsn (n=1, 2, 3) around the block to be decoded. The MV prediction circuit 1103 obtains a prediction vector MVPs from the motion vectors MVsn (n=1, 2, 3) around the block to be decoded, supplied from the MV memory 1104, and supplies it to the selector 1102. In this case, when MVsn (n=1, 2, 3) is not available, since the prediction vector MVPs cannot be normally obtained, the MV prediction circuit 1103 has a function of generating a signal for identifying if the prediction vector MVPs is normally obtained, and this identification signal is supplied to the selector 1102 via a signal line 1105.

The selector 1102 is a circuit for receiving the default value supplied via the signal line 1004, and the prediction vector MVPs supplied from the MV prediction circuit 1103, selecting one of these values in accordance with the identification signal supplied via the signal line 1105, and supplying the selected value to the adder 1101.

The operation of the decoding side system with the above-mentioned arrangement will be explained below.

In FIG. 67A, a flag for identifying if "offset" or zero vector is used as the default value is supplied onto the signal line 1001, and the position information of the plane CAn is supplied onto the signal line 1102.

The position information of the plane CAn supplied via the signal line 1002 is supplied to the plane information memory 1010 and the offset calculation circuit 1011. The plane information memory 1010 is a memory for storing the position information of the plane CAn−1, and stores the position information of the plane CAn upon completion of decoding at time n.

The offset calculation circuit 1011 calculates the vector value "offset" using the position information of the plane CAn supplied via the signal line d2 and that of the plane CAn−1 supplied via the signal line 1003, and supplies the vector value "offset" to the selector 1012.

The selector 1012 selects one of "offset" and "zero vector" in accordance with the flag supplied via the signal line 1001, and outputs the selected value as the default value to the MV decoder 1100 via the signal line 1004.

Subsequently, the MV decoder 1100 shown in FIG. 67B receives "motion vector information b1" as the prediction error signal of the motion vector of the block to be decoded, and supplies it to the adder 1101.

The MV prediction circuit 1103 receives motion vectors MVsn (n=1, 2, 3) around the block to be decoded from the MV memory 1104, and obtains a prediction vector MVPs. When MVsn (n=1, 2, 3) is not available, since the prediction vector MVPs cannot be normally obtained, the circuit 1103 supplies a signal for identifying if the prediction vector MVPs is normally obtained to the selector 1102 via the signal line 1105.

The selector 1102 selects one of the MVPs supplied from the MV prediction circuit 1103 or the default as the output on the signal line 1004 in accordance with the identification signal supplied via the signal line 1105, and supplies the selected value to the adder 1101.

The adder 1101 adds the prediction error signal ("motion vector information b1") of the motion vector and the prediction signal MVPs, thereby decoding the motion vector MVs of the block to be decoded. The motion vector MVs of the block to be decoded is output from the MV decoder 1100 via the signal line 203, and is stored in the MV memory 1104.

In this manner, the MV encoding process required in the arrangement shown in FIG. 19, and the MV decoding process required in the arrangement shown in FIG. 20 can be realized.

Industrial Applicability

Various embodiments have been described. According to the present invention, a video encoding apparatus and decoding apparatus which can efficiently encode alpha-map information as subsidiary video information that represents the shape of an object and its position in a frame, and can decode the encoded information, can be obtained.

Also, according to the present invention, since the number of encoded bits of an alpha-map can be reduced, separate encoding can be done in units of objects without considerably deteriorating the encoding efficiency as compared to a conventional encoding method that executes encoding in units of frames.

Note that the present invention is not limited to the above-mentioned embodiments, and various modifications may be made.

According to the present invention, since the number of encoded bits of an alpha-map can be reduced, separate encoding can be done in units of objects without considerably deteriorating the encoding efficiency as compared to a conventional encoding method that executes encoding in units of frames.

What is claimed is:

1. A computer program product for operating a computer, comprising:

a computer readable medium having first program instruction means for instructing the computer to down-sample an alpha-map signal, which represents a shape of an object and a position in a frame of the object, at a down-sampling ratio based on size conversion ratio information, for obtaining a down-sampled alpha-map signal;

second program instruction means for instructing the computer to up-sample the alpha-map signal at an up-sampling ratio based on size conversion ratio information given to restore the down-sampled alpha-map signal to an original size, and output a local decoded alpha-map signal;

third program instruction means for instructing the computer to generate a motion compensation signal on the basis of a previous decoded video signal and a motion vector signal;

fourth program instruction means for instructing the computer to down-sample the motion compensation signal at the down-sampling ratio, for obtaining a down-sampled estimation/compensation signal;

fifth program instruction means for instructing the computer to encode the alpha-map signal down-sampled by said first down-sampling means to a binary image in accordance with the down-sampled motion estimation/compensation signal, and outputting an encoded binary image signal; and sixth program instruction means for instructing the computer to multiplex and output the encoded binary image signal and the size conversion ratio information.

2. The computer program product according to claim 1, wherein said third program instruction means has program instruction means for instructing the computer to store a previous decoded video signal, and program instruction means for instructing the computer to generate the motion estimation/compensation signal in accordance with the stored decoded video signal and the motion vector signal.

3. The computer program product according to claim 1, wherein said first program instruction means includes program instruction means for instructing the computer to receive the alpha-map signal in units of M×N pixel blocks (M: the number of pixels in the horizontal direction, N: the number of pixels in the vertical direction), and program instruction means for instructing the computer to encode the alpha-map signal in units of blocks.

* * * * *